(12) United States Patent
Ogawa et al.

(10) Patent No.: US 7,311,391 B2
(45) Date of Patent: *Dec. 25, 2007

(54) INK COMPOSITION AND INK JET RECORDING METHOD

(75) Inventors: Manabu Ogawa, Fujinomiya (JP); Nobuhiro Nishita, Minami-Ashigara (JP); Keiichi Tateishi, Minami-Ashigara (JP); Junichi Yamanouchi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 10/503,444

(22) PCT Filed: Feb. 3, 2003

(86) PCT No.: PCT/JP03/01070

§ 371 (c)(1),
(2), (4) Date: Aug. 4, 2004

(87) PCT Pub. No.: WO03/066751

PCT Pub. Date: Aug. 14, 2003

(65) Prior Publication Data

US 2005/0081745 A1    Apr. 21, 2005

(30) Foreign Application Priority Data

Feb. 4, 2002    (JP) .............................. 2002-026838
Feb. 4, 2002    (JP) .............................. 2002-026839
Feb. 12, 2002   (JP) .............................. 2002-033984
Feb. 12, 2002   (JP) .............................. 2002-034325

(51) Int. Cl.
*G01D 11/00* (2006.01)

(52) U.S. Cl. ............. 347/100; 347/95; 106/31.27; 523/160

(58) Field of Classification Search .......... 347/100, 347/95, 96, 101; 106/31.6, 31.27, 31.13; 523/160
See application file for complete search history.

(56) References Cited

U.S. PATENT DOCUMENTS

| | | | |
|---|---|---|---|
| 3,287,470 A | | 11/1966 | Geigy |
| 5,484,475 A | * | 1/1996 | Breton et al. ............... 347/100 |
| 5,882,390 A | | 3/1999 | Nagai et al. |
| 6,835,240 B2 | * | 12/2004 | Nishita et al. ............ 106/31.48 |
| 7,048,789 B2 | * | 5/2006 | Taguchi et al. .......... 106/31.43 |
| 2002/0157568 A1 | | 10/2002 | Adachi et al. |
| 2002/0158952 A1 | | 10/2002 | Adachi et al. |
| 2003/0195275 A1 | * | 10/2003 | Sanada et al. ............ 523/160 |
| 2004/0045478 A1 | | 3/2004 | Tateishi et al. |
| 2004/0055508 A1 | * | 3/2004 | Miyamoto et al. ......... 347/100 |
| 2004/0080595 A1 | * | 4/2004 | Taguchi et al. ............ 347/100 |
| 2004/0200385 A1 | * | 10/2004 | Taguchi et al. .......... 106/31.43 |
| 2005/0001890 A1 | * | 1/2005 | Taguchi et al. ............ 347/100 |

FOREIGN PATENT DOCUMENTS

| | | |
|---|---|---|
| EP | 1072431 A2 | 7/2001 |
| EP | 1473336 A1 * | 11/2004 |
| JP | 2000-239584 A | 9/2000 |
| WO | WO 02/060994 A1 | 8/2002 |
| WO | WO 02/083795 A2 | 10/2002 |

OTHER PUBLICATIONS

International Search Report for PCT/JP03/01070 date Mar. 25, 2003.

* cited by examiner

*Primary Examiner*—Manish S. Shah
(74) *Attorney, Agent, or Firm*—Sughrue Mion, PLLC

(57) ABSTRACT

An ink composition comprising: at least one dye having an oxidation potential of more positive than 1.0 V dissolved or dispersed in an aqueous medium; and a surface active agent in an amount of from 0.05 to 50 g/l. The ink composition having the aforesaid constitution exhibits a high ejection stability and can provide an image having assured hue and an excellent weathering resistance and being free of defects in water resistance and image quality.

21 Claims, No Drawings

INK COMPOSITION AND INK JET RECORDING METHOD

TECHNICAL FIELD

The present invention relates to an ink composition which provides an image having a high quality and an excellent preservability an exhibits an excellent ejection stability and an ink jet recording method using the ink composition.

BACKGROUND ART

The dyes to be used in the ink are required to exhibit a high solubility in solvents, allow a high density recording and have a good hue and an excellent fastness to light, heat, air, water and chemical, a good fixability to image-receiving materials, difficulty in bleeding, an excellent preservability as ink, no toxicity and a high purity and be available at a low cost. However, it is extremely difficult to seek coloring agents meeting these requirements to a high extent. In particular, dyestuffs having a good cyan hue or magenta hue and an excellent fastness have been keenly desired.

In recent years, with the spread of computers, ink jet printers have been widely used to print on paper, film, cloth, etc. at offices as well as at home. Examples of ink jet recording method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks. Among these inks, aqueous inks are mainly used from the stand point of producibility, handleability, odor, safety, etc.

As dyestuffs to be used in ink for ink jet recording, too, those satisfying the aforesaid requirements have been desired, and various dyes and pigments have been already proposed and practically used. However, it is the present situation that no dyestuffs that satisfying all the requirements have been found yet. Known dyes and pigments provided with color index (C.I.) can difficultly satisfy both the hue and fastness requirements for inks for ink jet recording. As a dye which can enhance fastness there has been proposed an azo dye derived from an aromatic amine and a 5-membered heterocyclic amine described in JP-A-55-161856. However, these dyes have an undesirable hue in the yellow and cyan ranges and thus are disadvantageous in that they deteriorate color reproducibility. JP-A-61-36362 and JP-A-2-212566 disclose inks for ink jet recording for the purpose of accomplishing both hue and light fastness. However, the dyestuffs used in these publications have an insufficient water solubility when used as water-soluble ink. Further, the dyestuffs described in these publications are disadvantageous also in wet heat fastness when used as water-soluble ink for ink jet. As means for solving these problems there have been proposed a compound and an ink described in JP-T-11-504958. Further, an ink for ink jet recording which comprises a pyrazolylaniline azo dyestuff to improve hue and light fastness is described in Japanese Patent Application No. 2000-80733. However, these inks for ink jet recording leave something to be desired both in color reproducibility and fastness of output image.

Further, on the other hand, inks having improved ejection stability during image recording and little image bleeding have been desired. For example, JP-A-58-74761 and JP-A-60-92369 propose an ink comprising a dye, glycerin, diethylene glycol and an ethylene oxide adduct of alcohol and JP-A-2000-265098 proposes an ink comprising an ethylene oxide adduct of long straight-chain alcohol, but these inks leave something to be desired and are disadvantageous in that the quality of the image formed is deteriorated during storage. Moreover, JP-A-6-88048, JP-A-8-333532, JP-A-8-333533, and U.S. Pat. Nos. 5,837,043 and 5,626,655, etc. propose that the use of an ink comprising an ethylene oxide adduct of higher alcohol makes it possible to reduce image bleeding, but this ink is disadvantageous in that it still easily causes clogging and exhibits a deteriorated image preservability after printed, resulting in tone change.

Further, it was made obvious that there are some cases where an image recorded on a gloss paper of photographic image quality dedicated to ink jet recording exhibits a remarkably poor preservability when put on the wall of an indoor room. This phenomenon is remarkable particularly with gloss paper of photographic image quality dedicated to ink jet recording and thus raises a great problem with the current ink jet recording process, which is required to provide a desired photographic quality image as one of important features. The present inventors presume that this phenomenon is attributed to some oxidizing gases such as ozone in the air because this phenomenon no longer occurs when the flow of air is blocked by enclosing the printed matter in a glass frame or otherwise.

DISCLOSURE OF THE INVENTION

Characteristics required for dyes to be used in the inks are 1) good hue and no hue change (solvate), 2) excellent resistance (to light, ozone, NOx, salvation, oil, water), 3) safety (Ames, non-carcinogenic, non-irritant on skin, decomposable), 4) low cost, 5) high $\epsilon$ value, 6) high solubility, and 7) firm fixability to media.

Inks and concentrated inks are physically required to:
1) be uniform regardless of temperature and aging;
2) be little stained;
3) penetrate media fairly;
4) have a uniform droplet size;
5) be applied to any kind of paper;
6) be easily prepared;
7) be ejected without any trouble, little foamed and easily defoamed; and
8) be ejected in a stable manner.

Images are required to:
1) be free from bleeding, discoloration and beading and clean;
2) be scratch-resistant;
3) be highly glossy and uniform;
4) have a good preservability and excellent fading balance;
5) be quickly dried;
6) be printed at a high speed; and
7) undergo fading at a rate that is not dependent on image density.

Accordingly, an object of the present invention is to obtain an ink composition that can satisfy the aforesaid requirements, and in the light of the aforesaid problems with the related art, another object of the present invention is to provide an aqueous ink excellent in handleability, odor, safety, etc. which is an ink composition, particularly ink for ink jet recording that exhibits a high ejection stability and gives an image having a good hue, an excellent image preservability such as resistance to light, heat, ozone, etc., and water resistance, no defects in image quality such as bleeding from fine line and a good preservability even under severe conditions. A further object of the present invention is to provide an ink jet recording method using the ink.

The aforesaid objects of the present invention were accomplished by the following means.

1. An ink composition comprising: at least one dye having an oxidation potential of more positive than 1.0 V dissolved or dispersed in an aqueous medium; and a surface active agent in an amount of from 0.05 to 50 g/l.

2. The ink composition as described in the above 1, wherein the surface active agent is a nonionic surface active agent.

3. The ink composition as described in the above 1 or 2, wherein the surface active agent is a compound represented by the following general formula (I) or (II):

General formula (I)

wherein $R^{21}$ represents a $C_5$-$C_{40}$ alkyl group; and $m_1$ represents the average number of added moles of ethylene oxide, which is from 2 to 40;

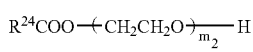

General formula (II)

wherein $R^{24}$ represents a $C_5$-$C_{40}$ alkyl group; and $m_2$ represents the average number of added moles of ethylene oxide, which is from 2 to 40.

4. The ink composition as described in the above 3, wherein the surface active agent is a compound represented by the following general formula (I-1):

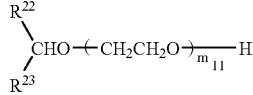

General formula (I-1)

wherein $R^{22}$ and $R^{23}$ each represent a $C_4$-$C_{10}$ saturated hydrocarbon, with the proviso that the sum of the carbon atoms in $R^{22}$ and $R^{23}$ is from 8 to 18; and $m_{11}$ represents the average number of added moles of ethylene oxide, which is from 3 to 20.

5. The ink composition as described in the above 3, wherein the surface active agent is a compound represented by the following general formula (II-1):

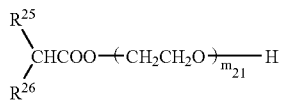

General formula (II-1)

wherein $R^{25}$ and $R^{26}$ each represent a $C_2$-$C_{20}$ saturated hydrocarbon; and $m_{21}$ represents the average number of added moles of ethylene oxide, which is from 2 to 40.

6. The ink composition as described in the above 1 or 2, wherein the surface active agent is a compound represented by the following general formula (III):

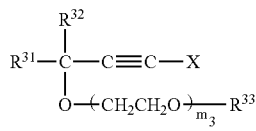

General formula (III)

wherein $R^{31}$ and $R^{32}$ each independently represent a $C_1$-$C_{18}$ alkyl group; $R^{33}$ represents a hydrogen atom, $C_1$-$C_6$ alkyl group, or phenyl group; and X represents a hydrogen atom or

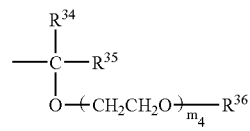

in which $R^{34}$ and $R^{35}$ each independently represent a $C_1$-$C_{18}$ alkyl group; $R^{36}$ represents a hydrogen atom, $C_1$-$C_6$ alkyl group or phenyl group; $m_3$ and $m_4$ each represent the average number of added moles of ethylene oxide, and the sum of $m_3$ and $m_4$ is from 0 to 100, and when $m_3$ is 0, $R^{33}$ represents a hydrogen atom, and when $m_4$ is 0, $R^{36}$ represents a hydrogen atom, and when X is a hydrogen atom, $m_3$ is from 1 to 100.

7. The ink composition as described in the above 6, wherein the surface active agent is a compound represented by the following general formula (III-1):

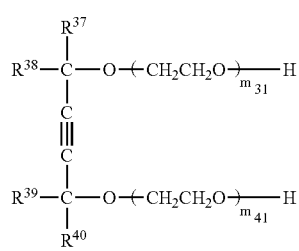

General formula (III-1)

wherein $R^{37}$, $R^{38}$, $R^{39}$ and $R^{40}$ each independently represent a $C_1$-$C_6$ alkyl group; and $m_{31}$ and $m_{41}$ each represent the average number of added moles of ethylene oxide, and the sum of $m_{31}$ and $m_{41}$ is from 0 to 40.

8. The ink composition as described in any one of the above 1 to 7, which comprises a compound represented by the following general formula (IV):

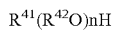

General formula (IV)

wherein $R_{41}$ represents a $C_1$-$C_4$ alkyl group; $R_{42}$ represents a $C_2$-$C_3$ alkyl group; and n represents an integer of from 2 to 5.

9. The ink composition as described in the above 8, wherein the compound represented by the general formula (IV) is triethylene glycol monobutyl ether.

10. The ink composition as described in any one of the above 1 to 9, wherein the dye remaining ratio (reflection density after storage/initial density×100) measured after 24 hours of storage in 5 ppm ozone atmosphere is 60% or more at the site where printing has been made such that the reflection density is from 0.9 to 1.1 as measured through a status A filter.

11. The ink composition as described in any one of the above 1 to 10, wherein, after a solid image printed with an ink containing a phthalocyanine dye is stored for 24 hours in 5 ppm ozone atmosphere, the amount of Cu ions eluted in water from the solid image is 20% or less based on the total dye.

12. The ink composition as described in any one of the above 1 to 11, wherein the dye is a phthalocyanine dye having an electron-withdrawing group in the β-position on the benzene ring of phthalocyanine.

13. The ink composition as described in any one of the above 1 to 12, wherein the dye is a phthalocyanine dye produced by a method which doesn't proceed through a sulfonation of unsubstituted phthalocyanine.

14. The ink composition as described in any one of the above 1 to 13, wherein the dye is a compound represented by the following general formula (C-I):

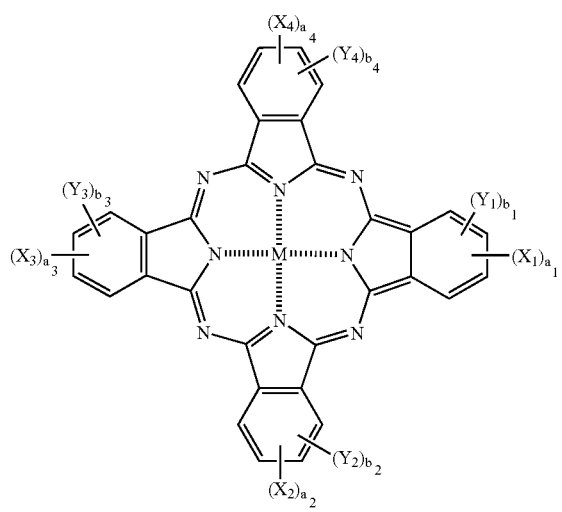

General formula (C-I)

wherein $X_1$, $X_2$, $X_3$ and $X_4$ each independently represent —SO-Z, —SO$_2$-Z, —SO$_2$NR$_1$R$_2$, sulfo group, —CONR$_1$R$_2$ or —CO$_2$R$_1$; Z represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; $R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group, with the proviso that when there are a plurality of Z's, they may be the same or different; $Y_1$, $Y_2$, $Y_3$ and $Y_4$ each independently represent a monovalent substituent, with the proviso that when there are a plurality of any of $X_1$ to $X_4$ and $Y_1$ to $Y_4$, they may be the same or different;

$a_1$ to $a_4$ and $b_1$ to $b_4$ represent the number of substituents $X_1$ to $X_4$ and $Y_1$ to $Y_4$, respectively; $a_1$ to $a_4$ each independently represent an integer of from 0 to 4, and all of them do not represent 0 at the same time; $b_1$ to $b_4$ each independently represent an integer of from 0 to 4;

M represents a hydrogen atom, metal atom or oxide, hydroxide or halide thereof.

15. The ink composition as described in the above 14, wherein the dye is a compound represented by the following general formula (C-II):

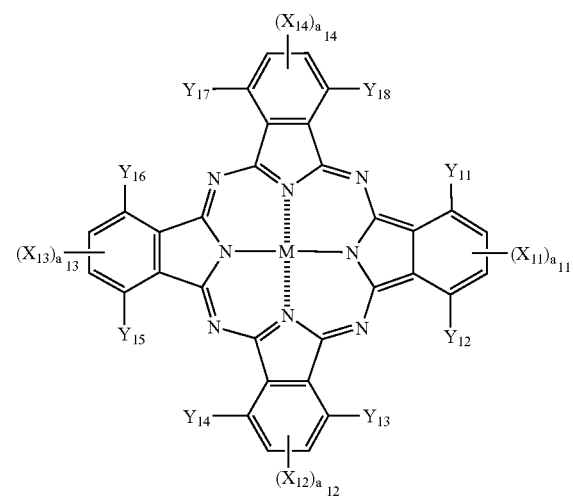

General formula (C-II)

wherein $X_{11}$ to $X_{14}$, $Y_{11}$ to $Y_{18}$ and M have the same meaning as $X_1$ to $X_4$, $Y_1$ to $Y_4$ and M in the general formula (C-I); and $a_{11}$ to $a_{14}$ each independently represent an integer of 1 or 2.

16. The ink composition as described in any one of the above 1 to 10, wherein the dye is an azo dye having a maximal absorption at from 500 nm to 580 nm in an aqueous medium.

17. The ink composition as described in the above 16, wherein the azo dye has a chromophore represented by (heterocyclic ring A)-N=N-(heterocyclic ring B).

18. The ink composition as described in the above 16 or 17, wherein the azo dye has an aromatic nitrogen-containing 6-membered heterocyclic ring directly connected to at least one end of the azo group as a coupling component.

19. The ink composition as described in any one of the above 16 to 18, wherein the azo dye has an aromatic cyclic amino group or heterocyclic amino group as an auxochrome.

20. The ink composition as described in any one of the above 16 to 19, wherein the azo dye has a stereostructure.

21. The ink composition as described in any one of the above 16 to 20, wherein the azo dye is a compound represented by the following general formula (M-I):

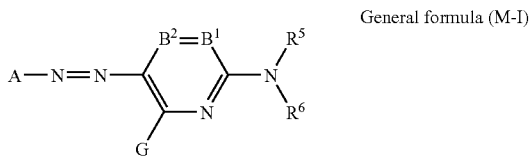

General formula (M-I)

wherein A represents a 5-membered heterocyclic ring; $B^1$ and $B^2$ each represent =CR$^1$— or —CR$^2$=, or one of $B^1$ and $B^2$ represents a nitrogen atom and the other represents =CR¹— or —CR²=; $R^5$ and $R^6$ each independently represent a hydrogen atom or a substituent that represents an aliphatic group, aromatic group, heterocyclic group, acyl group, alkoxycarbonyl group, aryloxycarbonyl group, carbamoyl group, alkylsulfonyl group, arylsulfonyl group or sulfamoyl group, and the hydrogen atom in the substituent may be substituted; G, $R^1$ and $R^2$ each independently represent a hydrogen atom or a substituent that represents a halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonyl amino group, alkylsulfonyl amino group, arylsulfonyl amino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, and the hydrogen atom of the substituent may be substituted;

$R^1$ and $R^5$ or $R^5$ and $R^6$ may be connected to each other to form a 5- or 6-membered ring.

22. An ink jet recording method, which comprises using the ink composition as described in any one of the above 1 to 21.

23. An ink jet recording method, which comprises ejecting an ink droplet onto an image-receiving material comprising an image-receiving layer containing a particulate white inorganic pigment provided on a support in accordance with recording signals to record an image on the image-receiving material, wherein the ink droplet comprises the ink composition as described in any one of the above 1 to 21.

BEST MODE FOR CARRYING OUT THE INVENTION

The present invention will be further described in detail hereinafter.

Firstly, the dyes to be used in the ink composition of the present invention will be described.

In the present invention, dyes having an oxidation potential of more positive than 1.0 V (preferably more positive than 1.1 V, particularly more positive than 1.2 V) can be used to obtain an image excellent in image preservability, particularly in ozone fastness.

The value of oxidation potential (Eox) can be easily measured by those skilled in the art. For this method, reference can be made to P. Delahay, "New Instrumental Methods in Electrochemistry", 1954, Interscience Publishers, A. J. Bard et al., "Electrochemical Methods", 1980, John Wiley & Sons, Akira Fujishima et al., "Denki Kagaku Sokuteiho (Electrochemical Measuring Methods)", 1984, Gihoudo Shuppansha, etc.

In some detail, the measurement of oxidation potential is carried out by dissolving the test specimen in a solvent such as dimethylformamide and acetonitrile containing a supporting electrolyte such as sodium perchlorate and tetrapropylammonium perchlorate in a concentration of from $1 \times 10^{-4}$ to $1 \times 10^{-6}$ mol/l, and then measuring the test solution for oxidation potential with respect to SCE (saturated calomel electrode) using cyclic voltammetry or DC polarography. This value may deviate by scores of millivolts due to the effect of difference in potential between solutions or resistivity of test solution, but the incorporation of a standard specimen (e.g., hydroquinone) makes it possible to assure the reproducibility of potential. In order to unequivocally define potential, the potential (vs SCE) measured in dimethylformamide containing 0.1 mol $dm^{-3}$ of tetrapropylammonium perchlorate as a supporting electrolyte (concentration of dye: 0.001 mol $dm^{-3}$) using DC polarography is defined as oxidation potential of dye.

The value of oxidation potential (Eox) indicates the transferability of electrons from the specimen to the electrode, and the greater this value is (the more positive the oxidation potential is), the more difficultly can be transferred electrons from the specimen to the electrode, i.e., the more difficultly can be oxidized the specimen.

The measure of ozone resistance is the residual ratio of dye (reflection density after storage/initial density×100) measured after 24 hours of storage in 5 ppm ozone atmosphere at the site where printing has been made such that the reflection density of the image is from 0.9 to 1.1 as measured through a status A filter. In the present invention, it is preferred that a dye having an oxidation potential of more positive than 1.0 V be used to provide a residual ratio of dye of 60% or more, more preferably 70% or more, particularly 80% or more. Further, the residual ratio of dye is preferably 25% or more, more preferably 40% or more, particularly 50% or more after 5 days of storage.

Examples of dyes having the aforesaid characteristics include phthalocyanine dyes (cyan dyes) and azo dyes (magenta dyes) having specific characteristics and structures. These dyes will be each described hereinafter.

The physical properties which are required for ink compositions, particularly phthalocyanine dyes to be used as ink for ink jet recording, are excellent light-resistance and small change of hue and surface conditions (little bronzing and dye deposition) besides the aforesaid ozone resistance.

Referring to light-resistance, it is preferred that the residual ratio of dye (reflection density after irradiation/initial density×100) measured after 3 days of irradiation with xenon light (Xe: 1.1 W/m (intermittent)) through TAC filter at the site on an image printed on a PM photographic image-receiving paper produced by EPSON Co., Ltd. where the reflection density OD is 1.0 be 90% or more. Further, the residual ratio of dye after 14 days of irradiation is preferably 85% or more.

The measure of change of hue and surface conditions is the amount of Cu ions present as phthalate after the decomposition of phthalocyanine dye. The amount of Cu compounds present on the actual print is preferably predetermined to be 10 mg/m² or less as calculated in terms of Cu ion. Referring to the amount of Cu ions to be eluted from the print, the amount of Cu ions to be eluted with water from a solid image containing Cu compounds in an amount of 20 mg/m² or less as calculated in terms of Cu ion which has been stored in 5 ppm ozone atmosphere for 24 hours to undergo ozone fading is preferably 20% or less. All Cu compounds are trapped by the image-receiving material before fading.

A phthalocyanine dye having the aforesaid physical properties is obtained by 1) raising the oxidation potential, 2) enhancing the associatiability, 3) introducing an association-accelerating group or strengthening hydrogen bond during π-π stacking, 4) avoiding the introduction of substituents in α-position, i.e., facilitating stacking, or by other methods.

The structural characteristic of the phthalocyanine dye to be used in the ink composition of the invention is that a phthalocyanine dye the number and position of substituents on which can be predetermined is used while the phthalocyanine dye which has been used in the related art inks is a mixture the number and position of substituents on which cannot be predetermined because it is derived by sulfonation of unsubstituted phthalocyanine. A first structural characteristic is that the phthalocyanine dye of the present invention is a phthalocyanine dye obtained without sulfonation of unsubstituted phthalocyanine. A second structural characteristic is introduction of electron-withdrawing group into β-position of benzene rings of phthalocyanine, particularly into all benzene rings. In some detail, those substituted on sulfonyl group (Japanese Patent Application No. 2001-47013, Japanese Patent Application No. 2001-190214), those substituted on all sulfamoyl groups (Japanese Patent Application No. 2001-24352, Japanese Patent Application No. 2001-189982), those substituted on heterocyclic sulfamoyl group (Japanese Patent Application No. 2001-96610, Japanese Patent Application No. 2001-190216), those substituted on heterocyclic sulfonyl group (Japanese Patent Application No. 2001-76689, Japanese Patent Application No. 2001-190215), those substituted on specific sulfamoyl group (Japanese Patent Application No. 2001-57063), those substituted on carbonyl group (Japanese Patent Application No. 2002-012869), and those having specific substituents for enhancing solubility and ink stability and preventing bronzing are preferred, and in more detail, those having asymmetric carbon (Japanese Patent Application No. 2002-012868) and those in the form of Li salt (Japanese Patent Application No. 2002-012864) are useful.

Further, a first physical characteristic of the phthalocyanine dye of the present invention is that it has a high oxidation potential (more positive than 1.0 V). A second physical characteristic of the phthalocyanine dye of the present invention is that the phthalocyanine dye of the present invention has a strong associatiability. Specific examples of such a phthalocyanine dye include those having a specified associatiability of oil-soluble dye (Japanese Patent Application No. 2001-64413), and those having a specified associatiability of water-soluble dye (Japanese Patent Application No. 2001-117350).

Referring to the relationship between the number and properties (ink absorbance) of associatiable groups, the introduction of associatiable groups makes it more likely that the drop of absorbance can occur and λmax can appear in shorter wavelength range even in a dilute solution. Further, referring to the relationship between the number and properties (reflection density OD on PM920 image-receiving paper produced by EPSON CO., LTD.) of associatiable groups, the more the number of associatiable groups is, the lower is the reflection density OD at the same ion intensity. In other words, it is thought that association proceeds on the image-receiving paper. Referring to the relationship between the number and properties (ozone resistance, light-resistance) of associatiable groups, the more the number of associatiable groups is, the better is ozone resistance. A dye having many associatiable groups tends to have improved light-resistance as well. In order to provide ozone resistance, it is necessary that the benzene rings of phthalocyanine be provided with substituents. Since there is a trade-off relation between reflection density OD and fastness, it is necessary that light-resistance be raised without weakening associatiability.

Preferred embodiments of the cyan ink of the present invention comprising a phthalocyanine dye having the aforesaid characteristics are as follows.

1) Cyan ink having a residual ratio of dye of 90% or more as measured after 3 days of irradiation with xenon light (Xe: 1.1 W/m (intermittent)) through TAC filter at the site on an image printed on a PM photographic image-receiving paper produced by EPSON Co., Ltd. where the reflection density OD is 1.0.
2) Cyan ink having a residual ratio of dye of 60% or more (preferably 80% or more) as measured after 24 hours of storage in 5 ppm ozone atmosphere at the site where printing has been made such that the reflection density of the image is from 0.9 to 1.1 as measured through a status A filter.
3) Cyan ink which allows Cu ions to be eluted with water in an amount of 20% or less based on the total amount of dyes after ozone fading under the conditions of Clause 2.
4) Cyan ink which can penetrate a specific image-receiving paper to a depth of up to 30% or more of the upper portion of image-receiving layer.

The phthalocyanine dye to be incorporated in the ink composition of the present invention is preferably a phthalocyanine dye represented by the aforesaid general formula (C-I).

A phthalocyanine dye has been known as a fast dye but is known to have a poor fastness to ozone gas when used as an ink jet recording dyestuff. In the present invention, in order to reduce the reactivity with ozone, which is an electrophilic agent, the oxidation potential of the phthalocyanine dye can be made more positive than 1.0 V (vs SCE) to enhance the fastness to ozone gas.

In connection with the structure of compound, the oxidation potential of the phthalocyanine dye can be made more positive by introducing an electrophilic group and more negative by introducing an electron-do native group. In the present invention, in order to reduce the reactivity with ozone, which is an electrophilic agent, it is preferred that an electrophilic group be introduced into the phthalocyanine skeleton to make the oxidation potential more positive. It can be thus said that the use of Hammett's substituent constant σp value, which is a measure of the electrophilicity or electron-donating properties of substituents, makes it possible to introduce a substituent having a great σp value such as sulfinyl group, sulfonyl group and sulfamoyl group so that the oxidation potential is made more positive.

For the reason of potential adjustment, too, a phthalocyanine dye represented by the aforesaid general formula (C-I) is preferably used.

A phthalocyanine dye having the aforesaid oxidation potential is a cyan dye excellent in ozone resistance as well as in light-resistance and thus satisfies the aforesaid requirements for light-resistance and ozone resistance.

The compound represented by the general formula (C-I), which is a phthalocyanine dye that is preferably used in the present invention, will be described hereinafter.

In the general formula (C-I), $X_1$, $X_2$, $X_3$ and $X_4$ each independently represent —SO-Z, —SO$_2$-Z, —SO$_2$NR$_1$R$_2$, sulfo group, —CONR$_1$R$_2$ or —CO$_2$R$_1$. Preferred among these substituents are —SO-Z, —SO$_2$-Z, —SO$_2$NR$_1$R$_2$, and —CONR$_1$R$_2$, particularly —SO$_2$-Z and —SO$_2$NR$_1$R$_2$, most preferably —SO$_2$-Z. Herein, in the case where any one of $a_1$ to $a_4$, which means the number of substituents, represents a number of 2 or more, $X_1$ to $X_4$, if they are plural, may be the same or different and each independently represent any of the aforesaid groups. Further, $X_1$, $X_2$, $X_3$ and $X_4$ may be the same substituent or may all be the same type but partially different substituents such as —SO$_2$-Z in which Z is different among $X_1$ to $X_4$ or maybe different substituents, e.g., —SO$_2$-Z and —SO$_2$NR$_1$R$_2$.

The aforesaid groups Z each independently represent substituted or unsubstituted alkyl group, substituted or unsubstituted cycloalkyl group, substituted or unsubstituted alkenyl group, substituted or unsubstituted aralkyl group, substituted or unsubstituted aryl group and substituted or unsubstituted heterocyclic group. Preferred among these groups are substituted or unsubstituted alkyl group, substituted or unsubstituted aryl group and substituted or unsubstituted heterocyclic group, and most preferred among these groups are substituted alkyl group, substituted aryl group and substituted heterocyclic group.

The aforesaid groups $R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group. Preferred among these groups are hydrogen atom, substituted or unsubstituted alkyl group, substituted or unsubstituted aryl group and substituted or unsubstituted heterocyclic group, and more preferred among these groups are hydrogen atom, substituted alkyl group, substituted aryl group and substituted heterocyclic group. However, it is not preferred that $R_1$ and $R_2$ are a hydrogen atom at the same time.

The substituted or unsubstituted alkyl group represented by $R_1$, $R_2$ and Z is preferably a $C_1$-$C_{30}$ alkyl group. Particularly from the reason of enhancement of dye solubility or ink stability, the alkyl group is preferably branched, and it is particularly preferred that the alkyl group have asymmetric carbons (used in racemate form). Examples of the substituents on the alkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkyl group may have a halogen atom or ionic hydrophilic group. The number of carbon atoms in the alkyl group doesn't include that of carbon atoms in the substituents. This can apply to other groups.

The substituted or unsubstituted cycloalkyl group represented by $R_1$, $R_2$ and Z is preferably a $C_5$-$C_{30}$ cycloalkyl group. Particularly from the reason of enhancement of dye solubility or ink stability, it is particularly preferred that the cycloalkyl group have asymmetric carbons (used in racemate form). Examples of the substituents on the cycloalkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the cycloalkyl group may have a halogen atom or ionic hydrophilic group.

The substituted or unsubstituted alkenyl group represented by $R_1$, $R_2$ and Z is preferably a $C_2$-$C_{30}$ alkenyl group. Particularly from the reason of enhancement of dye solubility or ink stability, the alkenyl group is preferably branched. It is particularly preferred that the alkenyl group have asymmetric carbons (used in racemate form). Examples of the substituents on the alkenyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the alkenyl group may have a halogen atom or ionic hydrophilic group.

The substituted or unsubstituted aralkyl group represented by $R_1$, $R_2$ and Z is preferably a $C_7$-$C_{30}$ aralkyl group. Particularly from the reason of enhancement of dye solubility or ink stability, the aralkyl group is preferably branched. It is particularly preferred that the aralkyl group have asymmetric carbons (used in racemate form). Examples of the substituents on the aralkyl group include those listed with reference to the case where Z, $R_1$, $R_2$, $Y_1$, $Y_2$, $Y_3$ and $Y_4$ are able to have further substituents as described later. Particularly preferred among these substituents are hydroxyl group, ether group, ester group, cyano group, amide group and sulfonamide group because they enhance the association of dyes and hence the fastness thereof. Alternatively, the aralkyl group may have a halogen atom or ionic hydrophilic group.

The substituted and unsubstituted aryl group represented by $R_1$, $R_2$ or Z is preferably a $C_6$-$C_{30}$ aryl group. Examples of the substituents on the aryl group include those listed with reference to the case where Z, $R_1$, $R_2$, $Y_1$, $Y_2$, $Y_3$ and $Y_4$ are able to have further substituents as described later. In particular, en electron-withdrawing group is preferred because it causes the oxidation potential of the dye to be higher and thus enhances the fastness thereof. Examples of the electron-withdrawing group include those having a positive Hammett's substituent constant σp value. Preferred examples of the electron-withdrawing group include halogen atom, heterocyclic group, cyano group, carboxyl group, acylamino group, sulfonamide group, sulfamoyl group, carbamoyl group, sulfonyl group, imide group, acyl group, sulfo group, and quaternary ammonium group. More preferred among these electron-withdrawing groups are cyano group, carboxyl group, sulfamoyl group, carbamoyl group, sulfonyl group, imide group, acyl group, sulfo group, and quaternary ammonium group.

The heterocyclic group represented by $R_1$, $R_2$ and Z is preferably a 5- or 6-membered heterocyclic group which may be further condensed. The heterocyclic group may be an aromatic heterocyclic group or non-aromatic heterocyclic group. The heterocyclic group represented by $R_1$, $R_2$ and Z will be exemplified in the form of heterocyclic ring with its substitution position omitted, but the substitution position is not limited and, for example, pyridine may have substituents on the 2-, 3- or 4-position. Examples of the heterocyclic ring include pyridine, pyrazine, pyrimidine, pyridazine, triazine, quinoline, isoquinoline, quinazoline, cinnoline, phthaladine, quinoxaline, pyrrole, indole, furane, benzofurane, thiophene, benzothiophene, pyrazole, imidazole, benzimidazole, triazole, oxazole, benzoxaole, thiazole, benzothiazole, isothiazole, benzisothiazole, thiadiazole, isooxazole, benzisooxazole, pyrrolidine, piperidine, piperazine, imidazolidine, and thiazoline. In particular, aromatic heterocyclic groups are preferred. Preferred examples of the aromatic heterocyclic groups include pyridine, pyrazine, pyrimidine, pyridazine, triazine, pyrazole, imidazole, benzimidazole, triazole, thiazole, benzothiazole, isothiazole, benzisothiazole, and thiadiazole. These aromatic heterocyclic groups may have substituents, and examples of the substituents on the aromatic heterocyclic group include those listed with reference to the case where Z, $R_1$, $R_2$, $Y_1$, $Y_2$, $Y_3$ and $Y_4$ are able to have further substituents as described later. Preferred examples of the substituents include those listed with reference to the aforementioned aryl group, and even more desirable examples of the substituents include those listed with reference to the aforementioned aryl group.

Y$_1$, Y$_2$, Y$_3$ and Y$_4$ each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, acylamino group, arylamino group, ureido group, sulfamoyl group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonyl amino group, imide group, heterocyclic thio group, phosphoryl group, acyl group, carboxyl group or sulfo group which may further have substituents.

Preferred among these groups are hydrogen atom, halogen atom, alkyl group, aryl group, cyano group, alkoxy group, amide group, ureido group, sulfonamide group, carbamoyl group, sulfamoyl group, alkoxycarbonyl group, carboxyl group and sulfo group, particularly hydrogen atom, halogen atom, cyano group, carboxyl group and sulfo group, most preferably hydrogen atom.

In the case where Z, R$_1$, R$_2$, Y$_1$, Y$_2$, Y$_3$ and Y$_4$ may further have substituents, they may further have the following substituents.

Examples of the substituents on Z, R$_1$, R$_2$, Y$_1$, Y$_2$, Y$_3$ and Y$_4$ include C$_1$-C$_{12}$ straight-chain or branched alkyl group, C$_7$-C$_{18}$ straight-chain or branched aralkyl group, C$_2$-C$_{12}$ straight-chain or branched alkenyl group, C$_2$-C$_{12}$ straight-chain or branched alkinyl group, C$_3$-C$_{12}$ straight-chain or branched cycloalkyl group, C$_3$-C$_{12}$ straight-chain or branched cycloalkenyl group (These groups each preferably have branches for the reason of dye solubility and ink stability. It is particularly preferred that these groups have asymmetric carbons. Specific examples of these groups include methyl group, ethyl group, propyl group, isopropyl group, sec-butyl group, t-butyl group, 2-ethylhexyl group, 2-methylsulfonylethyl group, 3-phenoxypropyl group, trifluoromethyl group, and cyclopentyl group), halogen atom (e.g., chlorine atom, bromine atom), aryl group (e.g., phenyl group, 4-t-butylphenyl group, 2,4-di-t-amylphenyl group), heterocyclic group (e.g., imidazolyl group, pyrazolyl group, triazolyl group, 2-furyl group, 2-chenyl group, 2-pyrimidinyl group, 2-benzothiazolyl group), cyano group, hydroxyl group, nitro group, carboxy group, amino group, alkyloxy group (e.g., methoxy group, ethoxy group, 2-methoxyethoxy group, 2-methanesulfohykethoxy group), aryloxy group (e.g., phenoxy group, 2-methylphenoxy group, 4-t-butylphenoxy group, 3-nitrophenoxy group, 3-t-butyloxycarbamoylphenoxy group, 3-methoxycarbamoyl group), acylamino group (e.g., acetamide group, benzamide group, 4-(3-t-butyl-4-hydroxyphenoxy)butanamide group), alkylamino group (e.g., methylamino group, butylamino group, diethylamino group, methylbutylamino group), anilino group (e.g., phenylamino group, 2-chloroanilino group), ureido group (e.g., phenylureido group, methylureido group, N,N-dibutylureido group), sulfamoylamino group (e.g., N,N-dipropylsulfamoyl amino group), alkylthio group (e.g., methylthio group, octylthio group, 2-phenoxyethylthio group), arylthio group (e.g., phenylthio group, 2-butoxy-5-t-octylphenylthio group, 2-carboxyphenylthio group), alkyloxy carbonylamino group (e.g., methoxycarbonylamino group), sulfonamide group (e.g., methanesulfonamide group, benzenesulfonamide group, p-toluenesulfonamide group), carbamoyl group (e.g., N-ethylcarbamoyl group, N,N-dibutylcarbamoyl group), sulfamoyl group (e.g., N-ethylsulfamoyl group, N,N-dipropyl sulfamoyl group, N-phenylsulfamoyl group), sulfonyl group (e.g., methanesulfonyl group, octanesulfonyl group, benzenesulfonyl group, toluenesulfonyl group), alkyloxycarbonyl group (e.g., methoxycarbonyl group, butyloxycarbonyl group), heterocyclic oxy group (e.g., 1-phenyltetrazole-5-oxy group, 2-tetrahydropyranyloxy group), azo group (e.g., phenylazo group, 4-methoxyphenylazo group, 4-pivaloylaminophenylazo group, 2-hydroxy-4-propanoylphenylazo group), acyloxy group (e.g., acetoxy group), carbamoyloxy group (e.g., N-methylcarbamoyloxy group, N-phenylcarbamoyloxy group), silyloxy group (e.g., trimethylsilyloxy group, dibutylmethylsilyloxy group), aryloxycarbonylamino group (e.g., phenoxycarbonylamino group), imide group (e.g., N-succinimide group, N-phthalimide group), heterocyclic thio group (e.g., 2-benzothiazolylthio group, 2,4-di-phenoxy-1,3,5-triazole-6-thio group, 2-pyridylthio group), sulfinyl group (e.g., 3-phenoxypropylsulfinyl group), phosphonyl group (e.g., phenoxyphosphonyl group, octyloxyphosphonyl group, phenylphosphonyl group), aryloxycarbonyl group (e.g., phenoxycarbonyl group), acyl group (e.g., acetyl group, 3-phenylpropanoyl group, benzoyl group), and ionic hydrophilic group (e.g., carboxyl group, sulfo group, phosphono group, quaternary ammonium group).

The phthalocyanine dye represented by the general formula (C-I), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group, and particularly preferred among these ionic hydrophilic groups are carboxyl group and sulfo group. The carboxyl group, phosphono group and sulfo group may be used in the form of salt, and examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkali metal salts, and particularly preferred among these counter ions is lithium salt because it enhances the dye solubility and hence the ink stability.

The number of ionic hydrophilic groups is preferably at least 2 per molecule of phthalocyanine-based dye, and it is particularly preferred that there be contained at least two sulfo groups and/or carboxyl groups in the phthalocyanine-based dye.

The suffixes a$_1$ to a$_4$ and b$_1$ to b$_4$ represent the number of the substituents X$_1$ to X$_4$ and Y$_1$ to Y$_4$, respectively. The suffixes a$_1$ to a$_4$ each independently represent an integer of from 0 to 4, with the proviso that the suffixes a$_1$ to a$_4$ are not 0 at the same time. The suffixes b$_1$ to b$_4$ each independently represent an integer of from 0 to 4. When any of a$_1$ to a$_4$ and b$_1$ to b$_4$ is an integer of 2 or more, there are a plurality of any of X$_1$'s to X$_4$'s and Y$_1$'s to Y$_4$'s and they may be the same or different.

The suffixes a$_1$ and b$_1$ satisfy the equation a$_1$+b$_1$=4. In a particularly preferred combination, a$_1$ represents 1 or 2 while b$_1$ represents 3 or 2, and in the best combination, a$_1$ represents 1 while b$_1$ represents 3.

The combinations a$_2$ and b$_2$, a$_3$ and b$_3$, and a$_4$ and b$_4$ are similar to the combination of a$_1$ and b$_1$, and preferred examples of the combinations a$_2$ and b$_2$, a$_3$ and b$_3$, and a$_4$ and b$_4$ are also similar to that of the combination of a$_1$ and b$_1$.

M represents a hydrogen atom, metal element or oxide, hydroxide or halide thereof.

Preferred examples of M other than hydrogen atom include metal elements such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. Preferred examples of an oxide include VO, and GeO. Preferred examples of a hydroxide include $Si(OH)_2$, $Cr(OH)_2$, and $Sn(OH)_2$. Examples of a halide include AlCl, $SiCl_2$, VCl, $VCl_2$, VOCl, FeCl, GaCl, and ZrCl. Preferred among these metal elements are Cu, Ni, Zn, and Al, most preferably Cu.

Pc (phthalocyanine ring) may form a dimer (e.g., Pc-M-L-M-Pc) or trimer with L (divalent connecting group) interposed therebetween, and in this case, M's may be the same or different.

Preferred examples of the divalent connecting group represented by L include oxy group —O—, thio group —S—, carbonyl group —CO—, sulfonyl group —$SO_2$—, imino group —NH—, methylene group —$CH_2$—, and group formed by combining these groups.

Referring to preferred combination of substituents on the compound represented by the general formula (C-I), the compound of the general formula (C-I) preferably has various substituents at least one of which is one of the preferred groups listed above, and more preferably, more of the various substituents are the preferred groups listed above, and most preferably, all of the various substituents are the preferred groups listed above.

Further preferred among the phthalocyanine dyes represented by the general formula (C-I) is a phthalocyanine dye having the structure represented by the aforesaid general formula (C-II). The phthalocyanine dye represented by the general formula (C-II) of the present invention will be described in detail hereinafter.

In the aforesaid general formula (C-II), $X_{11}$ to $X_{14}$ and $Y_{11}$ to $Y_{18}$ have the same meaning as $X_1$ to $X_4$ and $Y_1$ to $Y_4$ in the general formula (C-I) and preferred examples of $X_{11}$ to $X_{14}$ and $Y_{11}$ to $Y_{18}$ are the same as those in the general formula (C-I). Further, M has the same meaning as M in the general formula (C-I) and preferred examples of M are the same as those in the general formula (C-I).

In the general formula (C-II), $a_{11}$ to $a_{14}$ each independently represent an integer of 1 or 2, and preferably, the sum of $a_{11}$, $a_{12}$, $a_{13}$ and $a_{14}$ is from not smaller than 4 to not greater than 6, and it is particularly preferred that $a_{11}$, $a_{12}$, $a_{13}$ and $a_{14}$ each are 1.

$X_{11}$, $X_{12}$, $X_{13}$ and $X_{14}$ may be the same substituent, or $X_{11}$, $X_{12}$, $X_{13}$ and $X_{14}$ each may be a substituent of the same kind but partially different, e.g., —$SO_2$-Z in which Z differs among $X_1$, $X_2$, $X_3$ and $X_4$, or $X_{11}$, $X_{12}$, $X_{13}$ and $X_{14}$ maybe different substituents, e.g., —$SO_2$-Z and —$SO_2NR_1R_2$.

Particularly preferred examples of the combination of substituents among the phthalocyanine dyes represented by the general formula (C-II) will be given below.

Preferably, $X_{11}$ to $X_{14}$ each independently represent —SO-Z, —$SO_2$-Z, —$SO_2NR_1R_2$ or —$CONR_1R_2$, particularly —$SO_2$-Z or —$SO_2NR_1R_2$, most preferably —$SO_2$-Z.

Z's each independently represent a substituted or unsubstituted alkyl group, substituted or unsubstituted aryl group or substituted or unsubstituted heterocyclic group, and most desirable among these groups are substituted alkyl group, substituted aryl and substituted heterocyclic group. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$R_1$ and $R_2$ each independently preferably represent a hydrogen atom, substituted or unsubstituted alkyl group, substituted or unsubstituted aryl group or substituted or unsubstituted heterocyclic group, particularly more preferably a hydrogen atom, substituted alkyl group, substituted aryl group or substituted heterocyclic group. However, it is not preferred that $R_1$ and $R_2$ each are a hydrogen atom at the same time. Particularly for the reason of enhancement of dye solubility or ink stability, it is preferred that the substituents have asymmetric carbons (used in racemate form). Further, for the reason of enhancement of association and hence fastness, it is preferred that the substituents have a hydroxyl group, ether group, ester group, cyano group, amide group or sulfonamide group incorporated therein.

$Y_{11}$ to $Y_{18}$ each independently preferably represent a hydrogen atom, halogen atom, alkyl group, aryl group, cyano group, alkoxy group, amide group, ureido group, sulfonamide group, carbamoyl group, sulfamoyl group, alkoxycarbonyl group, carboxyl group and sulfo group, particularly preferably hydrogen atom, halogen atom, cyano group, carboxyl group or sulfo group, most preferably hydrogen atom.

The suffixes $a_{11}$ to $a_{14}$ each independently preferably represent 1 or 2, and it is particularly preferred that $a_{11}$ to $a_{14}$ each be 1 at the same time.

M represents a hydrogen atom, metal element or oxide, hydroxide or halide thereof, particularly preferably Cu, Ni, Zn or Al, most preferably Cu.

The phthalocyanine dye represented by the general formula (C-II), if it is water-soluble, preferably has an ionic hydrophilic group. Examples of the ionic hydrophilic group include sulfo group, carboxyl group, phosphono group, and quaternary ammonium group. Preferred among these ionic hydrophilic groups are carboxyl group, phosphono group, and sulfo group, and particularly preferred among these ionic hydrophilic groups are carboxyl group and sulfo group. The carboxyl group, phosphono group and sulfo group may be used in the form of salt, and examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion). Preferred among these counter ions are alkali metal salts, and particularly preferred among these counter ions is lithium salt because it enhances the dye solubility and hence the ink stability.

The number of ionic hydrophilic groups is preferably at least 2 per molecule of phthalocyanine-based dye, and it is particularly preferred that there be contained at least two sulfo groups and/or carboxyl groups in the phthalocyanine-based dye.

Referring to preferred combination of substituents on the compound represented by the general formula (C-II) the compound of the general formula (C-II) preferably has various substituents at least one of which is one of the preferred groups listed above, and more preferably, more of the various substituents are the preferred groups listed above, and most preferably, all of the various substituents are the preferred groups listed above.

Referring to the chemical structure of the phthalocyanine dye according to the invention, it is preferred that at least one electron-withdrawing group such as sulfinyl group, sulfonyl group and sulfamoyl group be incorporated in each of four benzene rings in the phthalocyanine such that σp value of the substituents in the entire phthalocyanine skeleton totals not smaller than 1.6.

The Hammett's substituent constant σp value will be somewhat described hereinafter. Hammett's rule is an empirical rule which L. P. Hammett proposed in 1935 to quantitatively discuss the effect of substituents on the reaction or equilibrium of benzene derivatives, and the validity of this empirical rule has been widely accepted today. Substituent constants required in Hammett's rule are σp value and σm value, and these values are found in many general literatures, and for the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96-103, 1979 (Nankodo). In the present invention, these substituents are defined or described by Hammett's substituent constant σp, but this doesn't mean that the known values found in the aforementioned literatures are limited to certain substituents and it goes without saying that even if the values are unknown in literatures, they contain substituents which may fall within the defined range when measured according to Hammett's rule. Further, the compounds of the present invention contain those which are not benzene derivatives, and as a measure for indicating the electron effect of substituents there is used σp value regardless of substitution position. In the present invention, σp value is used in this sense.

The phthalocyanine derivative represented by the general formula (C-I) is normally a mixture of analogues which are unavoidably different in introduction sites of substituents Xn (n=1 to 4) and Ym (m=1 to 4) and introduced number of these substituents by synthesis method. Accordingly, the general formula of the phthalocyanine dye is mostly a statistically averaged representation of these analogous mixtures. In the present invention, it was found that the classification of these analogous mixtures into the following three classes gives a specific mixture which is particularly preferred. In other words, mixtures of phthalocyanine-based dye analogues represented by the general formula (C-I) or (C-II) are classified into the following three classes for definition.

(1) β-position substitution type: Phthalocyanine dye having a specific substituent on 2- and/or 3-position, 6- and/or 7-position, 10- and/or 11-position, or 14- and/or 15-position (2) α-position substitution type: Phthalocyanine dye having a specific substituent on 1- and/or 4-position, 5- and/or 8-position, 9- and/or 12-position, or 13- and/or 16-position (3) α,β-position mixed substitution type: Phthalocyanine dye having a specific substituent irregularly on 1- to 16-position In the present specification, in order to describe phthalocyanine dye derivatives having different structures (particularly different substitution positions), the aforementioned β-position substitution type, α-position substitution type and α,β-position mixed substitution type are used.

The phthalocyanine derivative to be used in the present invention can be synthesized by, e.g., methods described or cited in Shirai and Kobayashi, "Phthalocyanine—Chemistry and Function—", IPC Co., Ltd., pp. 1 to 62, C. C. Leznoff-A. B. P. Lever, "Phthalocyanines—Properties and Applications", VCH, pp. 1-54, etc. or analogous methods in combination.

The phthalocyanine compound represented by the general formula (C-I) to be used in the invention can be synthesized by, e.g., sulfonation reaction, sulfonylchloration reaction and amidation reaction of unsubstituted phthalocyanine compound as disclosed in WO00/17275, 00/08103, 00/08101 and 98/41853 and JP-A-10-36471. In this case, since sulfonation can occur on any position of the phthalocyanine nucleus, it is difficult to control the sulfonated number of substituents. Accordingly, when sulfo groups are incorporated under such a reaction condition, the position and number of sulfo groups incorporated in the reaction product cannot be predetermined, unavoidably giving a mixture of products having different numbers of substituents or substitution positions. Thus, since when this mixture is used as a starting material to synthesize the compound of the invention, an α,β-position mixed substitution type mixture comprising some compounds having different numbers of substituents or substitution positions is obtained as a compound of the present invention because the number of heterocyclic group-substituted sulfamoyl groups or the substitution position cannot be predetermined.

As previously mentioned, when many electrophilic groups such as sulfamoyl group are incorporated in the phthalocyanine nucleus, the phthalocyanine dye is provided with a more positive oxidation potential and hence an enhanced ozone fastness. When synthesized according to the aforementioned method, it is unavoidable that the reaction mixture contains a phthalocyanine dye having a small number of electrophilic groups incorporated therein, i.e., more negative oxidation potential. Accordingly, in order to enhance the ozone fastness of the phthalocyanine dye, a synthesis method capable of inhibiting the production of a compound having a more negative oxidation potential is preferably employed.

The phthalocyanine compound represented by the general formula (C-II) of the present invention can be derived from a tetrasulfophthalocyanine compound obtained by, e.g., reacting a phthalonitrile derivative (compounds) represented by the following general formula and/or a diiminoisoindoline derivative (compound Q) represented by the following general formula with a metal derivative represented by the general formula (M) or reacting a 4-sulfophthalocyanine derivative (compound R) represented by the following general formula with a metal derivative represented by the general formula (M)

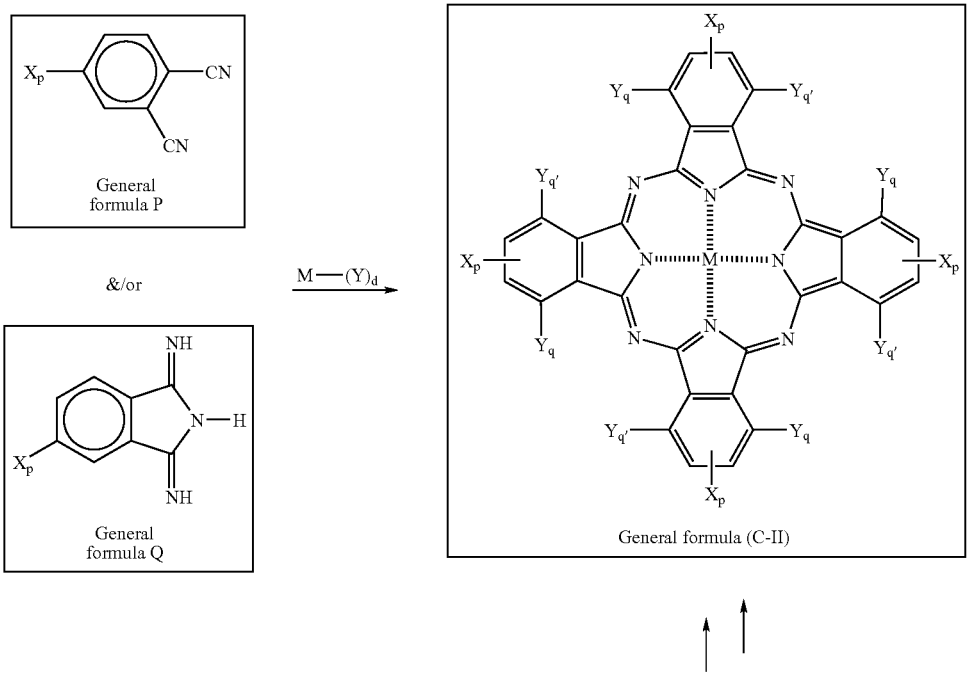

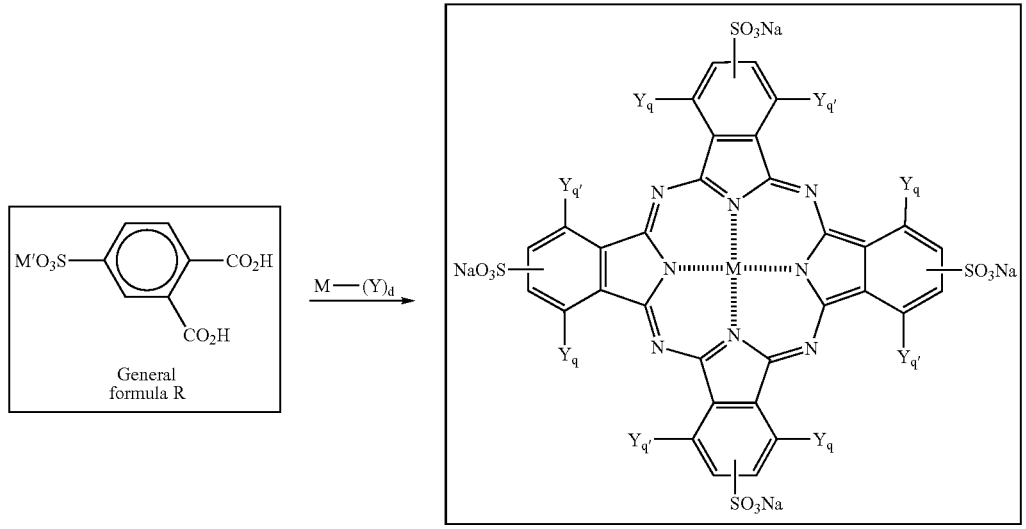

In these general formulae, Xp corresponds to $X_{11}$, $X_{12}$, $X_{13}$ or $X_{14}$ in the general formula (C-II). Yq and Yq' each correspond to $Y_{11}$, $Y_{12}$, $Y_{13}$, $Y_{14}$, $Y_{15}$, $Y_{16}$, $Y_{17}$ or $Y_{18}$ in the general formula (C-II). In the compound R, M' represents a cation.

Examples of the cation represented by M' include alkaline metal ions such as Li, Na and K ions or organic cations such as triethylammonium ion and pyridinium ion.

M–(Y)d      General formula (M):

wherein M is as defined in the general formulae (C-I) and (C-II); Y represents a monovalent or divalent ligand such as halogen atom, acetate anion, acetyl acetonate and oxygen; and d represents an integer of from 1 to 4.

In other words, when synthesized according to the aforementioned method, desired substituents can be incorporated by a predetermined number. In particular, in order to introduce many electrophilic groups to make the oxidation potential more positive as in the present invention, the aforementioned synthesis method can be used because it is extremely excellent as compared with the aforementioned method for synthesis of the phthalocyanine compound of the general formula (C-I).

The phthalocyanine compound represented by the general formula (C-II) thus obtained is a mixture of compounds represented by the following general formulae (a)-1 to (a)-4 which are isomeric with the substitution position on Xp, i.e., β-position substitution type mixture.

General formula (a)-1

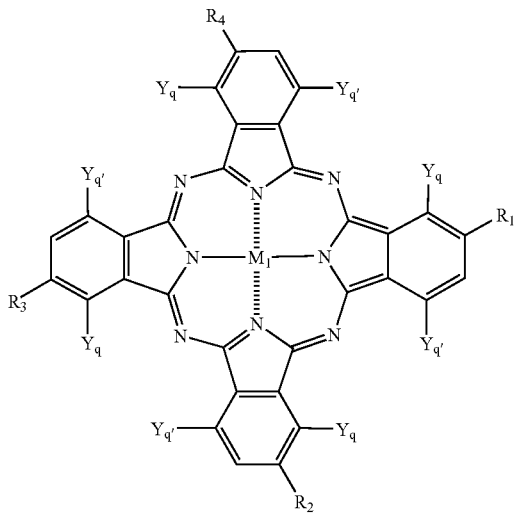

General formula (a)-2

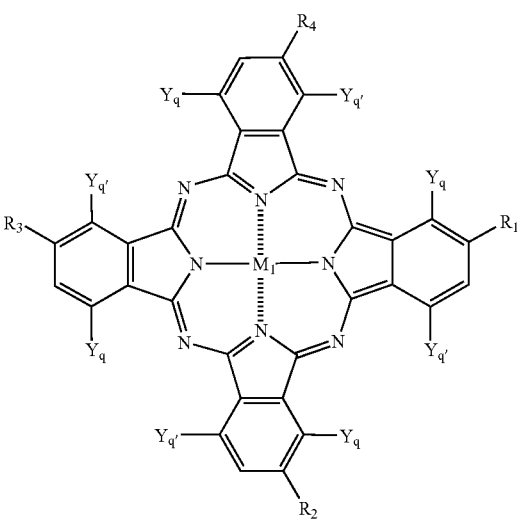

General formula (a)-3

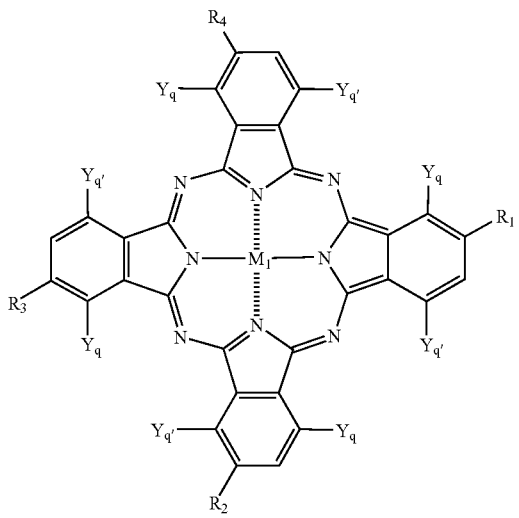

-continued

General formula (a)-4

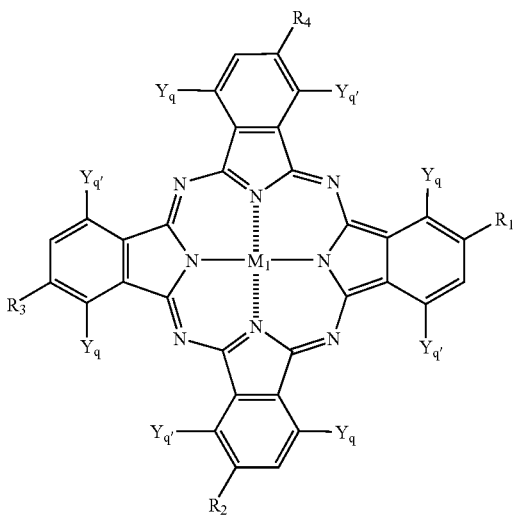

In the foregoing synthesis method, when the same compound is used as Xp, a β-position substitution type phthalocyanine dye wherein $X_{11}$, $X_{12}$, $X_{13}$ and $X_{14}$ are the same substituent can be obtained. On the contrary, when different materials are used in combination as Xp, a dye having substituents of the same kind but partially different or a dye having different substituents can be synthesized. Among the dyes of the general formula (C-II), these dyes having different electron-withdrawing substituents are particularly desirable because they can adjust the solubility and association of the dye, the age stability of the ink, etc.

In the present invention, it was found very important for the enhancement of fastness that any of these substitution types has an oxidation potential of more positive than 1.0 V (vs SCE). The degree of this effect could not be expected from the related art. Although its cause is not known in detail, a tendency was given that β-position substitution type is obviously better than α,β-position mixed substitution type in hue, light fastness, ozone gas fastness, etc.

Specific examples of the phthalocyanine dyes represented by the general formula (C-I) or (c-II) (exemplary compounds I-1 to I-12 and exemplary compounds 101 to 190) will be given below, but the phthalocyanine dye to be used in the present invention is not limited thereto.

Exemplary Compound
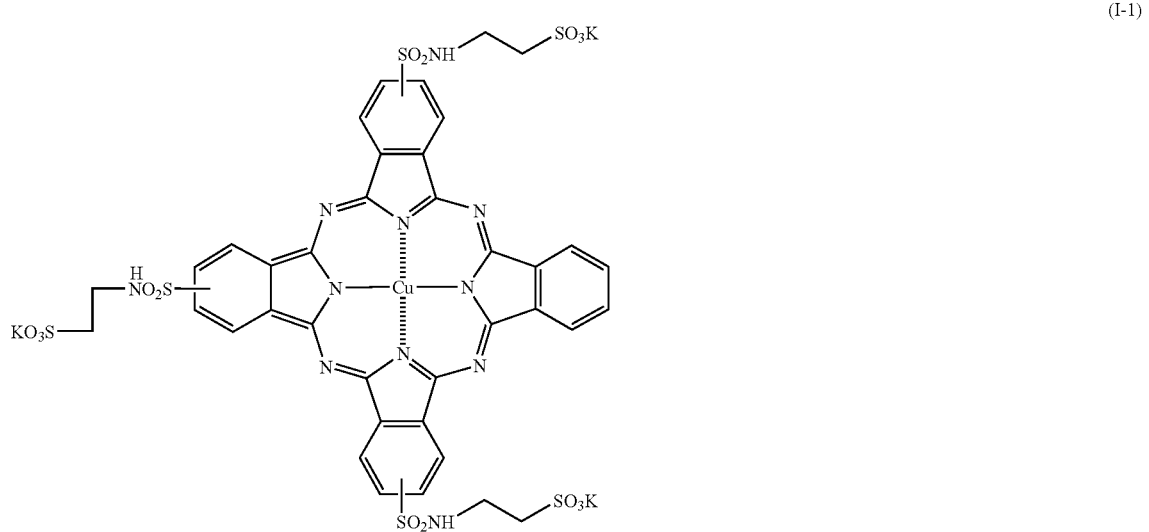
(I-1)
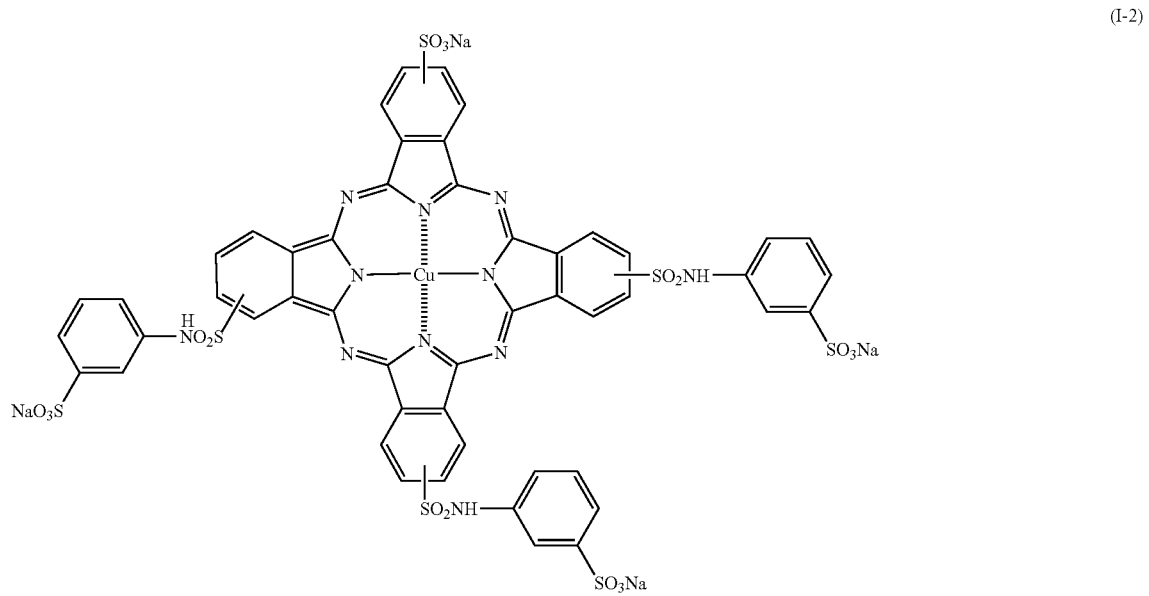
(I-2)

(I-3)
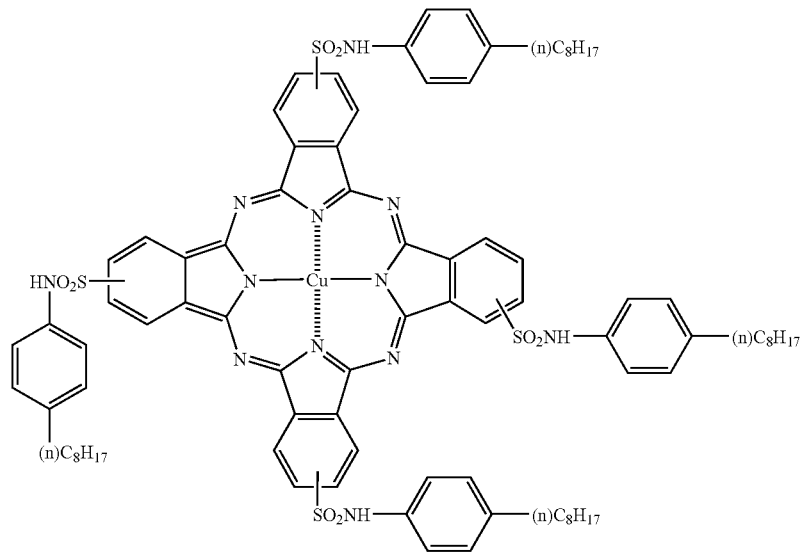
(I-4)
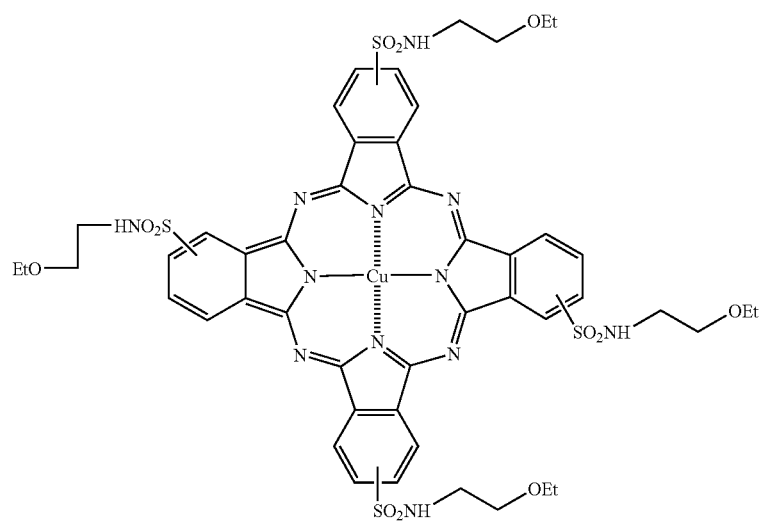

-continued
(I-5)
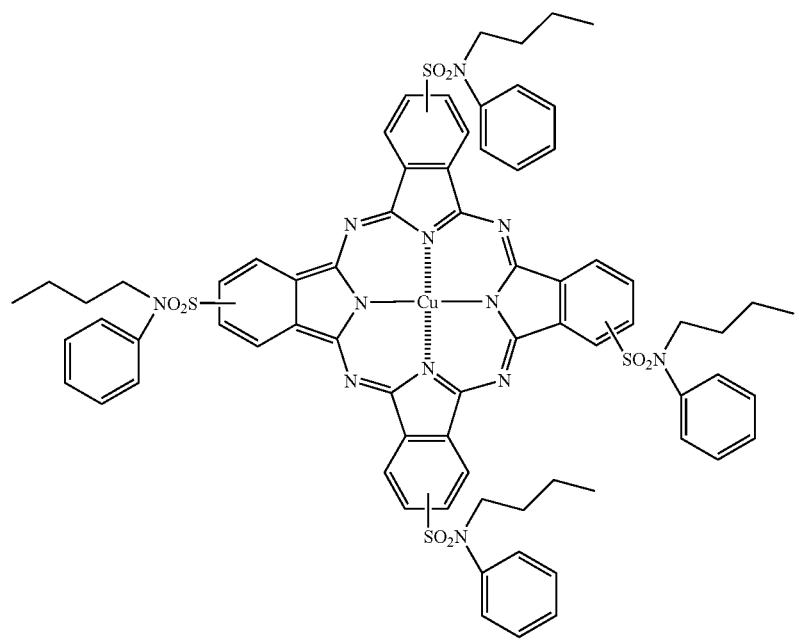
(I-6)
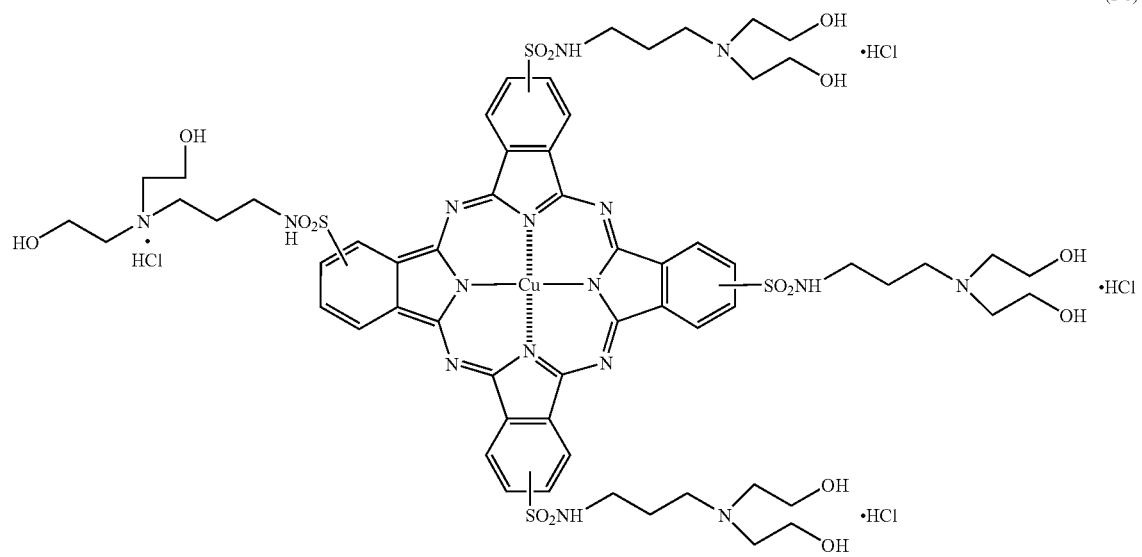

-continued
(I-7)
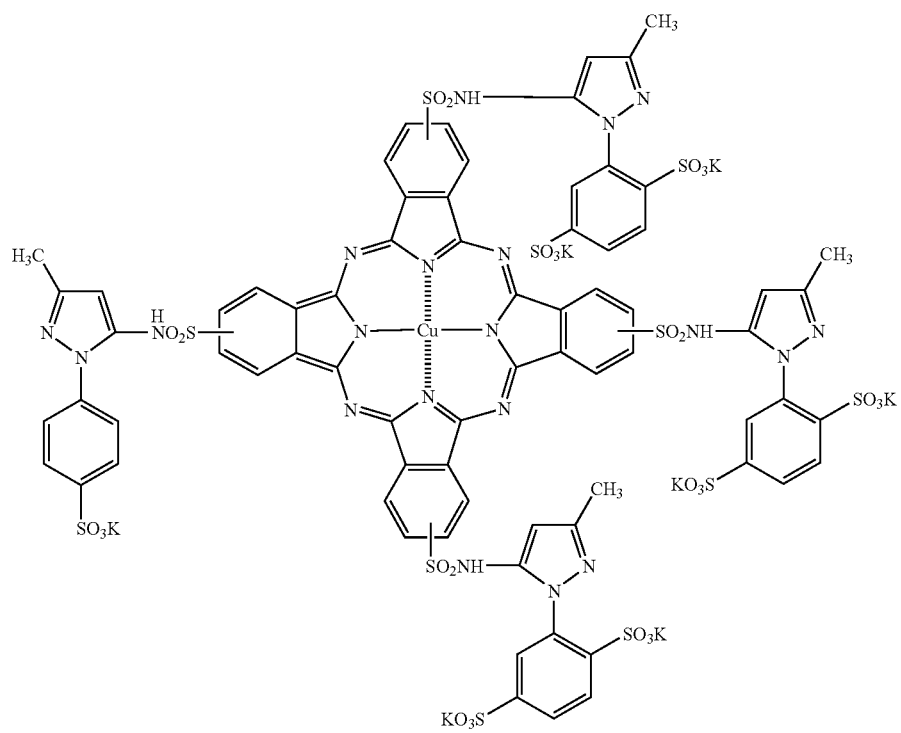
(I-8)
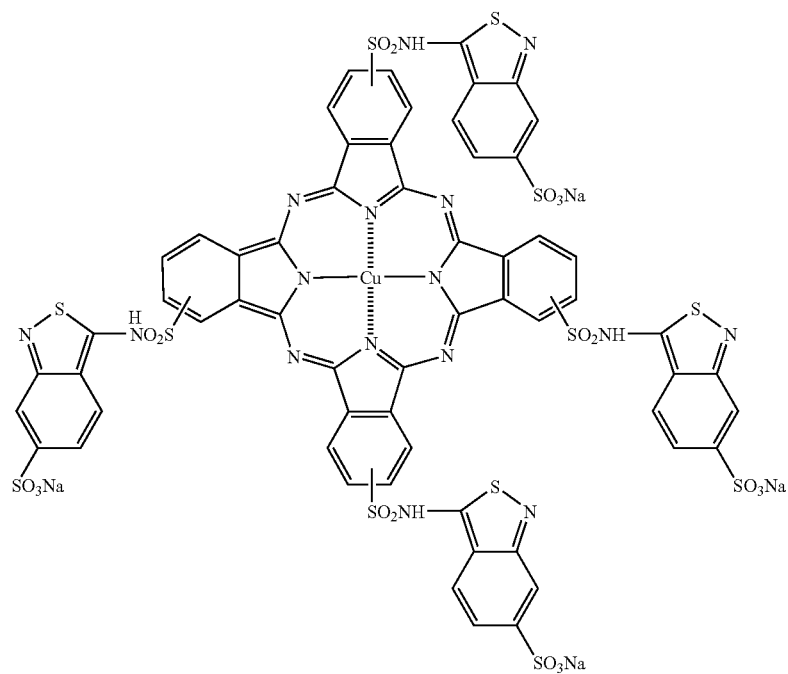

(I-9)
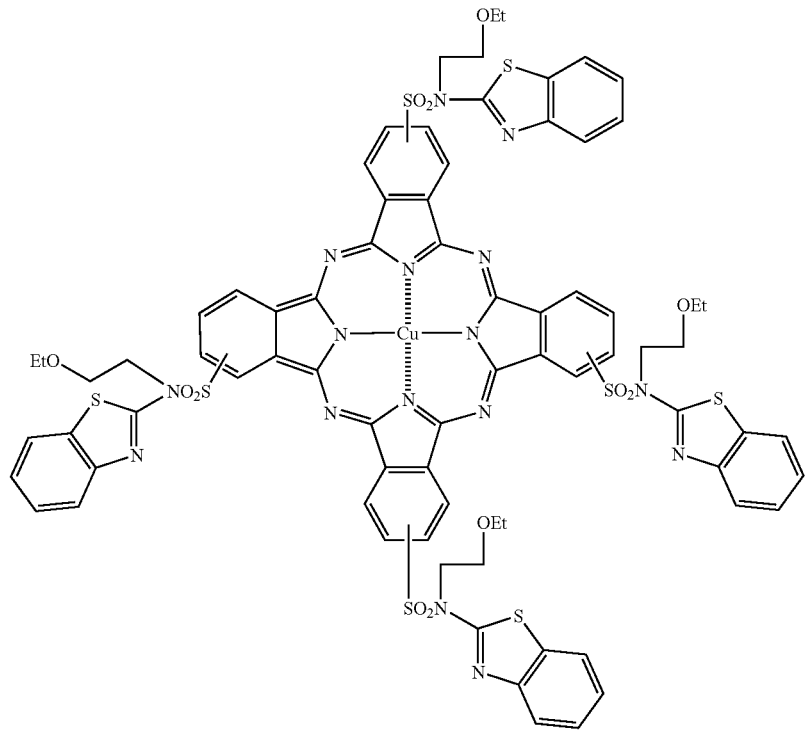
(I-10)
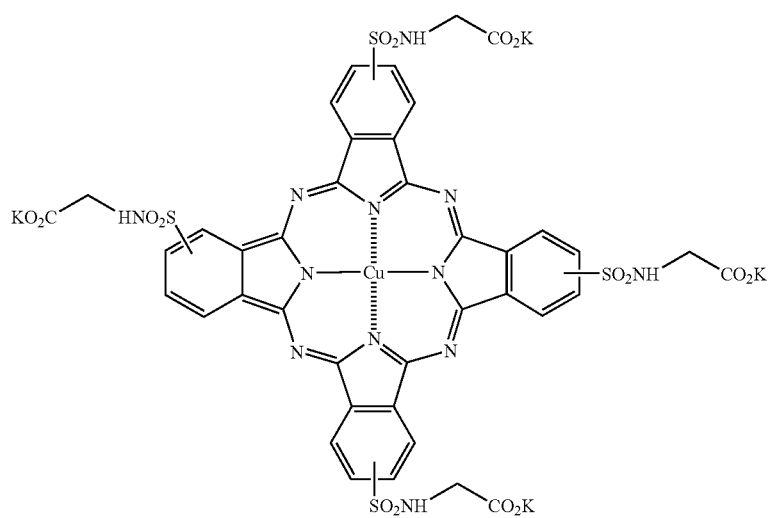

-continued
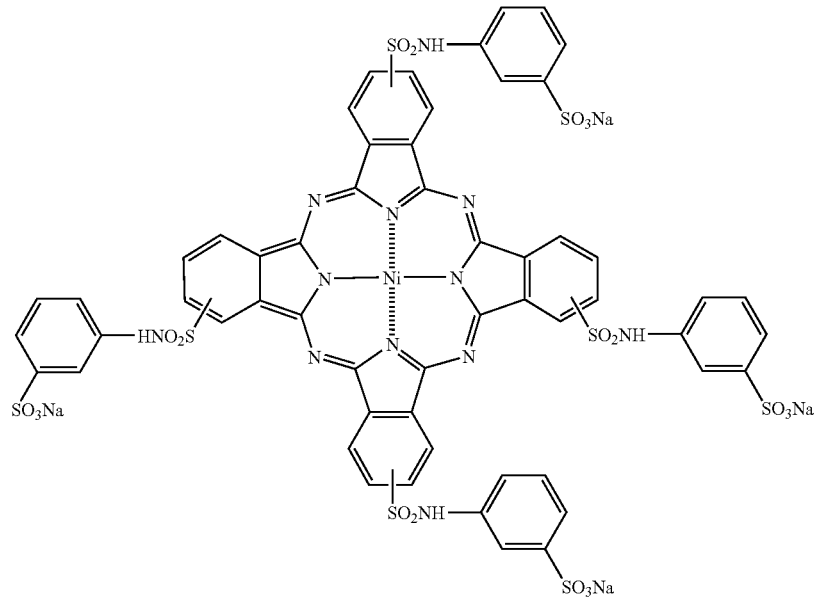
(I-11)
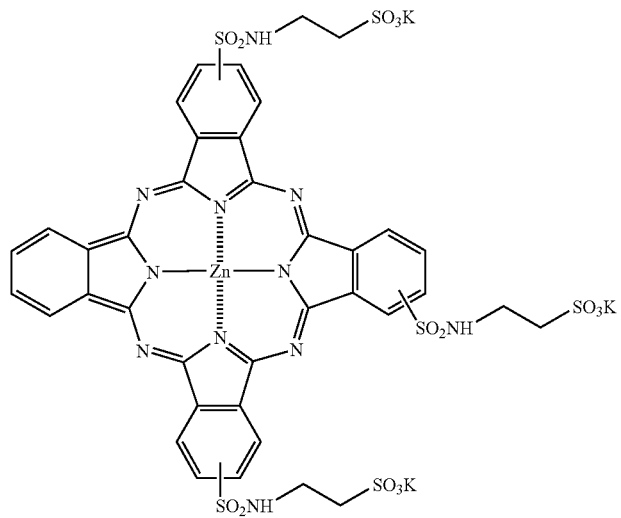
(I-12)

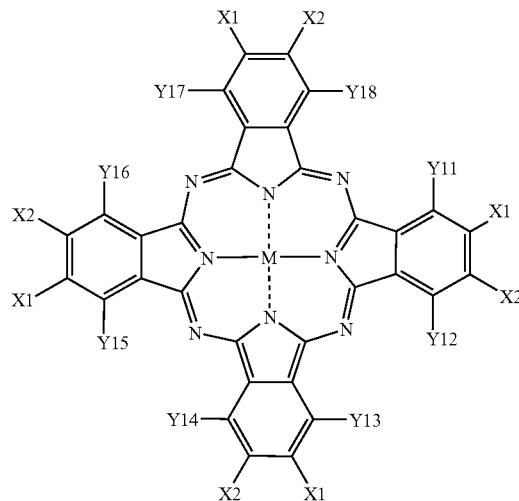

| No. | M | X1 | X2 | Y11, Y12 | Y13, Y14 | Y15, Y16 | Y17, Y18 |
|---|---|---|---|---|---|---|---|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |

In the table, specific examples of each combination of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) each independently are not in order.

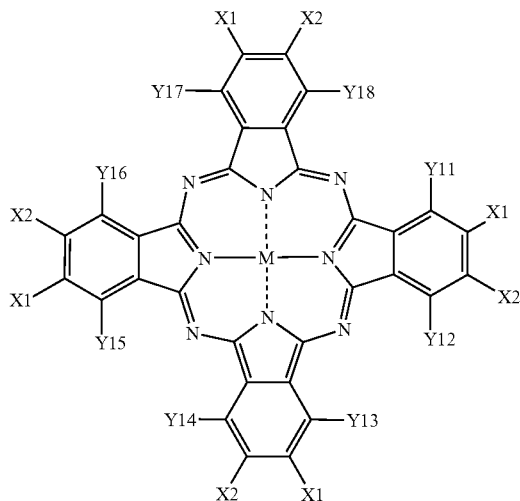

| No. | M | X1 | X2 |
|---|---|---|---|
| 111 | Cu | —SO₂—NH—CH₂—CH₂—CH₂—SO₂—NH—CH₂CH(OH)—SO₃Li | —H |
| 112 | Cu | —SO₂—NH—CH₂—CH₂—CH₂—SO₂NH—CH₂—CH(OH)—CH₃ | —SO₃Li |
| 113 | Cu | —SO₂—CH₂—CH(OH)—CH₂SO₃K | —H |
| 114 | Cu | —SO₂—CH₂—CH(OH)—CH₃ | —SO₃Li |
| 115 | Cu | —SO₂NH(CH₂)₃N⁺(CH₃)(CH₂CH₂OH)₂ · CH₃—C₆H₄—SO₃⁻ | —H |
| 116 | Cu | —CO—NH—CH₂—CH(OH)—CH₂SO₃K | —H |
| 117 | Cu | —CO—NH—CH(COOLi)—CH₂CH₂SO₃Li | —H |

| No. | Y11, Y12 | Y13, Y14 | Y15, Y16 | Y17, Y18 |
|---|---|---|---|---|
| 111 | —H, —H | —H, —H | —H, —H | —H, —H |
| 112 | —H, —H | —H, —H | —H, —H | —H, —H |
| 113 | —H, —H | —H, —H | —H, —H | —H, —H |
| 114 | —H, —H | —H, —H | —H, —H | —H, —H |
| 115 | —H, —H | —H, —H | —H, —H | —H, —H |
| 116 | —H, —H | —H, —H | —H, —H | —H, —H |
| 117 | —H, —H | —H, —H | —H, —H | —H, —H |

In the table, specific examples of each combination of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) each independently are not in order.

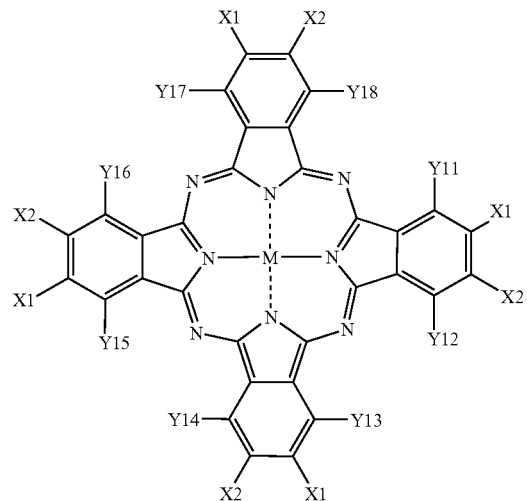

| No. | M | X1 | X2 | Y11, Y12 | Y13, Y14 | Y15, Y16 | Y17, Y18 |
|---|---|---|---|---|---|---|---|
| 118 | Cu | —SO$_2$CH$_2$CH$_2$CH(CH$_3$)(SO$_3$Li) | —H | —H, —H | —H, —H | —H, —H | —H, —H |
| 119 | Cu | —SO$_2$—CH$_2$—CH(OH)—CH$_2$—SO$_3$Na | —H | —H, —H | —H, —H | —H, —H | —H, —H |
| 120 | Cu | —SO$_2$—CH$_2$—CH$_2$—CH(CH$_3$)—COOLi | —H | —H, —H | —H, —H | —H, —H | —H, —H |
| 121 | Cu | —SO$_2$(CH$_2$)$_3$SO$_2$NHCH$_2$—CH(OH)—CH$_2$—SO$_3$Li | —H | —H, —H | —H, —H | —H, —H | —H, —H |
| 122 | Cu | —CO$_2$CH$_2$CH$_2$CH$_2$SO$_2$—NH—CH$_2$—CH(OH)—CH$_2$—SO$_3$Li | —H | —H, —H | —H, —H | —H, —H | —H, —H |
| 123 | Cu | —SO$_2$NH—C$_8$H$_{17}$(t) | —H | —H, —H | —H, —H | —H, —H | —H, —H |
| 124 | Cu | —SO$_2$—NH—CH$_2$—CH(CH$_2$CH$_3$)—CH$_2$CHCH$_2$—CH$_3$ | —H | —H, —H | —H, —H | —H, —H | —H, —H |

In the table, specific examples of each combination of ($X_1$, $X_2$), ($Y_{11}$, $Y_{12}$), ($Y_{13}$, $Y_{14}$,) ($Y_{15}$, $Y_{16}$) and ($Y_{17}$, $Y_{18}$) each independently are not in order.

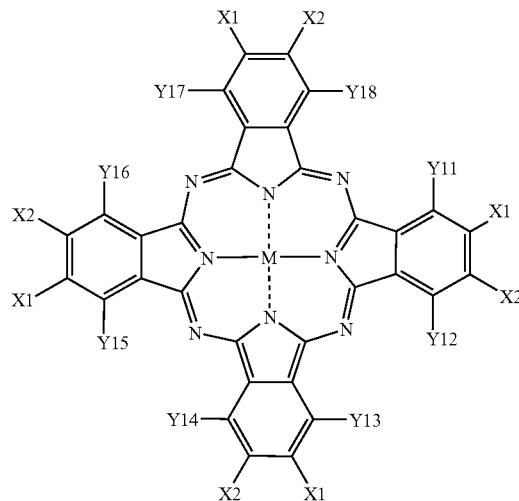

| No. | M | X1 | X2 | Y11, Y12 | Y13, Y14 | Y15, Y16 | Y17, Y18 |
|---|---|---|---|---|---|---|---|
| 125 | Cu | —SO$_2$CH$_2$CH$_2$CH$_2$SO$_2$—NH—CH$_2$—CH(CH$_3$)—CH$_2$—CH$_3$ | —H | —H, H | —H, —H | —H, —H | —H, —H |
| 126 | Cu | —SO$_2$—CH$_2$—CH$_2$—CH$_2$—CO$_2$—CH(CH$_3$)—CH$_2$—O—CH$_3$ | —H | —H, —H | —H, —H | —H, —H | —H, —H |
| 127 | Cu | —SO$_2$CH$_2$CH$_2$CH$_2$SO$_2$NHCH$_2$CH$_2$CH$_2$O—CH(CH$_3$)(CH$_3$) | —H | —H, —H | —H, —H | H, —H | —H, —H |
| 128 | Zn | —SO$_3$—CH$_2$—CH(O—CH$_3$)—CH$_2$—O—CH$_2$ | —CN | —H, —H | —H, —H | —H, —H | —H, —H |
| 129 | Cu | —CO—NH—CH$_2$—CH(CH$_2$CH$_3$)—CH$_2$—CH$_2$—CH$_2$CH$_3$ | —H | —Cl, —H | —Cl, —H | —Cl, —H | —Cl, —H |
| 130 | Cu | —CO$_2$—CH(CH$_3$)—CH$_2$—O—C$_4$H$_9$(t) | —H | —H, —H | —H, —H | —H, —H | —H, —H |
| 131 | Cu | —SO$_2$—CH$_2$—CH$_2$—CH(CH$_3$)—SO$_2$—NH—(2,5-(SO$_3$Li)$_2$C$_6$H$_3$) | —H | —H, —H | —H, —H | —H, —H | —H, —H |

In the table, specific examples of each combination of (X$_1$, X$_2$), (Y$_{11}$, Y$_{12}$), (Y$_{13}$, Y$_{14}$), (Y$_{15}$, Y$_{16}$) and (Y$_{17}$, Y$_{18}$) each independently are not in order.

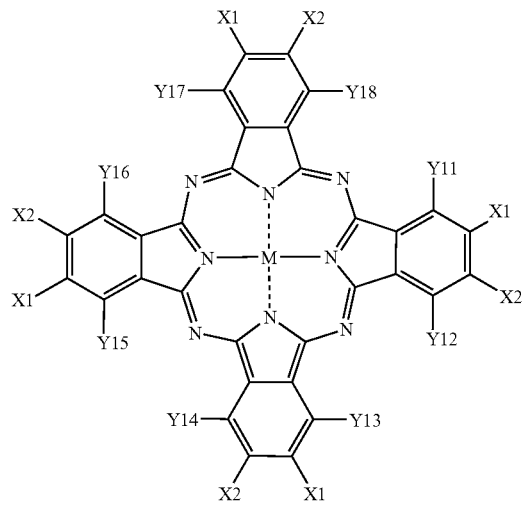
| No. | M | X1 | X2 | Y11, Y12 | Y13, Y14 | Y15, Y16 | Y17, Y18 |
|---|---|---|---|---|---|---|---|
| 132 | Cu | —SO₂NH—C₆H₃(CO₂C₆H₁₃(n))₂ | —H | —H, —H | —H, —H | —H, —H | —H, —H |
| 133 | Cu | —SO₂NH—C₆H₃(OCH₂CH₂OCH₃)(SO₂NHCH₂CH(C₂H₅)(C₄H₉)) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH—CH₃ | —H | —H, —H | —H, —H | —H, —H | —H, —H |
| 135 | Cu | —SO₂—C₆H₄—CO₂Na | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |
In the table, specific examples of each combination of $(X_1, X_2)$, $(Y_{11}, Y_{12})$, $(Y_{13}, Y_{14})$, $(Y_{15}, Y_{16})$ and $(Y_{17}, Y_{18})$ each independently are not in order.

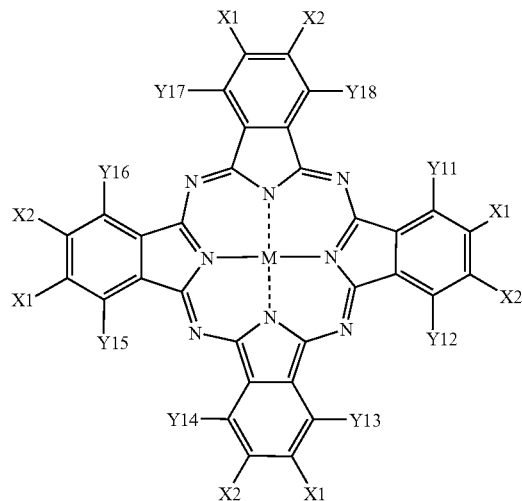

| No. | M | X1 | X2 | Y11, Y12 | Y13, Y14 | Y15, Y16 | Y17, Y18 |
|---|---|---|---|---|---|---|---|
| 137 | Cu | —SO$_2$-(benzothiazol-2-yl)-6-SO$_3$Li | —H | —H, —H | —H, —H | —H, —H | —H, —H |
| 138 | Cu | —SO$_2$NH-(3-methyl-1-(2-SO$_3$Li-5-LiO$_3$S-phenyl)pyrazol-5-yl) | —H | —H, —H | —H, —H | —H, —H | —H, —H |
| 139 | Cu | —SO$_2$(CH$_2$)$_3$—NH—C(=O)—(3,4-di-CO$_2$Li-phenyl) | —Cl | —H, —H | —H, —H | —H, —H | —H, —H |
| 140 | Cu | —CO$_2$—CH$_2$CH$_2$CH$_2$—NH—(4,6-bis(NH—CH$_2$—CH$_2$—CH(CH$_3$)—SO$_3$Li)-1,3,5-triazin-2-yl) | —H | —H, —H | —H, —H | —H, —H | —H, —H |

In the table, specific examples of each combination of (X$_1$, X$_2$), (Y$_{11}$, Y$_{12}$), (Y$_{13}$, Y$_{14}$), (Y$_{15}$, Y$_{16}$) and (Y$_{17}$, Y$_{18}$) each independently are not in order.

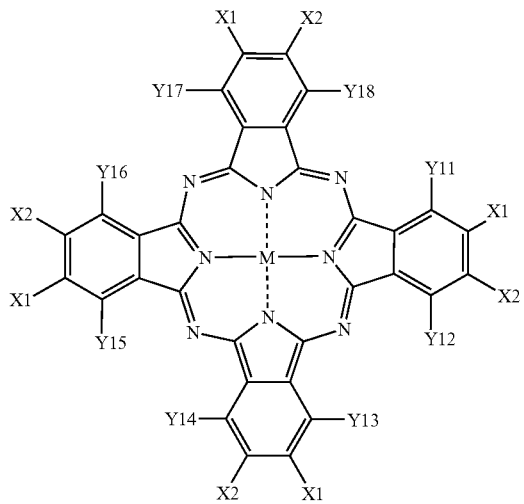

| No. | M | X1 | X2 | Y11, Y12 | Y13, Y14 | Y15, Y16 | Y17, Y18 |
|---|---|---|---|---|---|---|---|
| 141 | Cu | —SO$_2$NH—CH(COONa)—CH$_2$—CO—N—(CH$_2$CH$_2$OH)$_2$ | —H | —H, —H | —H, —H | —H, —H | —H, —H |
| 142 | Cu | —SO$_2$NH—C$_6$H$_4$—NHC(O)—C$_6$H$_4$—SO$_3$Li | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |
| 144 | Cu | —SO$_2$—CH$_2$CH$_2$CH$_2$—NH—CO—C$_6$H$_4$—CO—NH—CH(COOLi)—CH$_2$—COOLi | —H | —H, —H | —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H | —H, —H | —H, —H |

In the table, specific examples of each combination of ($X_1$, $X_2$), ($Y_{11}$, $Y_{12}$), ($Y_{13}$, $Y_{14}$), ($Y_{15}$, $Y_{16}$) and ($Y_{17}$, $Y_{18}$) each independently are not in order.

M-Pc $(Xp_1)_m(Xp_2)_n$ In the table, the introduction sites of the substituents (Xp1) and (Xp2) in the β-position substituents type are not in order.

| No. | M | Xp$_1$ (upper case) / Xp$_2$ (lower case) | m | n |
|---|---|---|---|---|
| 146 | Cu | —SO$_2$CH$_2$CH$_2$OCH$_2$CH$_2$OCH$_2$CH$_2$SO$_3$Li <br> —SO$_2$—NH—CH$_2$—CH(OH)—CH$_3$ | 3 | 1 |
| 147 | Cu | —SO$_2$—NH—CH$_2$—CH$_2$SO$_3$Li <br> —SO$_2$—NH—CH$_2$—CH$_2$—CH$_2$—SO$_2$—NH—CH$_2$—CH(OH)—CH$_3$ | 3 | 1 |

-continued

| No. | M | $Xp_1$ (upper case) / $Xp_2$ (lower case) | m | n |
|---|---|---|---|---|
| 148 | Cu | —$SO_2$—NH—$CH_2$—CH(CH$_3$)—$SO_3$Li<br>—$SO_2$NH—$CH_2$—$CH_2$—$CH_2$—$SO_2$—NH—$CH_2$—$CH_2$—O—$CH_2$—$CH_2$—OH | 3 | 1 |
| 149 | Cu | —$SO_2$—NH—$CH_2$—CH(CH$_3$)—$SO_3$Li<br>—$SO_2$—NH—$CH_2$—$CH_2$—$CH_2$—CO—N—($CH_2$—$CH_2$—OH)$_2$ | 2 | 2 |
| 150 | Cu | —$SO_2$—NH—$CH_2$—$CH_2$—$SO_2$—NH—$CH_2CH_2$—COONa<br>—$SO_2$NH—CH(CH$_3$)—$CH_2$OH | 3 | 1 |
| 151 | Cu | —$SO_2$—NH—C$_6$H$_4$—$SO_2$NH—$CH_2$—CH(OH)—$SO_3$Li<br>—$SO_2$NH—$CH_2$—$CH_2$—O—$CH_2$—$CH_2$—OH | 3 | 1 |

M-Pc $(Xp_1)_m(Xp_2)_n$ In the table, the introduction sites of the substituents (Xp1) and (Xp2) in the β-position substituents type are not in order.

| No. | M | $Xp_1$ (upper case)/ $Xp_2$ (lower case) | m | n |
|---|---|---|---|---|
| 152 | Cu | —$SO_2$—$CH_2$—$CH_2$—CH(CH$_3$)—$SO_3$Li<br>—$SO_2$—$CH_2$—$CH_2$—O—$CH_2$—$CH_2$—OH | 2.5 | 1.5 |
| 153 | Cu | —$SO_2$—$CH_2$—$CH_2$—CH(CH$_3$)—$SO_3$Na<br>—$SO_2$—$CH_2$—$CH_2$—$CH_2$—CO—N—($CH_2$—$CH_2$—OH)$_2$ | 2 | 2 |
| 154 | Cu | —$SO_2$—$CH_2$—$CH_2$—$CH_2$—$SO_3$Li<br>—$SO_2$—$CH_2$—$CH_2$—$CH_2$—$SO_2$—NH—$CH_2$—CH(OH)—$CH_3$ | 3 | 1 |
| 155 | Cu | —$SO_2$—$CH_2$—$CH_2$—$CH_2$—COOK<br>—$SO_2$—$CH_2$—$CH_2$—$CH_2$—$SO_2$—NH—$CH_2$—CH(OH)—$CH_2$—COOK | 2 | 2 |
| 156 | Cu | —$SO_2$—$CH_2$—$CH_2$—$CH_2$—$SO_3$Li<br>—$SO_2$—$CH_2$—CH(OH)—$CH_2$—$SO_3$Li | | |

| No. | M | Xp₁ (upper case)/ Xp₂ (lower case) | m | n |
|---|---|---|---|---|
| | | -continued | | |
| 157 | Cu | —SO₂—CH₂—CH₂—O—CH₂—CH₂—SO₃Li | | |
| | | —SO₂—CH₂—CH₂—CH₂—CO₂—CH₂—CH₂—CH(OH)—CH₂—COOK | | |

M-Pc (Xp₁)$_m$(Xp₂)$_n$ In the table, the introduction sites of the substituents (Xp1) and (Xp2) in the β-position substituents type are not in order.

| No. | M | Xp₁ (upper case) / Xp₂ (lower case) | m | n |
|---|---|---|---|---|
| 158 | Cu | —SO₂—CH₂—CH(OH)—CH₂SO₃Li | 3 | 1 |
| | | —SO₂—CH₂—C₆H₄—SO₂NH—CH₂—CH(OH)—CH₂—OH | | |
| 159 | Cu | —SO₂NHCH₂CH₂—SO₃Li | 3 | 1 |
| | | —SO₂—CH₂—CH₂—CH₂—SO₂—NH—CH₂—CH(OH)—CH₃ | | |
| 160 | Cu | —SO₂—CH₂—CH₂—O—CH₂—CH₂—O—CH₂—CH₂—SO₃Na | 3 | 1 |
| | | —SO₂—CH₂—CH₂—CH₂—CO—N(CH₂—CH₂—COONa)—CH₂—COONa | | |
| 161 | Cu | —SO₂CH₂CH₂CH₂SO₃Li | 3 | 1 |
| | | —SO₂CH₂CH₂CH₂SO₂NHCH₂—CH(OH)—CH₂SO₃Li | | |
| 162 | Cu | —SO₂CH₂CH₂CH₂SO₃Li | 2 | 2 |
| | | —SO₂CH₂CH₂OCH₂CH₂OCH₂CH₂OH | | |
| 163 | Cu | —SO₂CH₂CH₂CH₂SO₃K | 3 | 1 |
| | | —SO₂CH₂CH₂CH₂SO₂NH—CH(CH₃)—CH₂—OH | | |

M-Pc (Xp₁)$_m$(Xp₂)$_n$ In the table, the introduction sites of the substituents (Xp1) and (Xp2) in the β-position substituents type are not in order.

| No. | M | Xp₁ (upper case)/Xp₂ (lower case) | m | n |
|---|---|---|---|---|
| 164 | Cu | —SO₂CH₂CH₂CH₂SO₃Li | 2 | 2 |
| | | —SO₂CH₂CH₂CH₂SO₂N(CH₂CH₂OH)₂ | | |
| 165 | Cu | —CO—NH—CH₂—CH₂—SO₃K | 3 | 1 |
| | | —CO—NH—CH₂—CH₂—O—CH₂—CH₂—OH | | |

-continued

| No. | M | $Xp_1$ (upper case)/$Xp_2$ (lower case) | m | n |
|---|---|---|---|---|
| 166 | Cu | —CO—NH—CH$_2$—CH$_2$—SO$_2$—NH—CH$_2$—CH$_2$—COONa<br>—CO—NH—CH$_2$—CH(OH)—CH$_3$ | 3 | 1 |
| 167 | Cu | —SO$_2$(CH$_2$)$_3$SO$_2$NHCH$_2$—CH(OH)—CH$_2$CO$_2$Li<br>—CO—NH—CH$_2$—CH$_2$—CH$_2$—CO—N(CH$_2$—CH$_2$—OH)$_2$ | 2.5 | 1.5 |
| 168 | Cu | —CO$_2$—CH$_2$—CH$_2$—CH(CH$_3$)—SO$_3$Na<br>—CO—CH$_2$—CH$_2$—CH$_2$—CO—N(CH$_2$—CH$_2$—OH)$_2$ | 2 | 2 |
| 169 | Cu | —CO$_2$—CH$_2$—CH$_2$—CH$_2$—SO$_3$Li<br>—CO$_2$—CH$_2$—CH$_2$—CH$_2$—SO$_2$—NH—CH$_2$—CH(OH)—CH$_3$ | 3 | 1 |
| 170 | Cu | —CO$_2$—CH$_2$—CH$_2$—CH$_2$COOK<br>—CO$_2$—CH$_2$—CH$_2$—CH$_2$—SO$_2$—NH—CH$_2$—CH(OH)—CH$_2$—COOK | 2 | 2 |

M-Pc $(Xp_1)_m(Xp_2)_n$ In the table, the introduction sites of the substituents (Xp1) and (Xp2) in the β-position substituents type are not in order.

| No. | M | $Xp_1$ (upper case)/$Xp_2$ (lower case) | m | n |
|---|---|---|---|---|
| 171 | Cu | —CO$_2$—CH$_2$—CH$_2$—O—CH$_2$—CH$_2$—O—CH$_2$—CH$_2$—SO$_3$Na<br>—SO$_2$—CH$_2$—C$_6$H$_4$—SO$_2$NH—CH$_2$—CH(OH)—CH$_2$—OH | 3 | 1 |
| 172 | Cu | —SO$_2$CH$_2$CH$_2$OCH$_2$CH$_2$O—CH$_2$CH$_2$SO$_3$K<br>—CO$_2$—CH$_2$—CH$_2$—CH$_2$—CO$_2$—CH$_2$—CH$_2$—CH(OH)—CH$_2$—COOK | 2 | 2 |
| 173 | Cu | —SO$_2$(CH$_2$)$_3$SO$_2$NHCH$_2$CH(OH)CH$_2$OH<br>—CO$_2$—CH$_2$—CH(OH)—CH$_2$—SO$_3$Li | 2 | 2 |
| 174 | Cu | —SO$_2$(CH$_2$)$_3$SO$_2$NHCH$_2$—CH(OH)—CH$_2$SO$_3$K<br>—CO$_2$—CH$_2$—CH$_2$—CH$_2$—SO$_2$—NH—CH$_2$—CH(OH)—CH$_3$ | 3 | 1 |
| 175 | Cu | —SO$_2$(CH$_2$)$_3$SO$_2$NH(CH$_2$)$_3$N(CH$_2$CH$_2$OH)$_2$<br>—CO$_2$—CH$_2$—CH$_2$—CH$_2$—CO—N(CH$_2$—CH$_2$—COOLi)$_2$ | 2 | 2 |

-continued

| No. | M | Xp₁ (upper case)/Xp₂ (lower case) | m | n |
|---|---|---|---|---|
| 176 | Cu | —SO$_2$—CH$_2$—CH$_2$—CH$_2$—SO$_2$—NH—CH$_2$—CH(OH)—CH$_3$<br>—SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 3 | 1 |

| No. | M | Xp₁ (upper case)/Xp₂ (lower case) | m | n |
|---|---|---|---|---|
| 177 | Cu | —SO$_2$—CH$_2$—CH$_2$—O—CH$_2$—CH$_2$—O—CH$_3$<br>—SO$_2$—CH$_2$—CH$_2$—CH$_2$—SO$_2$—NH—CH$_2$—CH(OH)—CH$_3$ | 2 | 1 |
| 178 | Cu | —SO$_2$—CH$_2$—CH$_2$—O—CH$_2$—CH$_2$—O—CH$_2$—CH$_2$—OH<br>—SO$_2$—CH$_2$—CH$_2$—CH$_2$—CO$_2$—CH$_2$—CH(CH$_2$CH$_3$)—CH$_2$CH$_2$—CH$_2$CH$_3$ | 3 | 1 |
| 179 | Cu | —SO$_2$—CH$_2$—CH(CH$_2$CH$_3$)—CH$_2$CH$_2$—CH$_2$CH$_3$<br>—SO$_2$—CH$_2$—CH$_2$—CH$_2$—SO$_2$—NH—CH$_2$—CH(O—CH$_3$)—CH$_3$ | 2 | 2 |
| 180 | Cu | —SO$_2$—CH$_2$—CH$_2$—CH$_2$—SO$_2$—NH—CH$_2$—CH(O—CH$_3$)—CH$_3$<br>—SO$_2$NH—CH$_2$—CH$_2$—SO$_2$NH—CH$_2$—CH$_2$—O—CH$_2$—CH$_2$—OH | 3 | 1 |
| 181 | Cu | —SO$_2$—CH$_2$—CH$_2$—CH$_2$—CO—NH—CH(CH$_3$)—CH$_2$—CH$_3$<br>—SO$_2$—CH$_2$—CH$_2$—CH$_2$—SO$_2$—NH—CH—(CH$_3$)$_2$ | 3 | 1 |
| 182 | Cu | —SO$_2$—CH$_2$—CH$_2$—CH$_2$—SO$_2$NH—CH$_2$—CH(OH)—CH$_3$<br>—SO$_2$—CH$_2$—CH$_2$—CH$_2$—CO—NH—CH(CH$_3$)—CH$_2$—CH$_3$ | 2.5 | 1.5 |

| No. | M | Xp₁ (upper case)/Xp₂ (lower case) | m | n |
|---|---|---|---|---|
| 183 | Cu | —SO$_2$—CH$_2$—CH$_2$—CH$_2$—CO—NH—CH(CH$_3$)—CH$_2$—CH$_3$<br>—SO$_2$—CH$_2$—CH$_2$—CH$_2$—SO$_2$—NH—(CH$_2$)$_3$—CH$_2$—O—CH$_2$CH$_2$—OH | 2 | 2 |
| 184 | Cu | —SO$_2$—CH$_2$—CH$_2$—CH$_2$—SO$_2$—NH—CH$_2$—CH(OH)—CH$_3$<br>—SO$_2$—CH$_2$—CH$_2$—O—CH$_2$—CH$_2$—O—CH$_3$ | 3 | 1 |
| 185 | Cu | —SO$_2$—CH$_2$—CH$_2$—CH$_2$—SO$_2$—NH—CH$_2$—CH(OH)—CH$_3$<br>—SO$_2$—CH$_2$—CH$_2$—O—CH$_2$—CH$_2$—O—CH$_2$—CH$_2$—O—CH$_3$ | 3 | 1 |

-continued

| No. | M | $Xp_1$ (upper case)/$Xp_2$ (lower case) | m | n |
|---|---|---|---|---|
| 186 | Cu | —$SO_2$—$CH_2$—$CH_2$—$CH_2$—CO—NH—CH(CH$_3$)—$CH_2$—$CH_3$<br>—$SO_2$—$CH_2$—$CH_2$—O—$CH_2$—$CH_2$—O—$CH_2$—$CH_2$—OH | 3 | 1 |
| 187 | Cu | —$SO_2$—$CH_2$—$CH_2$—$CH_2$—$SO_2$—NH—CH—(CH$_3$)$_2$<br>—$CO_2$—$CH_2$—CH(CH$_2$CH$_3$)—$CH_2$—$CH_2$—$CH_2CH_3$ | 3 | 1 |
| 188 | Cu | —$CO_2$—$CH_2$—$CH_2$—$CH_2$—CO—NH—CH(CH$_3$)—$CH_2$—$CH_3$<br>—$CO_2$—$CH_2$—$CH_2$—O—$CH_2$—$CH_2$—O—$CH_3$ | 3 | 1 |

M-Pc $(Xp_1)_m(Xp_2)_n$ In the table, the introduction sites of the substituents (Xp1) and (Xp2) in the β-position substituents type are not in order.

| No. | M | $Xp_1$ (upper case)/$Xp_2$ (lower case) | m | n |
|---|---|---|---|---|
| 189 | Cu | —CO—NH—$CH_2$—$CH_2$—$CH_2$—$SO_2$—NH—CH—(CH$_3$)$_2$<br>—$SO_2$—NH—$CH_2$—CH(CH$_2$CH$_3$)—$CH_2$—$CH_2$—$CH_2$—$CH_3$ | 3 | 1 |
| 190 | Cu | —CO—NH—$CH_2$—CH(CH$_2$CH$_3$)—$CH_2$—$CH_2$—$CH_2CH_3$<br>—CO—NH—$CH_2$—$CH_2$—O—$CH_2$—$CH_2$—$CH_3$ | 3 | 1 |

The structure of the phthalocyanine compound represented by M-Pc $(Xp_1)m(Xp_2)n$ in Compound Nos. 146 to 190 is as follows.

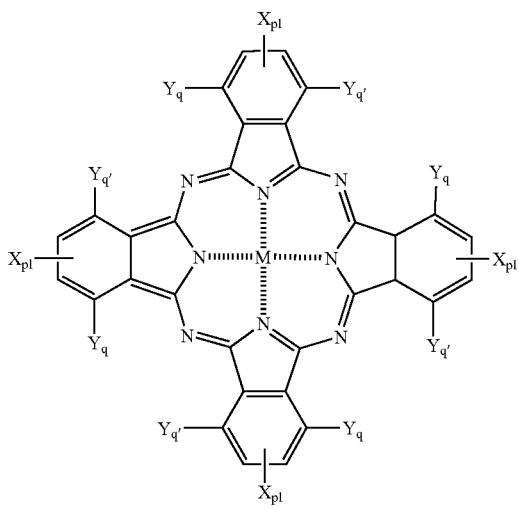

($X_{p1}$'s each independently represent $X_{p1}$ or $X_{p2}$.)

The phthalocyanine dye represented by the general formula (C-I) can be synthesized according to the patent cited above. The phthalocyanine dye represented by the general formula (C-II) can be synthesized by the aforementioned method as well as the method disclosed in JP-A-2001-226275, JP-A-2001-96610, JP-A-2001-47013 and JP-A-2001-193638. The starting material, intermediate dye and synthesis route are not limited to those according to these methods.

The azo dye to be used in the ink composition of the present invention is essentially characterized in that it is a dye having a maximal absorption at a spectrum region of from 500 nm to 580 nm in an aqueous medium and an oxidation potential of more potential than 1.0 V (vsSCE).

The first structural characteristic of preferred dye of this azo dye is that it is a dye having a chromophore represented by the general formula (heterocyclic ring A) —N=N— (heterocyclic ring B). In this case, the heterocyclic ring A and the heterocyclic ring B may have the same structure. The heterocyclic ring A and heterocyclic ring B each are in detail a 5- or 6-membered heterocyclic ring which is selected from pyrazole, imidazole, triazole, oxazole, thiazole, selenazole, pyridone, pyrazine, pyrimidine and pyridine. In some detail, they are described in Japanese Patent Application 2000-15853, Japanese Patent Application 2001-15614, JP-A-2002-309116, Japanese Patent Application 2001-195014, etc.

Further, the second preferred structural characteristic of the aforesaid azo dye is that the azo group is an azo dye having an aromatic nitrogen-containing 6-membered heterocyclic ring directly connected to at least one end thereof as a coupling component, and specific examples of such an azo dye are described in 2001-110457.

The third preferred structural characteristic is that the auxochrome has an aromatic cyclic amino group or heterocyclic amino group structure, and specific examples of the chromophore include anilino group, and heterylamino group.

The fourth preferred structural characteristic is that the azo dye has a stereostructure. This is described in detail in Japanese Patent Application 2002-12015.

By providing an azo dye with the aforesaid structural characteristics, the oxidation potential of the dye can be raised, making it possible to enhance the ozone fastness thereof. As a means of raising the oxidation potential there maybe used a method involving the removal of α-hydrogen from the azo dye. Further, from the standpoint of rise of oxidation potential, an azo dye of the general formula (M-I) is particularly preferred. The means of raising the oxidation potential of an azo dye is described in detail in Japanese Patent Application 2001-254878.

The magenta ink of the present invention comprising an azo dye having the aforesaid characteristics preferably has λmax (maximal absorption wavelength) of from 500 to 580 nm from the standpoint of hue and has a small half-width on both the long and short wavelength sides of the maximum absorption wavelength, i.e., sharp absorption spectrum. This is described in detail in JP-A-2002-309133. Further, if an azo dye of the general formula (M-I) is used, by introducing methyl group at α-position, the sharpening of absorption can be realized.

The compound represented by the general formula (M-I) as an azo dye which is preferably used in the present invention will be described hereinafter.

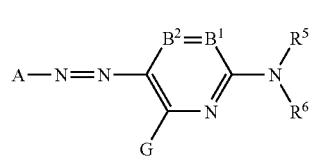

General formula (M-I)

In the general formula (M-1), A represents a 5-membered heterocyclic ring.

$B^1$ and $B^2$ each represent =$CR^1$— or —$CR^2$= or one of $B^1$ and $B^2$ represents a nitrogen atom while the other represents =$CR^1$— or —$CR^2$=. $R^5$ and $R^6$ each independently represent a hydrogen atom or a substituent which represents an aliphatic group, aromatic group, heterocyclic ring, acyl group, alkoxycarbonyl group, aryloxycarbonyl group, carbamoyl group, alkylsulfonyl group, arylsulfonyl group or sulfamoyl group the hydrogen atom of which may be substituted.

G, $R^1$ and $R^2$ each independently represent a hydrogen atom or a substituent which represents a halogen atom, aliphatic group, aromatic group, heterocyclic ring, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group the hydrogen atom of which may be substituted.

$R^1$ and $R^5$ or $R^5$ and $R^6$ may be connected to each other to form a 5- or 6-membered ring.

Referring further to the general formula (M-1), A represents a 5-membered heterocyclic ring and examples of hetero atoms in the heterocyclic ring include N, O and S. The 5-membered heterocyclic ring is preferably a nitrogen-containing 5-membered heterocyclic ring which may be condensed with aliphatic rings, aromatic rings or other heterocyclic rings. Preferred examples of heterocyclic ring of A may include pyrazole ring, imidazole ring, thiazole ring, isothiazole ring, thiadiazole ring, benzothiazole ring, benzooxazole ring, and benzoisothiazole ring. The various heterocyclic groups may further have substituents. Preferred among these heterocyclic rings are pyrazole ring, imidazole ring, isothiazole ring, thiadiazole ring and benzothiazole ring represented by the following general formulae (a) to (f):

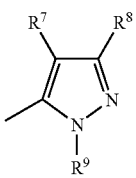

General formula (a)

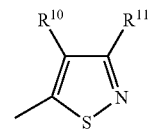

(b)

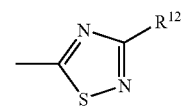

(c)

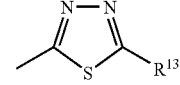

(d)

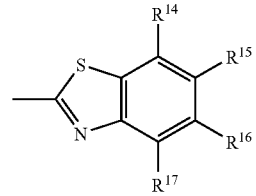

(e)

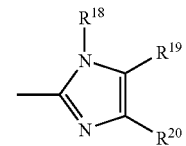

(f)

In the aforesaid general formulae (a) to (f), $R^7$ to $R^{20}$ represent the same substituents as G, $R^1$ and $R^2$ in the general formula (M-I).

Preferred among the compounds of the general formulae (a) to (f) are pyrazole ring represented by the general formula (a) and isothiazole ring represented by the general formula (b), most preferably pyrazole ring represented by the general formula (a).

In the general formula (M-I), $B^1$ and $B^2$ each represent =$CR^1$— and —$CR^2$= or one of $B^1$ and $B^2$ represents a nitrogen atom while the other represents =$CR^1$— or —$CR^2$=, but $B^1$ and $B^2$ preferably each represent =$CR^1$— or —$CR^2$=.

$R^5$ and $R^6$ each independently represent a hydrogen atom or a substituent which represents an aliphatic group, aromatic group, heterocyclic ring, acyl group, alkoxycarbonyl group, aryloxycarbonyl group, carbamoyl group, alkylsulfonyl group, arylsulfonyl group or sulfamoyl group the hydrogen atom of which may be substituted.

Preferred examples of $R^5$ and $R^6$ may include hydrogen atom, aliphatic group, aromatic group, heterocyclic group, acyl group, alkylsulfonyl group or arylsulfonyl group. More preferably, $R^5$ and $R^6$ each are a hydrogen atom, aromatic group, heterocyclic group, acyl group, alkylsulfonyl group or arylsulfonyl group. Most preferably, $R^5$ and $R^6$ each are a hydrogen atom, aryl group or heterocyclic group. The hydrogen atom of the aforementioned various substituents maybe substituted. However, $R^5$ and $R^6$ are not a hydrogen atom at the same time.

G, $R^1$ and $R^2$ each independently represent a hydrogen atom or a substituent which represents a halogen atom, aliphatic group, aromatic group, heterocyclic ring, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group the hydrogen atom of which may be substituted.

G is preferably a hydrogen atom, halogen atom, aliphatic group, aromatic group, hydroxy group, alkoxy group, aryloxy group, acyloxy group, heterocyclic oxy group, amino group, acylamino group, ureido group, sulfamoylamino group, alkoxycarbonylamino group, aryloxycarbonylamino group, alkylthio group, arylthio group or heterocyclic thio group, more preferably a hydrogen atom, halogen atom, alkyl group, hydroxy group, alkoxy group, aryloxy group, acyloxy group, amino group or acylamino group, most preferably a hydrogen atom, amino group (preferably anilino group) or acylamino group. The hydrogen atom of the aforesaid substituents may be substituted.

Preferred examples of $R^1$ and $R^2$ include hydrogen atom, alkyl group, halogen atom, alkoxycarbonyl group, carboxyl group, carbamoyl group, hydroxy group, alkoxy group, and cyano group. The hydrogen atom of the aforesaid substituents may be substituted.

$R^1$ and $R^5$ or $R^5$ and $R^6$ may be connected to each other to form a 5- or 6-membered ring.

Examples of the substituents which may substitute on A or which may substitute on the substituents of $R^1$, $R^2$, $R^5$, $R^6$ or G include those listed above with reference to G, $R^1$ and $R^2$.

In the case where the azo dye represented by the general formula (M-I) is a water-soluble dye, an ionic hydrophilic group is further provided on any position on A, $R^1$, $R^2$, $R^5$, $R^6$ and G as a substituent. Examples of the ionic hydrophilic group as a substituent include sulfo group, carboxyl group, phosphono group, quaternary ammonium group, etc. The aforesaid ionic hydrophilic group is preferably a carboxyl group, phosphono group or sulfo group, particularly carboxyl group or sulfo group. The carboxyl group, phosphono group and sulfo group may be in the form of salt, and examples of counter ions constituting the salt include ammonium ion, alkaline metal ion (e.g., lithium ion, sodium ion, potassium ion), and organic cation (e.g., tetramethylammonium ion, tetramethylguanidium ion, tetramethyl phosphonium ion).

The terms (substituent) as used in the description of the general formula (M-I) will be described. These terms are common even to the general formula (M-I) and the general formula (M-Ia) described later.

Examples of the halogen atom include fluorine atom, chlorine atom, and bromine atom.

The aliphatic group means alkyl group, substituted alkyl group, alkenyl group, substituted alkenyl group, alkinyl group, substituted alkinyl group, aralkyl group and substituted aralkyl group. In the present specification, the term "substituted" as used in "substituted alkyl group", etc. means that the hydrogen atom in "alkyl group", etc. is substituted by substituents listed above with reference to G, $R^1$ and $R^2$, etc.

The aliphatic group may have branches or may form a ring. The number of carbon atoms in the aliphatic group is preferably from 1 to 20, more preferably from 1 to 16. The aryl moiety of the aralkyl group and substituted aralkyl group is preferably a phenyl group or naphthyl group, particularly phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The aromatic group means an aryl group and substituted aryl group. The aryl group is preferably a phenyl group or naphthyl group, particularly phenyl group. The number of carbon atoms in the aromatic group is preferably from 6 to 20, more preferably from 6 to 16.

Examples of the aromatic group include phenyl group, p-tollyl group, p-methoxyphenyl group, o-chlorophenyl group, and m-(3-sulfopropylamino)phenyl group.

Examples of the heterocyclic group include substituted heterocyclic groups. The heterocyclic group may have its heterocyclic ring condensed with aliphatic rings, aromatic rings or other heterocyclic rings. The aforesaid heterocyclic group is preferably a 5- or 6-membered heterocyclic group. Examples of the aforesaid substituents include aliphatic group, halogen atom, alkylsulfonyl group, arylsulfonyl group, acyl group, acylamino group, sulfamoyl group, carbamoyl group, ionic hydrophilic group, etc. Examples of the aforesaid heterocyclic group include 2-pyridyl group, 2-chenyl group, 2-thiazolyl group, 2-benzothiazolyl group, 2-benzooxazolyl group, and 2-furyl group.

Examples of the carbamoyl group include substituted carbamoyl groups. Examples of the aforesaid substituents include alkyl group. Examples of the aforesaid carbamoyl group include methylcarbamoyl group, and dimethylcarbamoyl group.

Examples of the alkoxycarbonyl group include substituted alkoxycarbonyl groups. The aforesaid alkoxycarbonyl group is preferably an alkoxycarbonyl group having from 2 to 20 carbon atoms. Examples of the aforesaid substituents include ionic hydrophilic groups. Examples of the aforesaid alkoxycarbonyl group include methoxycarbonyl group, and ethoxycarbonyl group.

Examples of the aryloxycarbonyl group include substituted aryloxycarbonyl groups. The aforesaid aryloxycarbonyl group is preferably an aryloxycarbonyl group having from 7 to 20 carbon atoms. Examples of the aforesaid substituents include ionic hydrophilic groups. Examples of the aforesaid aryloxycarbonyl group include phenoxycarbonyl group.

Examples of the heterocyclic oxycarbonyl group include substituted heterocyclic oxycarbonyl groups. Examples of the heterocyclic ring include those listed above with reference to the heterocyclic group. The aforesaid heterocyclic oxycarbonyl group is preferably a heterocyclic oxycarbonyl group having from 2 to 20 carbon atoms. Examples of the aforesaid substituents include ionic hydrophilic groups. Examples of the aforesaid heterocyclic oxycarbonyl group include 2-pyridyloxycarbonyl group.

Examples of the acyl group include substituted acyl groups. The aforesaid acyl group is preferably an acyl group having from 1 to 20 carbon atoms. Examples of the aforesaid substituents include ionic hydrophilic groups. Examples of the aforesaid acyl group include acetyl group and benzoyl group.

Examples of the alkoxy group include substituted alkoxy groups. Examples of the aforesaid alkoxy group is preferably an alkoxy group having from 1 to 20 carbon atoms. Examples of the aforesaid substituents include alkoxy groups, hydroxyl groups, and ionic hydrophilic groups. Examples of the aforesaid alkoxy group include methoxy group, ethoxy group, isopropoxy group, methoxyethoxy group, hydroxyethoxy group, and 3-carboxypropoxy group.

Examples of the aryloxy group include substituted aryloxy groups. The aforesaid aryloxy group is preferably an aryloxy group having from 6 to 20 carbon atoms. Examples of the aforesaid substituents include alkoxy groups, and ionic hydrophilic groups. Examples of the aforesaid aryloxy group include phenoxy group, p-methoxyphenoxy group, and o-methoxyphenoxy group.

Examples of the heterocyclic oxy group include substituted heterocyclic oxy groups. Examples of the heterocyclic ring include those listed above with reference to the heterocyclic group. The aforesaid heterocyclic oxy group is preferably a heterocyclic oxy group having from 2 to 20 carbon atoms. Examples of the aforesaid substituents include alkyl groups, alkoxy group, and ionic hydrophilic groups. Examples of the aforesaid heterocyclic oxy group include 3-pyridyloxy group, and 3-chenyloxy group.

The silyloxy group is preferably a silyloxy group substituted by an aliphatic or aromatic group having from 1 to 20 carbon atoms. Examples of the aforesaid silyloxy group include trimethylsilyloxy, and diphenylmethylsilyloxy.

Examples of the acyloxy group include substituted acyloxy groups. The aforesaid acyloxy group is preferably an acyloxy group having from 1 to 20 carbon atoms. Examples of the aforesaid substituents include ionic hydrophilic groups. Examples of the aforesaid acyloxy group include acetoxy group, and benzoyloxy group.

Examples of the carbamoyloxy group include substituted carbamoyloxy groups. Examples of the aforesaid substituents include alkyl groups. Examples of the aforesaid carbamoyloxy group include N-methylcarbamoyloxy group.

Examples of the alkoxycarbonyloxy group include substituted alkoxycarbonyloxy groups. The aforesaid alkoxycarbonyloxy group is preferably an alkoxycarbonyloxy group having from 2 to 20 carbon atoms. Examples of the aforesaid alkoxycarbonyloxy group include methoxycarbonyloxy group, and isopropoxycarbonyloxy group.

Examples of the aryloxycarbonyloxy group include substituted aryloxycarbonyloxy groups. The aforesaid aryloxycarbonyloxy group is preferably an aryloxycarbonyloxy group having from 7 to 20 carbon atoms. Examples of the aforesaid aryloxycarbonyloxy group include phenoxycarbonyloxy group.

Examples of the amino group include substituted amino groups. Examples of said substituents include alkyl groups, aryl groups, or heterocylic groups, and the alkyl groups, aryl groups and heterocyclic groups may further have substituents. Examples of the alkylamino group include substituted alkylamino groups. The alkylamino group is preferably an alkylamino group having from 1 to 20 carbon atoms. Examples of the aforesaid substituents include ionic hydrophilic groups. Examples of the aforesaid alkylamino group include methylamino group, and diethylamino group.

Examples of the arylamino group include substituted arylamino groups. The aforesaid arylamino group is preferably an arylamino group having from 6 to 20 carbon atoms. Examples of the aforesaid substituents include halogen atoms, and ionic hydrophilic groups. Examples of the aforesaid arylamino group include phenylamino group, and 2-chlorophenylamino group.

Examples of the heterocyclic amino group include substituted heterocyclicamino groups. Examples of the heterocyclic ring include those listed above with reference to the heterocyclic group. The aforesaid heterocyclic amino group is preferably a heterocyclic amino group having from 2 to 20 carbon atoms. Examples of the aforesaid substituents include alkyl groups, halogen atoms, and ionic hydrophilic groups.

Examples of the acylamino group include substituted acrylamino groups. The aforesaid acylamino group is preferably an acylamino group having from 2 to 20 carbon atoms. Examples of the aforesaid substituents include ionic hydrophilic groups. Examples of the aforesaid acylamino group include acetylamino group, propionylamino group, benzoylamino group, N-phenylacetylamino group, and 3,5-disulfobenzoylamino group.

Examples of the ureido group include substituted ureido groups. The aforesaid ureido group is preferably an ureido group having from 1 to 20 carbon atoms. Examples of the aforesaid substituents include alkyl groups, and aryl groups. Examples of the aforesaid ureido group include 3-methylureido group, 3,3-dimethylureido group, and 3-phenylureido group.

Examples of the sulfamoylamino group include substituted sulfamoylamino groups. Examples of the aforesaid substituents include alkyl groups. Examples of the aforesaid sulfamoylamino group include N,N-dipropylsulfamoylamino group.

Examples of the alkoxycarbonylamino group include substituted alkoxycarbonylamino groups. The aforesaid alkoxycarbonylamino group is preferably an alkoxycarbonylamino group having from 2 to 20 carbon atoms. Examples of the aforesaid substituents include ionic hydrophilic groups. Examples of the aforesaid alkoxycarbonylamino group include ethoxycarbonylamino groups.

Examples of the aryloxycarbonylamino group include substituted aryloxycarbonylamino groups. The aforesaid aryloxycarbonylamino group is preferably an aryloxycarbonylamino group having from 7 to 20 carbon atoms. Examples of the aforesaid substituents include ionic hydrophilic groups. Examples of the aforesaid aryloxycarbonylamino group include phenoxycarbonylamino groups.

Examples of the alkylsulfonylamino group and arylsulfonylamino group include substituted alkylsulfonylamino groups and substituted arylsulfonylamino groups. The aforesaid alkylsulfonylamino group and arylsulfonylamino group are preferably an alkylsulfonylamino group and arylsulfonylamino group each having from 1 to 20 carbon atoms. Examples of the substituents include ionic hydrophilic groups. Examples of the aforesaid alkylsulfonylamino group and arylsulfonylamino group include methylsulfonylamino group, N-phenyl-methylsulfonylamino group, phenylsulfonylamino group, and 3-carboxyphenylsulfonylamino group.

Examples of the heterocyclic sulfonylamino group include substituted heterocyclic sulfonylamino groups. Examples of the heterocyclic ring include those listed above with reference to the heterocyclic group. The aforesaid heterocyclic sulfonyl amino group is preferably a heterocyclic sulfonylamino group having from 1 to 12 carbon atoms. Examples of the aforesaid substituents include ionic hydrophilic groups. Examples of the aforesaid heterocyclic sulfonylamino group include 2-chenylsulfonylamino group, and 3-pyridylsulfonylamino group.

Examples of the alkylthio group, arylthio group and heterocyclic thio group include substituted alkylthio group, substituted arylthio group, and substituted heterocyclic thio group. Examples of the heterocyclic ring include those listed above with reference to the heterocyclic group. The aforesaid alkylthio group, arylthio group and heterocyclic thio group each preferably have from 1 to 20 carbon atoms. Examples of the aforesaid substituents include ionic hydrophilic groups. Examples of the aforesaid alkylthio group, arylthio group and heterocyclic thio group include methylthio group, phenylthio group, and 2-pyridylthio group.

Examples of the alkylsulfonyl group and arylsulfonyl group include substituted alkylsulfonyl groups and substituted arylsulfonyl groups. Examples of the alkylsulfonyl group and arylsulfonyl group include methylsulfonyl group and phenylsulfonyl group, respectively.

Examples of the heterocyclic sulfonyl group include substituted heterocyclic sulfonyl groups. Examples of the heterocyclic ring include those listed above with reference to the heterocyclic group. The aforesaid heterocyclic sulfonyl group is preferably a heterocyclic sulfonyl group having from 1 to 20 carbon atoms. Examples of the aforesaid substituents include ionic hydrophilic groups. Examples of the aforesaid heterocyclic sulfonyl group include 2-chenylsulfonyl group and 3-pyridylsulfonyl group.

Examples of the alkylsulfinyl group and arylsulfinyl group include substituted alkylsulfinyl groups and substituted arylsulfinyl groups. Examples of the alkylsulfinyl group and arylsulfinyl group include methylsulfinyl group and phenylsulfinyl group, respectively.

Examples of the heterocyclic sulfinyl group include substituted heterocyclic sulfinyl groups. Examples of the heterocyclic ring include those listed above with reference to the heterocyclic group. The aforesaid heterocyclic sulfinyl group is preferably a heterocyclic sulfinyl group having from 1 to 20 carbon atoms. Examples of the aforesaid substituents include ionic hydrophilic groups. Examples of the heterocyclic sulfinyl group include 4-pyridylsulfinyl group.

Examples of the sulfamoyl group include substituted sulfamoyl groups. Examples of the aforesaid substituents include alkyl groups. Examples of the aforesaid sulfamoyl group include dimethylsulfamoyl group, and di-(2-hydroxyethyl)sulfamoyl group.

Particularly preferred among the structures of the general formula (M-I) is one represented by the following general formula (M-Ia).

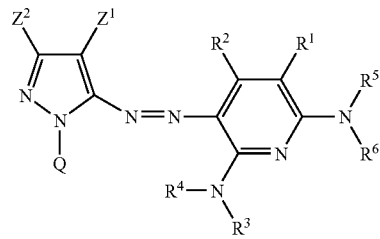

General formula (M-Ia)

wherein $R^1$, $R^2$, $R^5$ and $R^6$ are as defined in the general formula (M-I).

$R^3$ and $R^4$ each independently represent a hydrogen atom or a substituent which represents an aliphatic group, aromatic group, heterocyclic group, acyl group, alkoxycarbonyl group, aryloxycarbonyl group, carbamoyl group, alkylsulfonyl group, arylsulfonyl group or sulfamoyl group. Preferred among these substituents is hydrogen atom, aromatic group, heterocyclic group, acyl group, alkylsulfonyl group or arylsulfonyl group, particularly hydrogen atom, aromatic group and heterocyclic group.

$Z^1$ represents an electron-withdrawing group having a Hammett's substituent constant σp value of 0.20 or more. $Z^1$ is preferably an electron-withdrawing group having a Hammett's substituent constant σp value of 0.30 or more, more preferably 0.45 or more, particularly 0.60 or more, but the Hammett's substituent constant σp value of the electron-withdrawing group is preferably not greater than 1.0.

Specific examples of the electron-withdrawing group having a Hammett's substituent constant σp value of 0.60 or more include cyano group, nitro group, alkylsulfonyl group (e.g., methylsulfonyl group), and arylsulfonyl group (e.g., phenylsulfonyl group).

Examples of the electron-withdrawing group having a Hammett's substituent constant σp value of 0.45 or more include acyl group (e.g., acetyl group), alkoxycarbonyl group (e.g., dodecyloxycarbonyl group), aryloxycarbonyl group (e.g., m-chlorophenoxycarbonyl), alkylsulfinyl group (e.g., n-propylsulfinyl), arylsulfinyl group (e.g., phenylsulfinyl), sulfamoyl group (e.g., N-ethylsulfamoyl, N,N-dimethylsulfamoyl), and halogenated alkyl group (e.g., trifluoromethyl) besides the aforesaid groups.

Examples of the electron-withdrawing group having a Hammett's substituent constant σp value of 0.30 or more include acyloxy group (e.g., acetoxy group), carbamoyl group (e.g., N-ethylcarbamoyl, N,N-dibutylcarbamoyl), halogenated alkoxy group (e.g., trifluoromethyl), halogenated aryloxy group (e.g., pentafluorophenyloxy), sulfonyloxy group (e.g., methylsulfonyloxy), halogenated alkylthio group (e.g., difluoromethylthio), aryl group substituted by two or more electron-withdrawing groups having σp value of 0.15 or more (e.g., 2,4-dinitrophenyl, pentachlorophenyl), and heterocyclic ring (e.g., 2-benzooxazolyl, 2-benzothiazolyl, 1-phenyl-2-benzoimidazolyl) besides the aforesaid groups.

Specific examples of the electron-withdrawing group having σp value of 0.20 or more include halogen atoms besides the aforesaid groups.

Preferred among these groups are $C_2$-$C_{20}$ acyl group, $C_2$-$C_{20}$ alkyloxycarbonyl group, nitro group, cyano group, $C_1$-$C_{20}$ alkylsulfonyl group, $C_6$-$C_{20}$ arylsulfonyl group, $C_1$-$C_{20}$ carbamoyl group, and $C_1$-$C_{20}$ halogenated alkyl group. Particularly preferred among these groups are cyano group, $C_1$-$C_{20}$ alkylsulfonyl group and $C_6$-$C_{20}$ arylsulfonyl group, most preferably cyano group.

$Z^2$ represents a hydrogen atom or a substituent and the substituent represents an aliphatic group, aromatic group or heterocyclic group. $Z^2$ is preferably an aliphatic group, more preferably a $C_1$-$C_6$ alkyl group.

Q represents a hydrogen atom or a substituent and the substituent represents an aliphatic group, aromatic group or heterocyclic group. In particular, Q is preferably a group formed by a group of non-metallic atoms required to form a 5- to 8-membered ring. The aforementioned 5- to 8-membered ring may be substituted, may be a saturated ring or may have an unsaturated bond. Particularly preferred among these 5- to 8-membered rings are aromatic group and heterocyclic group. Preferred examples of the non-metallic atom include nitrogen atom, oxygen atom, sulfur atom, or carbon atom. Specific examples of these cyclic structures include benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzoimidazole ring, oxazole ring, benzoxazole ring, thiazole ring, benzothiazole ring, oxane ring, sulfolane ring, and thiane ring, etc.

The hydrogen atoms in the substituents described with reference to the general formula (M-Ia) may be substituted. Examples of the substituents on these substituents include substituents listed with reference to the general formula (M-I), and groups and ionic hydrophilic groups exemplified with reference to G, $R^1$ and $R^2$.

Referring to a particularly preferred combination of substituents as azo dyes represented by the general formula (M-I), $R^5$ and $R^6$ each are preferably a hydrogen atom, alkyl group, aryl group, heterocyclic group, sulfonyl group or acyl group, more preferably hydrogen atom, aryl group, heterocyclic group or sulfonyl group, most preferably hydrogen atom, aryl group or heterocyclic group. However, $R^5$ and $R^6$ are not a hydrogen atom at the same time.

G is preferably a hydrogen atom, halogen atom, alkyl group, hydroxyl group, amino group or acylamino group, more preferably hydrogen atom, halogen atom, amino group or acylamino group, most preferably hydrogen atom, amino group or acylamino group.

A is preferably a pyrazole ring, imidazole ring, isothiazole ring, thiadiazole ring or benzothiazole ring, more preferably pyrazole ring or isothiazole ring, most preferably pyrazole ring.

$B^1$ and $B^2$ are $=CR^1-$ and $-CR^2=$, respectively, in which $R^1$ and $R^2$ each are preferably a hydrogen atom, alkyl group, halogen atom, cyano group, carbamoyl group, carboxyl group, hydroxyl group, alkoxy group or alkoxycarbonyl group, more preferably hydrogen atom, alkyl group, carboxyl group, cyano group or carbamoyl group.

Referring to a preferred combination of substituents on the compound represented by the general formula (M-I), at least one of the various substituents is preferably a compound which is a preferred group as mentioned above, and more preferably, more of the various substituents are compounds which are preferred groups as mentioned above, and most preferably, all the various substituents are compounds which are preferred groups as mentioned above.

Specific examples of the azo dye represented by the general formula (M-I) will be given below, but the azo dye to be used in the present invention is not limited to the following examples.

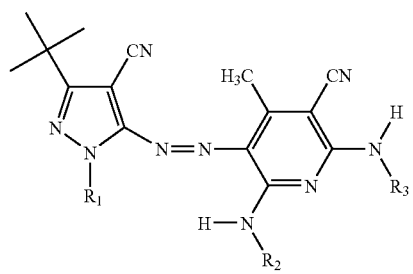

| Dye | $R_1$ | $R_2$ | $R_3$ |
|-----|-------|-------|-------|
| a-1 | ![benzothiazole] | —⌬—$C_8H_{17}$ | —⌬—$C_8H_{17}$ |
| a-2 | ![5-chlorobenzothiazole] | —⌬—$C_8H_{17}$ | —⌬(2,4,6-trimethylphenyl) |

-continued

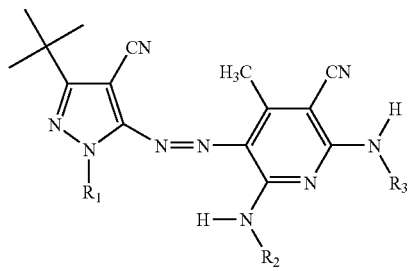

| Dye | R₁ | R₂ | R₃ |
|---|---|---|---|
| a-3 | 2-methyl-6-chloro-benzothiazol-yl | 2,3,5-trimethylphenyl | 4-C$_8$H$_{17}$-phenyl |
| a-4 | 2-methyl-benzothiazol-yl | 2-methyl-6-OC$_8$H$_{17}$-phenyl | 4-C$_8$H$_{17}$-phenyl |
| a-5 | 2-methyl-5-nitro-benzothiazol-yl | 2,4,5-trimethylphenyl | 2,4,5-trimethylphenyl |
| a-6 | 2-methyl-benzothiazol-6-yl-SO$_2$NH-(CH$_2$)$_3$-O-(2,4-di-tert-pentyl)phenyl | 4-methylphenyl | 4-methylphenyl |
| a-7 | 2-methyl-benzothiazol-6-yl-SO$_2$NH-(CH$_2$)$_3$-OCH$_2$CH(C$_8$H$_{17}$)(C$_6$H$_{13}$) | 2,3,5-trimethylphenyl | 4-methylphenyl |
| a-8 | 2-methyl-benzothiazol-6-yl-NHCOCH(Et)-O-(2,4-di-tert-pentyl)phenyl | 4-C$_8$H$_{17}$-phenyl | 4-C$_8$H$_{17}$-phenyl |
| a-9 | 2-methyl-benzothiazol-6-yl-NHSO$_2$-(2-(n)C$_8$H$_{17}$O-5-C$_8$H$_{17}$(t))phenyl | 2,4,5-trimethylphenyl | C$_8$H$_{17}$(t) |

-continued

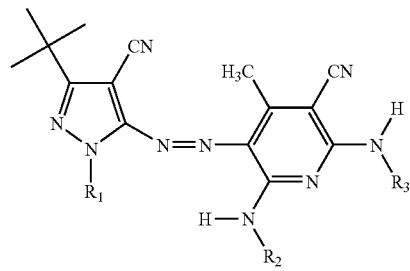

| Dye | R₁ | R₂ | R₃ |
|---|---|---|---|
| a-10 | 2-methyl-5-chloro-benzothiazol-yl | 2-methyl-6-(OC₁₂H₂₅)phenyl | 2-methyl-6-(OC₁₂H₂₅)phenyl |

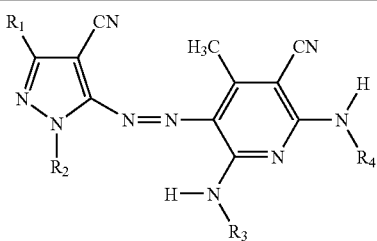

| Dye | R₁ | R₂ | R₃ | R₄ |
|---|---|---|---|---|
| a-11 | tert-butyl | 2-methylbenzothiazol-6-yl-SO₂Na | 4-CH₃-phenyl | 4-SO₂Na-phenyl |
| a-12 | phenyl | 2-methylbenzothiazol-6-yl-COOH | 4-SO₂K-phenyl | 3-COOH-phenyl |
| a-13 | 2-chlorophenyl | 2-methylbenzothiazol-SO₃K (4,5-mix) | 4-SO₂K-phenyl | 3-COOH-phenyl |
| a-14 | tert-butyl | 2-methylbenzothiazol-6-yl-SO₂Na | 2,3,4,5-tetramethyl-6-SO₃Na-phenyl | 2,3,4,5-tetramethyl-6-SO₃Na-phenyl |
| a-15 | tert-butyl | 2-methylbenzothiazol-6-yl-SO₃K | 2,3,4,5-tetramethyl-6-SO₃K-phenyl | 2,3,4,5-tetramethyl-6-SO₃K-phenyl |

-continued
| | | | | |
|---|---|---|---|---|
| a-16 | 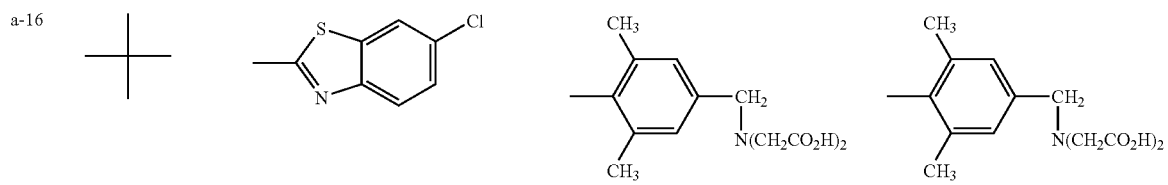 | | | |
| a-17 | 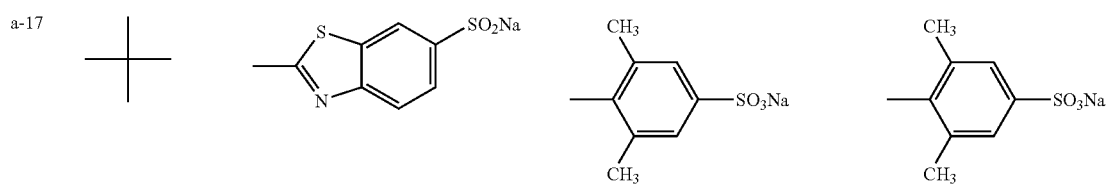 | | | |
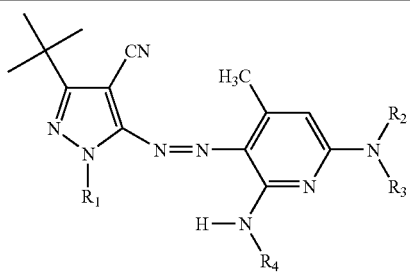
| Dye | $R_{IR2}$ | |
|---|---|---|
| a-18 |  | |
| a-19 |  | —SO$_2$CH$_3$ |
| a-20 |  | —COCH$_3$ |
| a-21 |  | —SO$_2$CH$_3$ |
| a-22 |  | H |
| a-23 |  | H |
| a-24 |  | H |
| a-25 |  | |

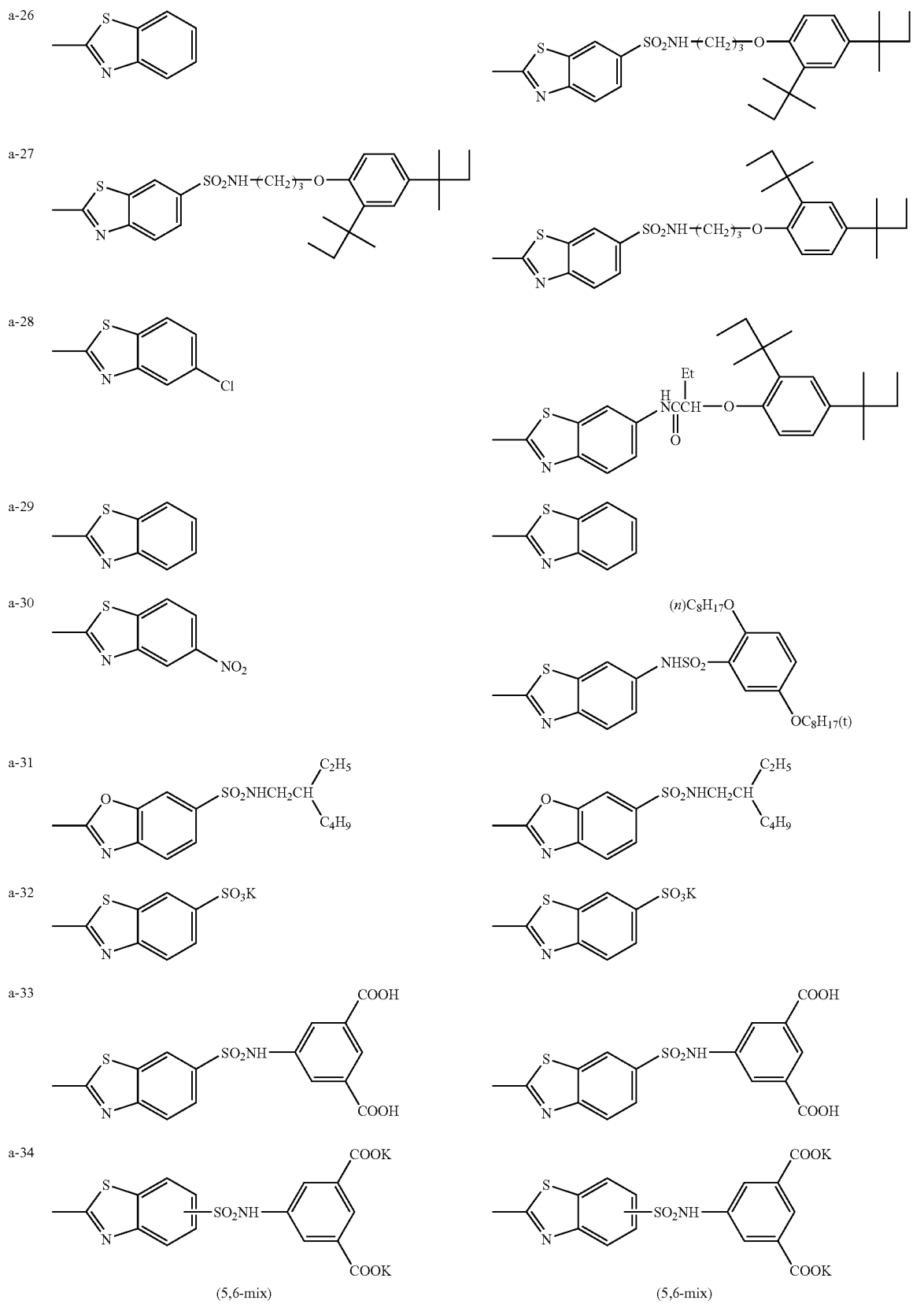

-continued
| | | | |
|---|---|---|---|
| a-35 | 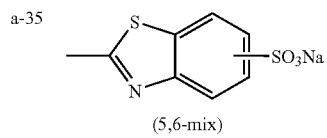<br>(5,6-mix) | | 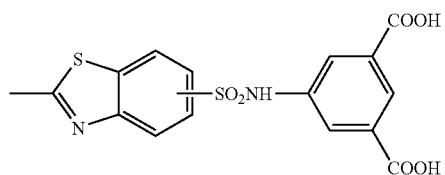 |
| a-36 | 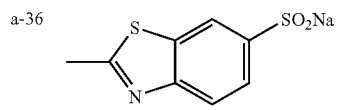 | | 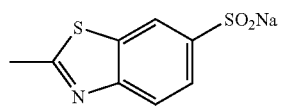 |
| a-37 | 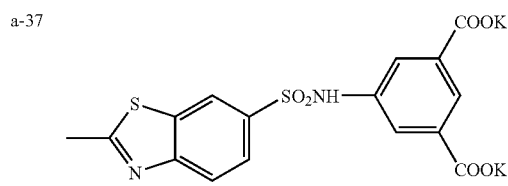 | | 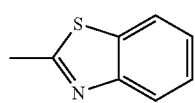 |
| a-38 | 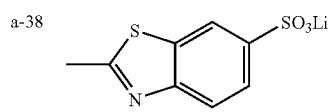 | | 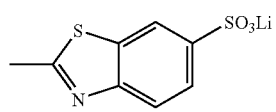 |
| a-39 | 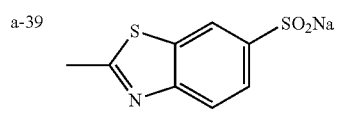 | | 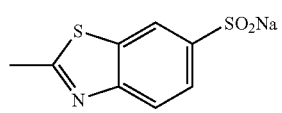 |
| a-40 | 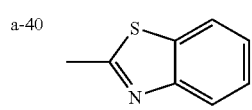 | | 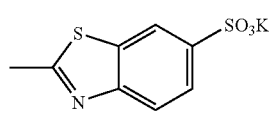 |
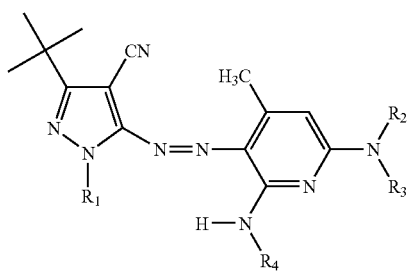
| Dye | $R_3$ | $R_4$ |
|---|---|---|
| a-18 | 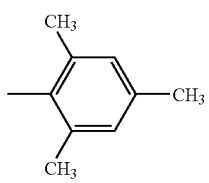 | 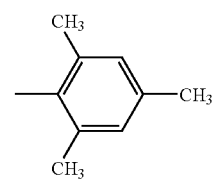 |
| a-19 | 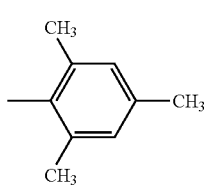 | 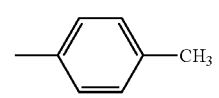 |
| a-20 | $C_8H_{17}(t)$ | $C_8H_{17}(t)$ |

-continued
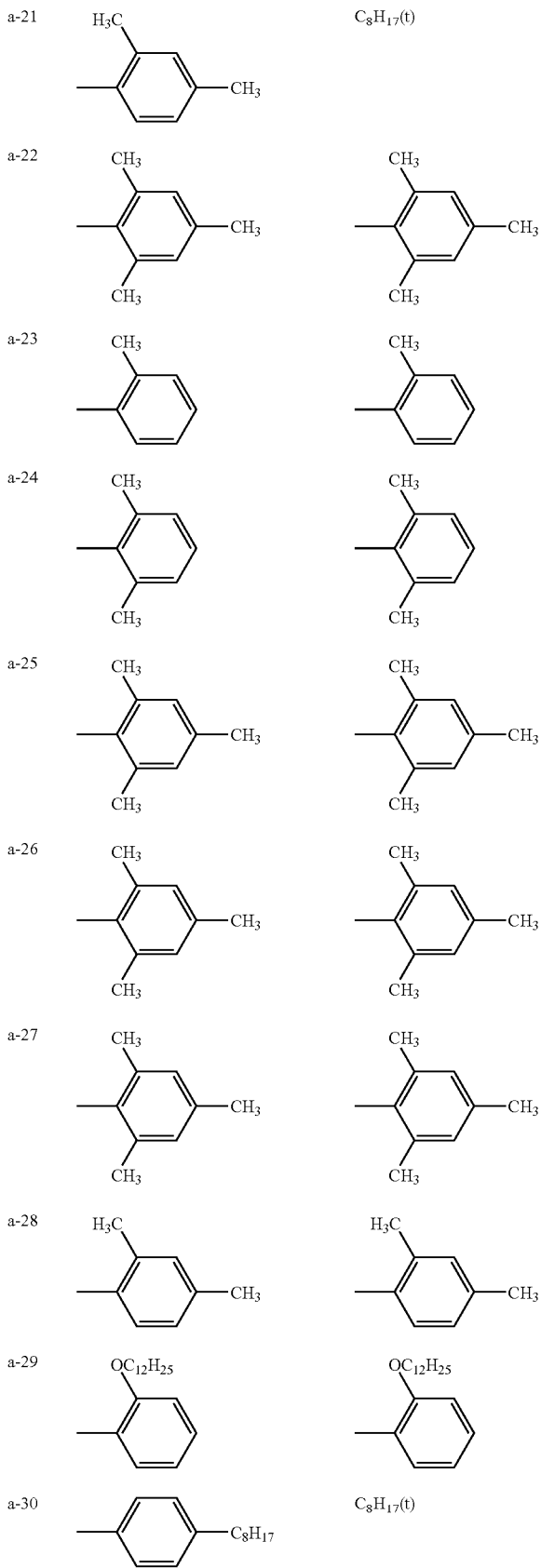

a-31 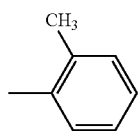 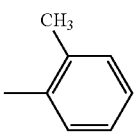
a-32 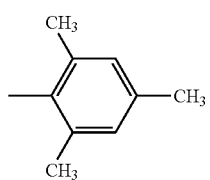 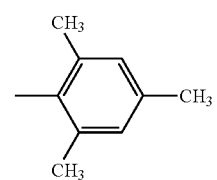
a-33 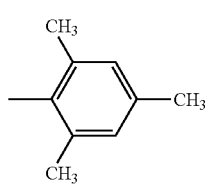 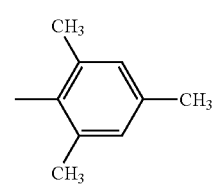
a-34 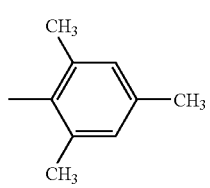 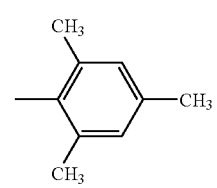
a-35 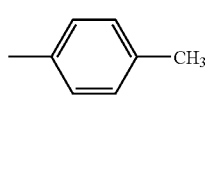 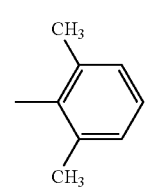
a-36 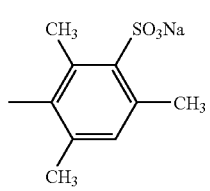 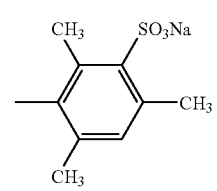
a-37 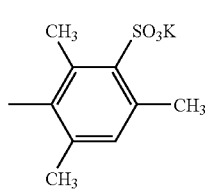 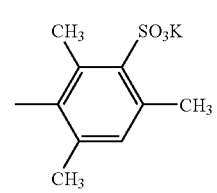
a-38 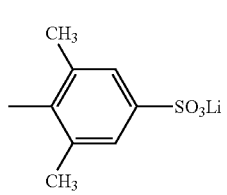 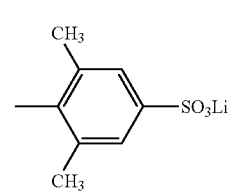

-continued
| | a-39 | 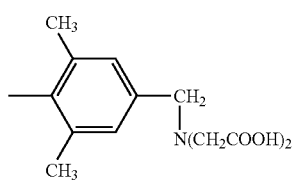 | 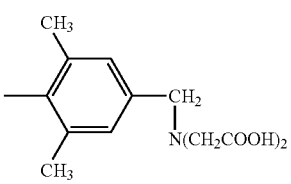 |
|---|---|---|---|
| | a-40 | 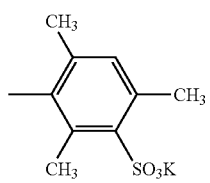 | 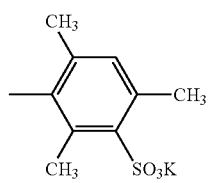 |
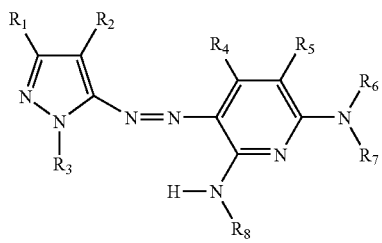
| Dye | R₁ | R₂ | R₃ | R₄ | R₅ | R₆ |
|---|---|---|---|---|---|---|
| a-41 | 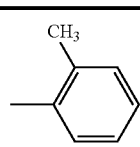 | CN | 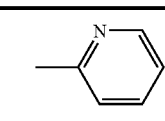 | H | CONH₂ | SO₂CH₃ |
| a-42 | 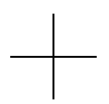 | Br | 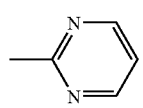 | COOEt | H | 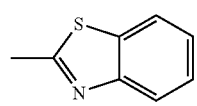 |
| a-43 | 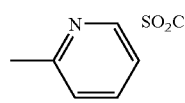 | SO₂CH₃ | 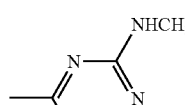 | CONH₂ | H | 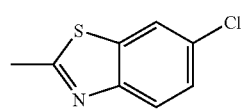 |
| a-44 |  | CN | 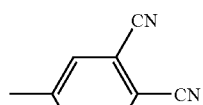 | H | H | 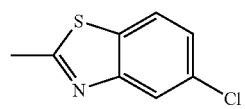 |
| a-45 | 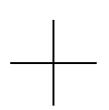 | Br | 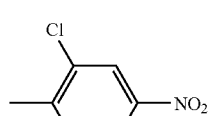 | H | CONH₂ |  |

-continued
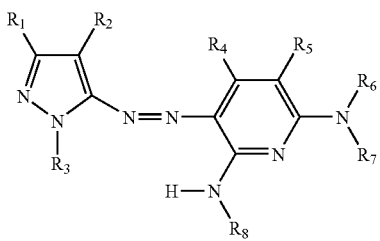
| | | | | | |
|---|---|---|---|---|---|
| a-46 |  | CN | 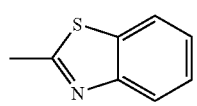 | CH₃ H | 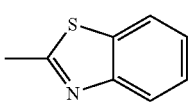 |
| Dye | R₇ | R₈ |
|---|---|---|
| a-41 | 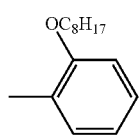 | 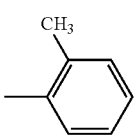 |
| a-42 | C₈H₁₇(t) | COCH₃ |
| a-43 | 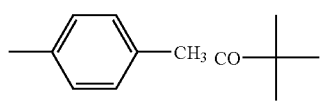 | |
| a-44 | 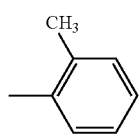 | SO₂CH₃ |
| a-45 | 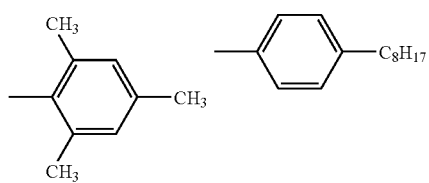 | |
| a-46 | 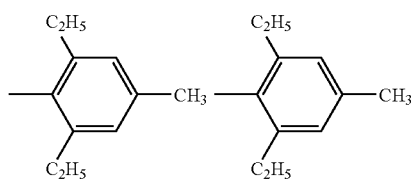 | |

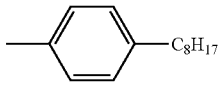

| Dye | R₁ | R₂ | R₃ | R₄ | R₅ | R₆ |
|---|---|---|---|---|---|---|
| b-1 | $CH_3$ | $CH_3$ | CN | H | -C₆H₄-C₈H₁₇ | -C₆H₄-C₈H₁₇ |
| b-2 | $CH_3$ | $CH_3$ | CN | H | 2,4,5-tri(CH₃)-C₆H₂- | 2,4,5-tri(CH₃)-C₆H₂- |
| b-3 | $CH_3$ | $CH_3$ | $CONH_2$ | H | -C₆H₄-C₈H₁₇ | 2,4,5-tri(CH₃)-C₆H₂- |
| b-4 | $CH_3$ | $CH_3$ | H | H | 2,3,4,6-tetra(CH₃)-5-SO₃Li-C₆- | 2,3,4,6-tetra(CH₃)-5-SO₃Li-C₆- |
| b-5 | $CH_3$ | H | CN | H | -C₆H₄-SO₂Na | -C₆H₄-SO₂Na |
| b-6 | $CH_3$ | $CH_3$ | H | 2-benzothiazolyl | 2,3,5,6-tetra(CH₃)-4-CH₂N(CH₂CO₂K)₂-C₆- | 2,3,5,6-tetra(CH₃)-4-CH₂N(CH₂CO₂K)₂-C₆- |
| b-7 | $CH_3$ | $CH_3$ | H | 2-benzothiazolyl | 2,4,5-tri(CH₃)-C₆H₂- | -C₆H₄-C₈H₁₇ |
| b-8 | $CH_3$ | H | H | $SO_2CH_3$ | 3,4-di-substituted-C₆H₃-SO₃Na | 3,4-di-substituted-C₆H₃-SO₃Na |

-continued
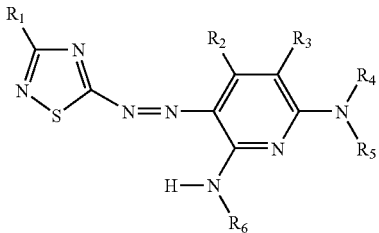
| Dye | R₁ | R₂ | R₃ | R₄ |
|---|---|---|---|---|
| c-1 | —SCH₃ | CH₃ | CN | H |
| c-2 | 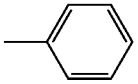 | H | CONH₂ | H |
| c-3 | 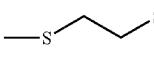 | CH₃ | H | 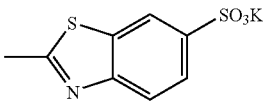 |
| c-4 | —CH₃ | CH₃ | H | 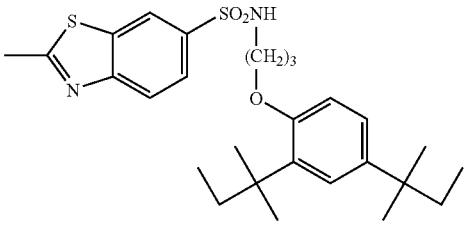 |
| c-5 | 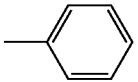 | H | H | 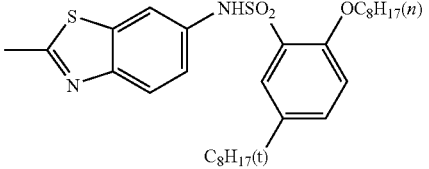 |
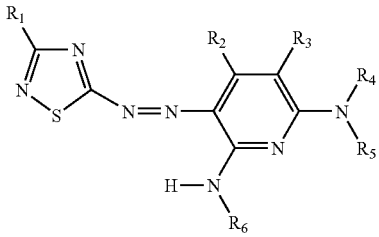
| Dye | R₅ | R₆ |
|---|---|---|
| c-1 | C₈H₁₇(t) | 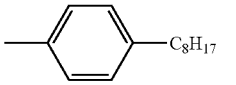 |
| c-2 | 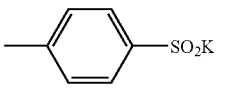 | 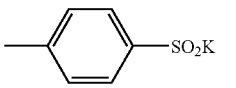 |
| c-3 | 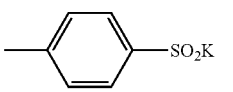 | 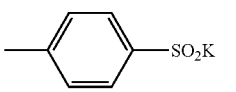 |

-continued
| | | | | | |
|---|---|---|---|---|---|
| c-4 | | 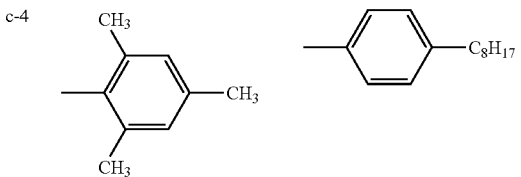 | | | |
| c-5 | | 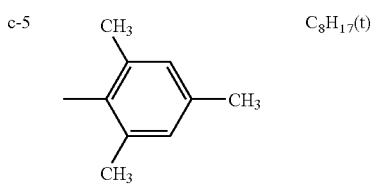 | | | C$_8$H$_{17}$(t) |
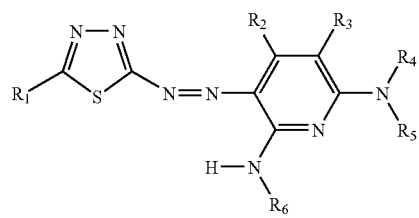
| Dye | R$^1$ | R$^2$ | R$^3$ | R$^4$ | R$^5$ |
|---|---|---|---|---|---|
| d-1 | Me | CH$_3$ | CN | H | 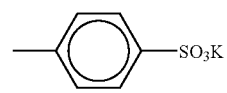 |
| d-2 | Me | CH$_3$ | CN | H | 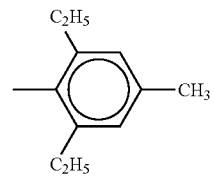 |
| d-3 | Me | H | H | 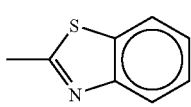 | 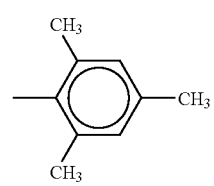 |
| d-4 | Ph | CH$_3$ | CONH$_2$ | H | 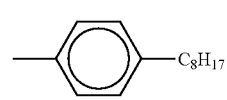 |
| d-5 | Ph | CH$_3$ | H | 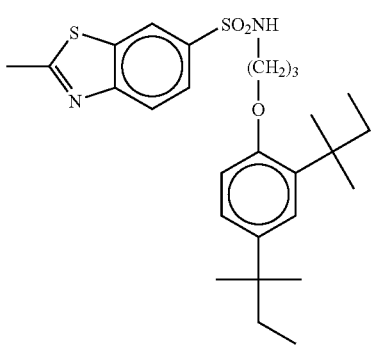 | 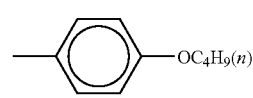 |

-continued
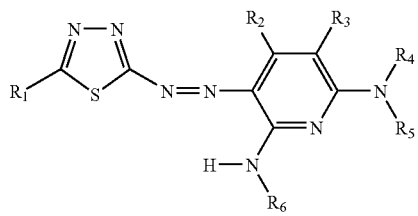
| Dye | R⁶ |
|---|---|
| d-1 | 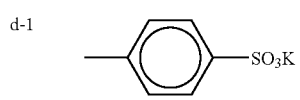 |
| d-2 | 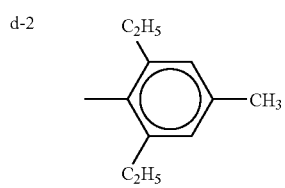 |
| d-3 | 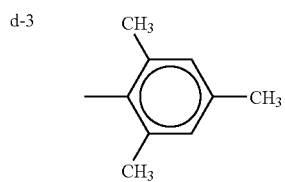 |
| d-4 | 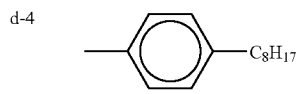 |
| d-5 | 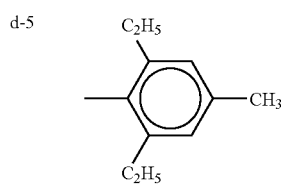 |
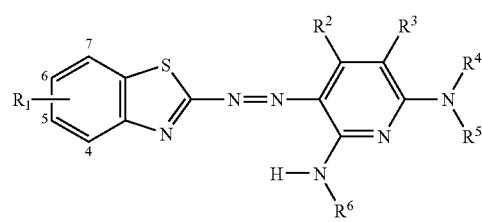
| Dye | R$_1$ | R$_2$ | R$_3$ | R$_4$ | R$_5$ | R$_6$ |
|---|---|---|---|---|---|---|
| e-1 | 5-Cl | CH$_3$ | CONH$_2$ | H | C$_8$H$_{17}$(t) | C$_8$H$_{17}$(t) |
| e-2 | 5,6-diCl | H | H | | | —⟨phenyl⟩—C$_8$H$_{17}$ |

-continued

| | | | | | |
|---|---|---|---|---|---|
| e-3 | 5,6-diCl | CH₃ | H | 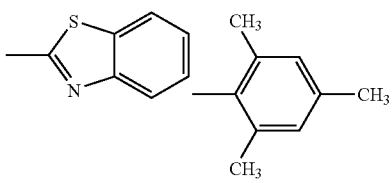 | COCH₃ |
| e-4 | 5-CH₃ | H | CN | H | 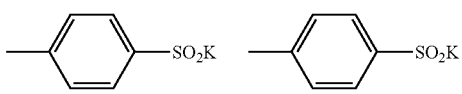 |
| e-5 | 5-NO₂ | CH₃ | H | SO₂CH₃ | 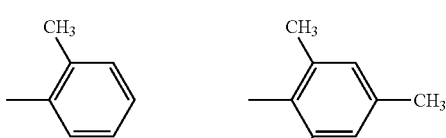 | f-1
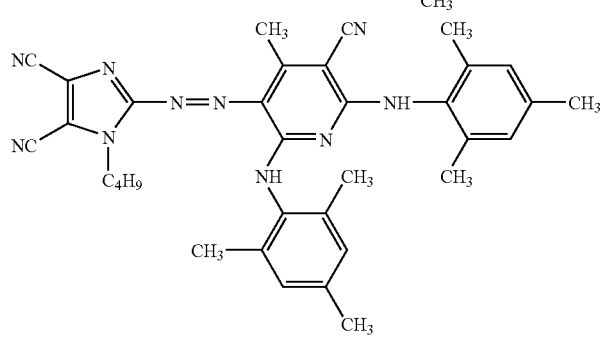

f-2
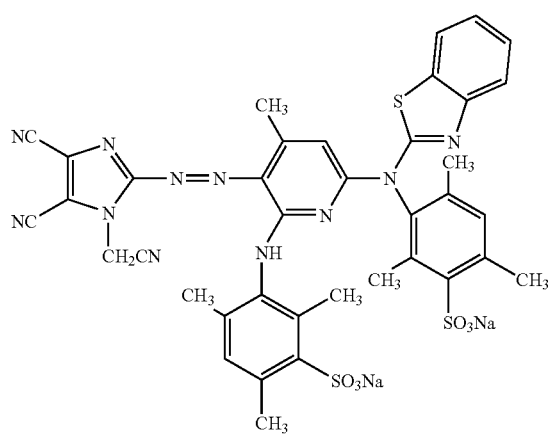

The amount of the dye to be incorporated in the ink composition of the present invention is preferably 0.1% by weight or more, more preferably 0.5% by weight or more. Further, the upper limit of the amount of the dye is preferably 20% by weight or less, more preferably 15% by weight or less.

The ink composition of the present invention comprises a dye and a surface active agent and optionally properly selected other additives incorporated therein. The dye incorporated in said ink composition acts as a dye, coloring agent or the like on the recording material. Said ink composition is preferably used as an image-forming coloring composition such as ink and coating compound and useful particularly as an ink for ink jet recording excellent in ejection stability during recording and preservability of recorded image.

Further, in order to adjust the color tone for obtaining a full-color image, the ink composition of the present invention may comprise other dyes in combination with the dyes of the present invention. Examples of these dyes which can be used in combination with the dyes of the present invention include those described in JP-A-2001-262039, paragraphs (0014)-(0084).

Other examples of the dyes which can be used in combination with the dyes of the present invention will be given below.

Examples of yellow dyes include aryl or heterylazo dyes having phenols, naphthols, anilines, pyrazolones, pyridones or closed-chain type active methylene compounds as coupling components, azomethine dyes having closed-chain type active methylene compounds as coupling components, methine dyes such as benzylidene dyes and monomethine oxonol dyes, etc., and quinone-based dyes such as naphthoquinone dye and anthraquinone dye, etc. Other examples of yellow dyes include quinophthalone dye, nitro-nitroso dye, acridine dye, and acridinone dye, etc. These dyes may assumes yellow only when chromophore is partly dissociated, and, in this case, the counter cation may be an inorganic cation such as alkaline metal ion and ammonium ion or an organic cation such as pyridinium ion and quaternary ammonium salt ion or may be contained in a polymer cation as a partial structure.

Examples of magenta dyes include aryl or heterylazo dyes having phenols, naphthols or anilines as coupling components, azomethine dyes having pyrazolones or pyrazolotriazoles as coupling components, methine dyes such as arylidene dye, styryl dye, melocyanine dye and oxonol dye, carbonium dye such as diphenylmethane dye, triphenylmethane dye and xanthene dye, quinone-based dye such as naphthoquinone, anthraquinone and anthrapyridone, and condensed polycyclic dye such as dioxazine dye. These dyes may assume magenta only when chromophore is partly dissociated, and, in this case, the counter cation may be an inorganic cation such as alkaline metal ion and ammonium ion or an organic cation such as pyridinium ion and quaternary ammonium salt ion or may be contained in a polymer cation as a partial structure.

Examples of cyan dyes include azomethine dyes such as indoaniline dye and indophenol dye, polymethine dyes such as cyanine dye, oxonol dye and melocyanine dye, carbonium dyes such as diphenylmethane dye, triphenylmethane dye and xanthene dye, phthalocyanine dyes, anthraquinone dyes, aryl or heterylazo dyes having phenols, naphthols or anilines as coupling components, and indigo-thioindigo dyes. These dyes may assume cyan only when chromophore is partly dissociated, and, in this case, the counter cation maybe an inorganic cation such as alkaline metal ion and ammonium ion or an organic cation such as pyridinium ion and quaternary ammonium salt ion or may be contained in a polymer cation as a partial structure.

Alternatively, a black dyes such as polyazo dye may be used.

Other examples of dyes employable herein include water-soluble dyes such as direct dye, acidic dye, food dye, basic dye and reactive dye. Preferred examples of these water-soluble dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52:1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71;

C.I. Basic Black 8, etc.

Further, the ink composition of the present invention may comprise pigments incorporated therein as well.

As the pigments to be used in the present invention there may be used commercially available products as well as known compounds listed in various literatures. Examples of these literatures include Color Index (compiled by The Society of Dyers and Colourists), "Kaitei Shinban Ganryo Binran (Revised Edition of Handbook of Pigments)", compiled by Japan Association of Pigment Technology, 1989, "Saishin Ganryo Ouyou Gijutsu (Modern Applied Technology of Pigments)", CMC, 1986, "Insatsu Inki Gijutsu (Printing Ink Technology)", CMC, 1984, and W. Herbst, K. Hunger, "Industrial Organic Pigments", VCH Verlagsgesellschaft, 1993. Specific examples of these pigments include organic pigments such as azo pigment (e.g., azo lake pigment, insoluble azo pigment, condensed azo pigment, chelate azo pigment), polycyclic pigment (e.g., phthalocyanine-based pigment, anthraquinone-based pigment, perylene-based pigment, perynone-based pigment, indigo-based pigment, quinacridone-based pigment, dioxazine-based pigment, isoindolinone-based pigment, quinophthalone-based pigment, diketopypyrrolopyrrole-based pigment), dyed lake pigment (e.g., acidic or basic dye lake pigment) and azine pigment, and inorganic pigments such as yellow pigment (e.g., C.I. Pigment Yellow 34, 37, 42, 53), red pigment (e.g., C.I. Pigment Red 101, 108), blue pigment (e.g., C.I. Pigment blue 27, 29, 17: 1), black pigment (e.g., C.I. Pigment Black 7, magnetite) and white pigment (e.g., C.I. Pigment White 4, 6, 18, 21).

As a pigment having a color tone suitable for image formation there is preferably used a blue or cyan pigment such as phthalocyanine pigment, anthraquinone-based indanthrone pigment (e.g., C.I. Pigment Blue 60) and dyed lake pigment-based triarylcarbonium pigment, particularly phthalocyanine pigment (Preferred examples of the phthalocyanine pigment include copper phthalocyanine such as C.I. Pigment Blue 15:1, 15:2, 15:3, 15:4 and 15:6, monochlorophthalocyanine, low chlorination copper phthalocyanine, aluminum phthalocyanine such as pigment listed in European Patent 860475, metal-free phthalocyanine such as C.I. Pigment Blue 16, and phthalocyanine having Zn, Ni or Ti as a central metal. Particularly most preferred among these phthalocyanine dyes are C.I. Pigment Blue 15:3, 15:4, and aluminum phthalocyanine).

Preferred examples of red or purple pigments include azo pigments (Preferred examples of these pigments include C.I. Pigment Red 3, 5, 11, 22, 38, 48:1, 48:2, 48:3, 48:4, 49:1, 52:1, 53:1, 57:1, 63:2, 144, 146, 184. Particularly preferred among these pigments are C.I. Pigment Red 57:1, 146, 184), quinacridone-based pigments (Preferred examples of these dyes include C.I. Pigment Red 122, 192, 202, 207, 209, and C.I. Pigment Violet 19, 42. Particularly preferred among these dyes is C.I. Pigment Red 122), dyed lake-based triarylcarbonium pigments (Preferred examples of these dyes include xanthene-based C.I. Pigment Red 81:1, C.I. Pigment Violet 1, 2, 3, 27, 39), dioxazine-based pigments (e.g., C.I. Pigment Violet 23, 37), diketopyrrolopyrrole-based pigments (e.g., C.I. Pigment Red 254), perylene pigments (e.g., C.I. Pigment Violet 29), anthraquinone-based pigments (e.g., C.I. Pigment Violet 5:1, 31, 33), and thioindigo-based pigments (e.g., C.I. Pigment Red 38, 88).

Preferred examples of yellow pigments include azo pigments (Preferred examples of these dyes include monoazo pigment-based dyes such as C.I. Pigment Yellow 1, 3, 74, 98, disazo pigment-based dyes such as C.I. Pigment Yellow 12, 13, 14, 16, 17, 83, general azo-based dyes such as C.I. Pigment Yellow 93, 94, 95, 128, 155 and benzimidazolone-based dyes such as C.I. Pigment Yellow 120, 151, 154, 156, 180. Particularly preferred among these dyes are those prepared from materials other than benzidine-based compounds), isoindoline-isoindolinone-based pigments (Preferred examples of these dyes include C.I. Pigment Yellow 109, 110, 137, 139), quinophthalone pigments (Preferred examples of these dyes include C.I. Pigment Yellow 138), and flavanthrone pigment (e.g., C.I. Pigment Yellow 24).

Preferred examples of black pigments include inorganic pigments (Preferred examples of these pigments include carbon black, and magnetite), and aniline black.

Besides these pigments, orange pigments (C.I. Pigment Orange 13, 16), and green pigments (C.I. Pigment Green 7) may be used.

The pigments which may be used in the present technique may be untreated pigments as mentioned above or may be surface-treated pigments. As surface treatment methods there may be proposed a method involving surface coat with a resin or wax, a method involving the attachment of a surface activator, a method involving the bonding of a reactive material (e.g., silane coupling agent, radical produced from an epoxy compound, polyisocyanate or diazonium salt) to the surface of pigment, etc., and these methods are described in the following literatures and patents.

(1) Kinzoku Sekken no Seishitsu to Ouyou (Properties and Application of Metal Soap) (Saiwai Shobo)

(2) Insatsu Inki Insatsu (Printing with Printing Ink) (CMC Shuppan, 1984)

(3) Saishin Ganryo Ouyou Gijutsu (Modern Applied Technology of Pigments (CMC, 1986)

(4) U.S. Pat. Nos. 5,554,739, 5,571,311

(5) JP-A-9-151342, JP-A-10-140065, JP-A-10-292143, JP-A-11-166145

In particular, self-dispersible pigments prepared by reacting the diazonium salt disclosed in the US patents with carbon black and capsulized pigments prepared according to the method disclosed in the Japanese patents δ are useful to obtain dispersion stability without using extra dispersant in the ink.

In the present invention, the pigment may be further dispersed with a dispersant. As such a dispersant there may be used any of known various compounds depending on the pigment used, e.g., surface active agent type low molecular dispersant or polymer type dispersant. Examples of these dispersants include those disclosed in JP-A-3-69949 and European Patent 549,486. When the dispersant is used, in order to accelerate the adsorption of the dispersant to the pigment, a pigment derivative called synergist may be added.

The particle diameter of the pigment which may be used in the present invention is preferably from $0.01\mu$ to $10\mu$, more preferably from $0.05\mu$ to $1\mu$.

As a method for dispersing the pigment there may be used a known dispersion technique for use in the production of ink or toner. Examples of the dispersing machine include vertical or horizontal agitator mill, attritor, colloid mill, ball mill, three-roll mill, pearl mill, super mill, impeller, disperser, KD mill, dynatron, and pressure kneader. The details of these dispersing machines are described in "Saishin Ganryo Ouyou Gijutsu (Modern Applied Technology of Pigments)", CMC, 1986.

The surface active agent to be incorporated in the ink composition of the present invention will be described hereinafter. By adjusting the liquid physical properties such as surface tension of the ink, the ejection stability of the ink can be enhanced, exerting an excellent effect of enhancing the water resistance of image and preventing bleeding of ink printed.

Examples of the aforementioned surface active agents include anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethylenealkylsulfuric acid ester, cationic surface active agents such as aliphatic amine, quaternary ammonium salt and alkylpyridinium salt, nonionic surface active agents such as polyoxyethylenealkyl ether, polyoxyethylenealkylallyl ether, polyoxyethylenealiphatic acid ester, sorbitanaliphatic acid ester, polyoxyethylenesorbitanaliphatic acid ester, polyoxyethylenealkylamine, glycerinaliphatic acid ester, oxyethyleneoxypropylene block copolymer and acetylene-based polyoxyethylene oxide, amphoteric surface active agents such as amino acid-based surface active agent and betaine-based surface active agent, fluorine-based surface active agents, and silicon-based compounds. These surface active agents may be used singly or in combination of two or more thereof.

From the standpoint of the aforesaid effect and the ejection stability of ink and the penetration of ink into paper, nonionic surface active agents are desirable. In particular, a compound represented by the following general formula (I), (II) or (III) is more desirable.

Firstly, the compound represented by the general formula (I) will be described.

General formula (I)

In the general formula (I), $R^{21}$ represents a $C_5$-$C_{40}$, preferably $C_8$-$C_{18}$ alkyl group which may be straight-chain or branched or may be substituted.

Examples of the groups which can substitute on the alkyl group represented by $R^{21}$ include aryl groups (e.g., phenyl, o-tollyl, p-tollyl, p-t-butylphenyl), alkoxy groups (e.g., methoxy, ethoxy, n-butoxy), halogen atoms (e.g., chlorine atom, bromine atom), etc.

Specific examples of the alkyl group represented by $R^{21}$ include n-pentyl, n-hexyl, n-octyl, n-decyl, n-dodecyl, n-pentadecyl, n-octadecyl, 2-ethylhexyl, 1-ethylpnetyl, 1-n-butylpentyl, 1-n-pentylhexyl, 1-n-hexylheptyl, 1-n-heptyloctyl, 1-n-octylnonyl, 6-methoxyhexyl, 2-phenylethyl, etc.

The suffix $m_1$ represents the average number of added moles of ethylene oxide which is from 2 to 40, preferably from 3 to 30, particularly from 3 to 20.

Particularly preferred among the compounds represented by the general formula (I) is a compound represented by the following general formula (I-1).

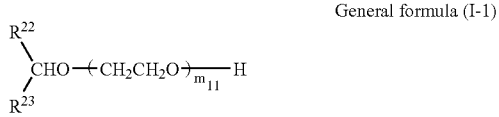

General formula (I-1)

In the general formula (I-1), $R^{22}$ and $R^{23}$ each represent a $C_4$-$C_{10}$ saturated hydrocarbon, with the proviso that the sum of the number of carbon atoms in $R^{22}$ and $R^{23}$ is from 8 to 18. The suffix $m_{11}$ represents the average number of added moles of ethylene oxide which is from 3 to 20. Examples of the $C_4$-$C_{10}$ saturated hydrocarbon represented by $R^{22}$ or $R^{23}$ include n-butyl, i-butyl, n-pentyl, n-hexyl, n-heptyl, n-octyl, 2-ethylhexyl, n-nonyl, n-decyl, etc. The sum of the number of carbon atoms in $R^{22}$ and $R^{23}$ is from 8 to 18, more preferably from 8 to 16. The suffix $m_1$, is from 3 to 20, more preferably from 5 to 20, even more preferably from 6 to 18.

Specific examples of the compound represented by the general formula (I) will be given below, but the present invention is not limited thereto.

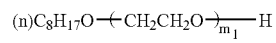

W1-1, 2

W1-1: $m_1 = 5$
W1-2: $m_1 = 10$

W1-3, 4

W1-3: $m_1 = 10$
W1-4: $m_1 = 15$

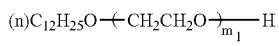

W1-5~7

W1-5: $m_1 = 10$
W1-6: $m_1 = 15$
W1-7: $m_1 = 20$

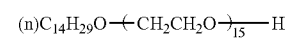

W1-8

W1-9

W1-10, 11

W1-10: $m_1 = 12$
W1-11: $m_1 = 25$

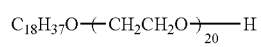

W1-12

Table 1 below shows specific examples of the compound represented by the general formula (I-1), but the present invention is not limited thereto.

TABLE 1

| No. | $R^{22}$ | $R^{23}$ | $m_{11}$ |
|---|---|---|---|
| W1-13 | (n) $C_4H_9$ | (n) $C_4H_9$ | 3 |
| W1-14 | (i) $C_4H_9$ | (i) $C_4H_9$ | 5 |
| W1-15 | (i) $C_4H_9$ | (i) $C_4H_9$ | 9.5 |
| W1-16 | (i) $C_4H_9$ | (i) $C_4H_9$ | 11.4 |
| W1-17 | (n) $C_5H_{11}$ | (n) $C_5H_{11}$ | 8 |
| W1-18 | (n) $C_5H_{11}$ | (n) $C_5H_{11}$ | 10 |
| W1-19 | (n) $C_5H_{11}$ | (n) $C_5H_{11}$ | 11.4 |
| W1-20 | (n) $C_5H_{11}$ | (n) $C_5H_{11}$ | 13.5 |
| W1-21 | (n) $C_5H_{11}$ | (n) $C_6H_{13}$ | 15 |
| W1-22 | (n) $C_6H_{13}$ | (n) $C_6H_{13}$ | 10 |
| W1-23 | (n) $C_6H_{13}$ | (n) $C_6H_{13}$ | 13.6 |
| W1-24 | (n) $C_6H_{13}$ | (n) $C_6H_{13}$ | 15.8 |
| W1-25 | (n) $C_6H_{13}$ | (n) $C_7H_{15}$ | 16 |
| W1-26 | (n) $C_7H_{15}$ | (n) $C_7H_{15}$ | 15 |
| W1-27 | (n) $C_7H_{15}$ | (n) $C_7H_{15}$ | 16.5 |
| W1-28 | (n) $C_8H_{17}$ | (n) $C_8H_{17}$ | 14 |
| W1-29 | (n) $C_8H_{17}$ | (n) $C_8H_{17}$ | 17.6 |
| W1-30 | (n) $C_8H_{17}$ | (n) $C_{10}H_{21}$ | 20 |

The compound represented by the general formula (II) will be described hereinafter.

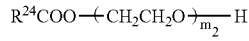

General formula (II)

In the general formula (II), $R^{24}$ represents a $C_5$-$C_{40}$, preferably $C_5$-$C_{30}$ alkyl group which may be straight-chain or branched or may be substituted.

Examples of the groups which can substitute on the alkyl group represented by $R^{24}$ include aryl groups (e.g., phenyl, o-tollyl, p-tollyl, p-t-butylphenyl), alkoxy groups (e.g., methoxy, ethoxy, n-butoxy), halogen atoms (e.g., chlorine atom, bromine atom), etc. Specific examples of the alkyl group represented by $R^{24}$ include n-pentyl, n-hexyl, n-octyl, n-decyl, n-dodecyl, n-pentadecyl, n-octadecyl, 2-ethylhexyl, 1-ethylpentyl, 1-n-butylheptyl, 1-n-hexylnonyl, 1-n-heptyldecyl, 1-n-octyldodecyl, 1-n-decyltetradecyl, 6-methoxyhexyl, 2-phenylethyl, etc.

The suffix $m_2$ represents the average number of added moles of ethylene oxide which is from 2 to 40, preferably from 3 to 30, particularly from 4 to 20.

Particularly preferred among the compounds represented by the general formula (II) is a compound represented by the following general formula (II-1).

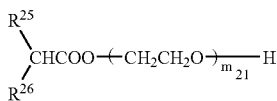

General formula (II-1)

In the general formula (II-1), $R^{25}$ and $R^{26}$ each represent a $C_2$-$C_{20}$, preferably $C_4$-$C_{13}$ saturated hydrocarbon group. Examples of the $C_2$-$C_{20}$ saturated hydrocarbon group represented by $R^{25}$ or $R^{26}$ include ethyl, n-butyl, i-butyl, n-pentyl, n-hexyl, n-heptyl, n-octyl, 2-ethylhexyl, n-nonyl, n-decyl, n-dodecyl, n-hexadecyl, n-octadecyl, etc. The suffix $m^{21}$ represents the average number of added moles of ethylene oxide which is from 2 to 40, preferably from 3 to 30.

Specific examples of the compound represented by the general formula (II) will be given below, but the present invention is not limited thereto.

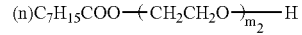

W2-1, 2

W2-1: $m_2 = 10$
W2-2: $m_2 = 15$

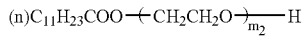

W2-3~5

W2-3: $m_2 = 10$
W2-4: $m_2 = 15$
W2-5: $m_2 = 20$

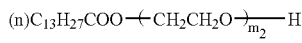

W2-6~7

W2-6: $m_2 = 10$
W2-7: $m_2 = 15$

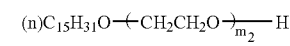

W2-8, 9

W2-8: $m_2 = 10$
W2-9: $m_2 = 15$

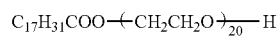

W2-10

W2-11

W2-12

Examples of the compound represented by the general formula (II-1) include singly-terminated ester of polyethylene oxide of 2-butyloctanoic acid, polyethylene oxide adduct of undedane-6-ol, etc. Table 2 below shows specific examples of the compound represented by the general formula (II-1), but the present invention is not limited thereto.

TABLE 2

| No. | $R^{25}$ | $R^{26}$ | $m_{21}$ |
|---|---|---|---|
| W2-13 | $C_2H_5$ | $C_4H_9$ | 3 |
| W2-14 | $C_2H_5$ | $C_4H_9$ | 5 |
| W2-15 | $C_4H_9$ | $C_6H_{13}$ | 9.5 |
| W2-16 | $C_6H_{13}$ | $C_8H_{17}$ | 5 |
| W2-17 | $C_6H_{13}$ | $C_8H_{17}$ | 8 |
| W2-18 | $C_6H_{13}$ | $C_8H_{17}$ | 10 |
| W2-19 | $C_6H_{13}$ | $C_8H_{17}$ | 11.4 |
| W2-20 | $C_6H_{13}$ | $C_8H_{17}$ | 12.5 |
| W2-21 | $C_6H_{13}$ | $C_8H_{17}$ | 15 |
| W2-22 | $C_6H_{13}$ | $C_8H_{17}$ | 25 |
| W2-23 | $C_7H_{15}$ | $C_9H_{19}$ | 14 |
| W2-24 | $C_7H_{15}$ | $C_9H_{19}$ | 15 |
| W2-25 | $C_7H_{15}$ | $C_9H_{19}$ | 20 |
| W2-26 | $C_7H_{15}$ | $C_9H_{19}$ | 25 |
| W2-27 | $C_8H_{17}$ | $C_{10}H_{21}$ | 30 |
| W2-28 | $C_{10}H_{21}$ | $C_{12}H_{25}$ | 20 |
| W2-29 | $C_{10}H_{21}$ | $C_{12}H_{25}$ | 25 |
| W2-30 | $C_{10}H_{21}$ | $C_{13}H_{27}$ | 20 |
| W2-31 | $C_{10}H_{21}$ | $C_{13}H_{27}$ | 25 |
| W2-32 | $C_{10}H_{21}$ | $C_{13}H_{27}$ | 40 |

The compound represented by the general formula (I) or (II) can be synthesized by a known method, e.g., method described in Takehiko Fujimoto, "Shin Kaimen Kasseizai Nyumon (New Introduction to Surface Active Agents)", completely revised version, 1992, page 94-107.

The compound represented by the general formula (III) will be described hereinafter.

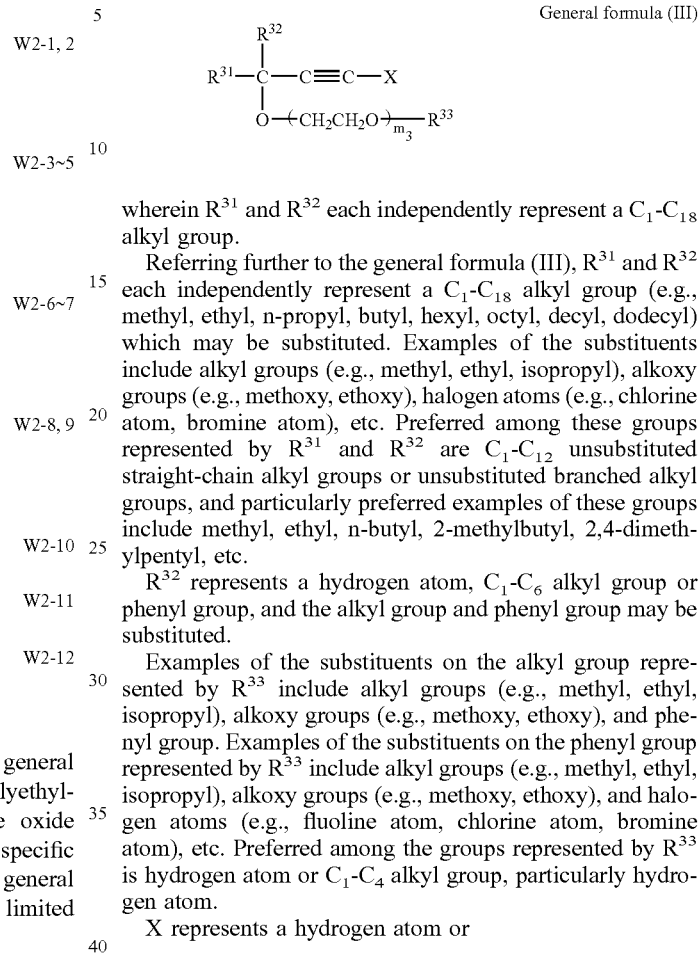

General formula (III)

wherein $R^{31}$ and $R^{32}$ each independently represent a $C_1$-$C_{18}$ alkyl group.

Referring further to the general formula (III), $R^{31}$ and $R^{32}$ each independently represent a $C_1$-$C_{18}$ alkyl group (e.g., methyl, ethyl, n-propyl, butyl, hexyl, octyl, decyl, dodecyl) which may be substituted. Examples of the substituents include alkyl groups (e.g., methyl, ethyl, isopropyl), alkoxy groups (e.g., methoxy, ethoxy), halogen atoms (e.g., chlorine atom, bromine atom), etc. Preferred among these groups represented by $R^{31}$ and $R^{32}$ are $C_1$-$C_{12}$ unsubstituted straight-chain alkyl groups or unsubstituted branched alkyl groups, and particularly preferred examples of these groups include methyl, ethyl, n-butyl, 2-methylbutyl, 2,4-dimethylpentyl, etc.

$R^{32}$ represents a hydrogen atom, $C_1$-$C_6$ alkyl group or phenyl group, and the alkyl group and phenyl group may be substituted.

Examples of the substituents on the alkyl group represented by $R^{33}$ include alkyl groups (e.g., methyl, ethyl, isopropyl), alkoxy groups (e.g., methoxy, ethoxy), and phenyl group. Examples of the substituents on the phenyl group represented by $R^{33}$ include alkyl groups (e.g., methyl, ethyl, isopropyl), alkoxy groups (e.g., methoxy, ethoxy), and halogen atoms (e.g., fluoline atom, chlorine atom, bromine atom), etc. Preferred among the groups represented by $R^{33}$ is hydrogen atom or $C_1$-$C_4$ alkyl group, particularly hydrogen atom.

X represents a hydrogen atom or

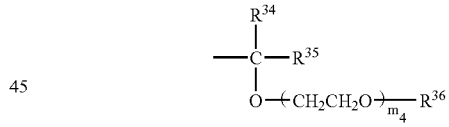

in which $R^{34}$ and $R^{35}$ each independently represent a $C_1$-$C_{18}$ alkyl group. Preferred substituents on $R^{34}$ and $R^{35}$ and specific examples thereof are those selected from the same group as that of $R^{31}$ and $R^{32}$ mentioned above. $R^{36}$ represents a hydrogen atom, $C_1$-$C_6$ alkyl group or phenyl group, and its preferred specific examples are substituents and specific examples selected from the same group as that of $R^{33}$ mentioned above.

The suffixes $m^3$ and $m^4$ each represent the average number of added moles of ethylene oxide, with the proviso that the sum of $m^3$ and $m^4$ is from 0 to 100, preferably from 0 to 50, particularly from 0 to 40.

Herein, when $m^3$ is 0, $R^{33}$ represents a hydrogen atom, and when $m^4$ is 0, $R^{36}$ represents a hydrogen atom. Further, when X represents a hydrogen atom, $m^3$ is 1 to 100, preferably from 1 to 50, particularly from 1 to 40.

Particularly preferred among the compounds represented by the general formula (III) is a compound represented by the following general formula (III-1).

General formula (III-1)

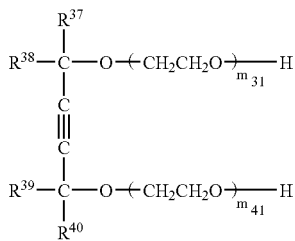

wherein $R^{37}$, $R^{38}$, $R^{39}$ and $R^{40}$ each independently represent a $C_1$-$C_6$, preferably $C_1$-$C_4$ alkyl group. The suffixes $m_{31}$ and $m_{41}$ each represent the number of added moles of ethylene oxide and the sum of them is from 0 to 40, preferably from 2 to 20.

Specific examples of the compound represented by the general formula (III) or (III-1) will be given below, but the present invention is not limited thereto.

W5-1

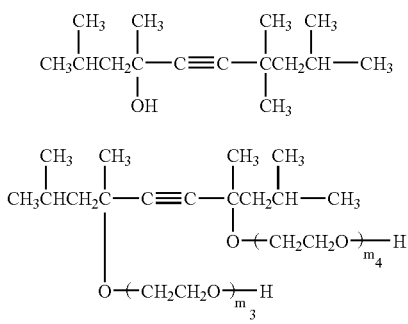

W5-2~6

W5-2: $m_3 + m_4 = 1.3$
W5-3: $m_3 + m_4 = 3.5$
W5-4: $m_3 + m_4 = 10$
W5-5: $m_3 + m_4 = 20$
W5-6: $m_3 + m_4 = 30$

W5-7, 8

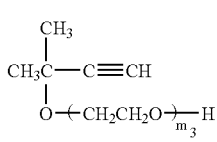

W5-7: $m_3 = 5$
W5-8: $m_3 = 10$

W5-9, 10

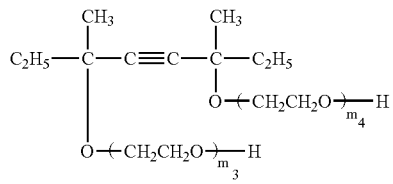

W5-9: $m_3 + m_4 = 3$
W5-10: $m_3 + m_4 = 10$

W5-11

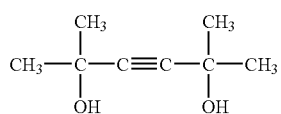

W5-12

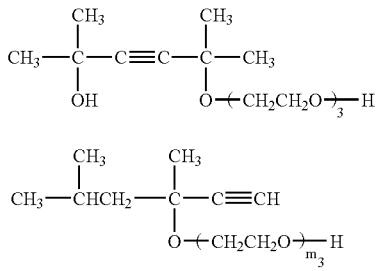

W5-13, 14

W5-13: $m_3 = 5$
W5-14: $m_3 = 10$

W5-15, 16

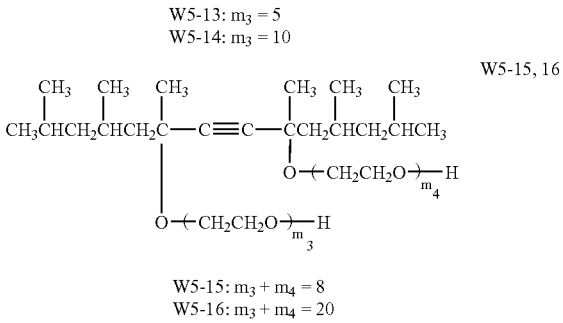

W5-15: $m_3 + m_4 = 8$
W5-16: $m_3 + m_4 = 20$

W5-17, 18

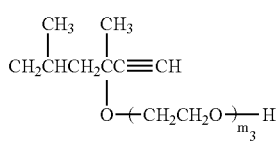

W5-17: $m_3 = 5$
W5-18: $m_3 = 10$

W5-19

W5-20

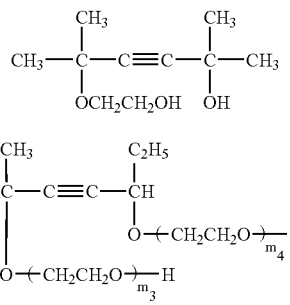

$m_3 + m_4 = 2$

The compound represented by the general formula (III) or (III-1) can be synthesized by a known method, e.g., method described in Takehiko Fujimoto, "Shin Kaimen Kasseizai Nyumon (New Introduction to Surface Active Agents)", completely revised version, 1992, page 94-107.

Further, the compound represented by the general formula (III) or (III-1) is easily available also as a commercial product and specific examples of its tradename include SURFYNOL Series 61, 82, 104, 420, 440, 465, 485, 504, CT-111, CT-121, CT-131, CT-136, CT-141, CT-151, CT-171, CT-324, DF-37, DF-58, DF-75, DF-110D, DF-210, GA, OP-340, PSA-204, PSA-216, PSA-336, SE, SE-F, and Dinol 604 (produced by Nissin Chemical Industry Co., Ltd. and Air Products & Chemicals), and Olfine A, B, AK-02, CT-151W, E1004, E1010, P, SPC, STG, Y, and 32W (produced by Nissin Chemical Industry Co., Ltd.)

Preferred examples of the compound represented by the general formula (III-1) include ethylene oxide adducts of acetylene-based diol (SURFYNOL Series (Air Products & Chemicals), preferably those having a molecular weight of from 200 to 1,000, more preferably those having a molecular weight of from 300 to 900, particularly those having a molecular weight of from 400 to 900.

Preferred examples of the surface active agent to be incorporated in the ink composition in the present invention include anionic surface active agents having a two-chain or branched hydrophobic moiety, anionic or nonionic surface active agents having a hydrophilic group in the vicinity of the center of hydrophobic moiety, and nonionic surface active agents having a two-chain or branched hydrophobic moiety because they can be difficultly precipitated or separated out and cause little foaming. Preferred among these surface active agents are nonionic surface active agents, and from this standpoint of view, preferred examples of the nonionic surface active agents having a two-chain or branched hydrophobic moiety include compounds represented by the general formula (I-1) or (II-1), and preferred examples of the nonionic surface active agents having a hydrophilic group in the vicinity of the center of hydrophobic moiety include compounds represented by the general formula (III-1).

The content of the surface active agent in the ink composition of the present invention is from 0.05 to 50 g/L, preferably from 0.05 to 30 g/L, more preferably from 0.1 to 20 g/L. When the content of the surface active agent in the ink composition falls below 0.05 g/L, the resulting ink exhibits a drastic deterioration in print quality such as ejection stability and resistance to bleeding and whisker during color mixing. On the contrary, when the content of the surface active agent in the ink composition exceeds 50 g/L, the resulting ink can be attached to hard surface when ejected, causing defective printing. From this standpoint of view, the static surface tension of the ink of the present invention is preferably 20 mN/m or more, more preferably 25 mN/m or more at 25° C. Further, it is preferably 60 mN/m or less, more preferably 50 mN/m or less, particularly 40 mN/m or less at 25° C.

The drying inhibitor and penetration inhibitor will be described hereinafter. The ink composition of the present invention preferably comprises a drying inhibitor incorporated there into prevent clogging of the ink spray nozzle due to drying or a penetration accelerator incorporated therein to facilitate the penetration of ink into paper.

As the drying inhibitor there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2, 6-hexanetriol, acetylene glycol derivative, glycerin and trimethylolpropane, lower alkylethers of polyvalent alcohol such as ethylene glycolmonomethyl (or ethyl) ether, diethylene glycol monomethyl (or ethyl) ether and triethylene glycol monoethyl (or butyl) ether, heterocyclic rings such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof.

Examples of the penetration accelerator employable herein include alcohols such as ethanol, isopropanol, butanol, di(tri)ethylene glycol monobutyl ether and 1,2-hexanediol, sodium laurylsulfate, sodium oleate, and non-ionic surface active agents. These penetration accelerators are preferably used in an amount such that no print bleeding or print through occurs.

In the present invention, a compound represented by the following general formula (VI) is preferably used as a drying inhibitor or penetration accelerator.

$$R^{41}O(R^{42}O)nH \qquad \text{General formula (VI)}$$

In the general formula (VI), $R^{41}$ represents a $C_1$-$C_4$ alkyl group; $R^{42}$ represents a $C_2$-$C_3$ alkyl group; and n represents an integer of from 2 to 5.

Specific examples of the compound represented by the general formula (VI) include diethylene glycol monomethyl ether, diethylene glycol monoethyl ether, diethylene glycol monobutyl ether, triethylene glycol monomethyl ether, triethylene glycol monobutyl ether, dipropylene glycol monomethyl ether, dipropylene glycol monoethyl ether, and tripropylene glycol monomethyl ether. Preferred among these compounds are triethylene glycol monobutyl ether, and diethylene glycol monobutyl ether, particularly triethylene glycol monobutyl ether.

The compound represented by the general formula (VI) is preferably incorporated in the ink composition in an amount of from 5 to 50% by weight, more preferably from 10 to 40% by weight.

The aforesaid mono- or dialkyl ether of polyvalent alcohol has a surface activity but is not regarded as a surface active agent as described previously but as a drying inhibitor or penetration accelerator in the present invention.

Next, the preparation method of the ink composition of the invention is explained.

The ink composition of the present invention can be prepared by dissolving and/or dispersing the dye in an aqueous medium, adding a predetermined amount of the surface active agent to the solution or dispersion, and then optionally adding additives such as drying inhibitor and penetration inhibitor to the solution or dispersion. The term "aqueous medium" as used in the present invention is meant to indicate water or a mixture of water and a small amount of a water-miscible organic solvent optionally comprising additives such as wetting agent, stabilizer and preservative incorporated therein.

Examples of the water-miscible organic solvent employable in the present invention include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylene diamine, diethylenetriamine, triethylenetetramine, polyethyleneimine, tetramethylpropylenediamine), and other polar solvents (e.g., formamide, N,N-dimethylformamide, N,N- dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the aforementioned water-miscible organic solvents may be used in combination.

In the case where the dye of the present invention is oil-soluble, the ink can be prepared by emulsion-dispersing the oil-soluble dye in an aqueous medium in the form of solution in a high boiling organic solvent. Further, the surface active agent may be emulsion-dispersed in the aqueous medium together with said oil-soluble dye so that the surface active agent is present in the same oil droplet together with said oil-soluble dye or emulsions prepared by separately emulsion-dispersing the oil-soluble dye and the surface active agent may be mixed with each other or the surface active agent may be dissolved or dispersed in the aqueous medium, but it is preferred that the surface active agent be present in the same oil droplet together with said oil-soluble dye.

The aforesaid high boiling organic solvent means one having a boiling point of 150° C. or more, preferably 170° C. or more.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyl dodecaneamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-(4-dodecyloxy phenylsulfonyl)phenol), carboxylic acids (e.g., 2-(2,4-di-tert-amylphenoxybutyric acid, 2-ethoxy octanedecanoic acid), and alkylphosphoric acids (e.g., di-2(ethylhexyl)phosphoric acid, dipheylphosphoric acid). The high boiling organic solvent may be used in an amount of from 0.01 to 20 times, preferably from 0.05 to 5 times that of the oil-soluble dye.

These high boiling organic solvents may be used singly or in admixture of two or more thereof (e.g., tricresyl phosphate and dibutyl phthalate, trioctyl phosphate and di(2-ethylhexyl)sebacate, dibutyl phthalate and poly(N-t-butylacrylamide)).

For examples of compounds other than the aforementioned high boiling organic solvents to be used in the invention and/or methods for the synthesis of these high boiling organic solvents, reference can be made to U.S. Pat. Nos. 2,322,027, 2,533,514, 2,772,163, 2,835,579, 3,594, 171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159,573, 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

The aforementioned high boiling organic solvents are used in an amount of preferably from 0.01 to 3.0 times, more preferably from 0.01 to 1.0 times that of the oil-soluble dye by weight.

In the present invention, the oil-soluble dye and the high boiling organic solvent are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. to 150° C. at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane). However, the present invention is not limited to these organic solvents.

The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase, but a so-called phase inversion emulsification method involving the dropwise addition of an aqueous phase to an oil phase is preferably used.

In the present invention, the emulsion dispersion may be effected with the aforesaid surface active agents. Preferred examples of the surface active agents employable herein include anionic surface active agents such as aliphatic acid salt, alkylsulfuric acid ester, alkylbenzenesulfonate, alkylnaphthalenesulfonate, dialkylsulfosuccinate, alkylphosphoric acid esters, naphthalenesulfonic acid-formalin condensate and polyoxyethylenealkylsulfuric acid ester, and nonionic surface active agents such as polyoxyethylenealkyl ether, polyoxyethylenealkylallyl ether, polyoxyethylene-aliphatic acid ester, sorbitanaliphatic acid ester, polyoxyethylenesorbitanaliphatic acid ester, polyoxyethylenealkylamine, glycerinaliphatic acid ester and oxyethyleneoxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be preferably used. Those listed as surface active agents in JP-A-59-157, 636, pp. 37-38, and Research Disclosure No. 308119 (1989) may be used.

For the purpose of stabilizing the ink shortly after emulsification, the aforementioned surface active agents may be used in combination with a water-soluble polymer. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have $-SO_3^-$ or $-COO^-$. In the case where these polymers substantially insoluble in an aqueous medium are used, they are preferably used in an amount of not greater than 20% by weight, more preferably not greater than 10% by weight based on the amount of the high boiling organic solvent.

In the case where emulsion dispersion is effected to disperse the oil-soluble dye or high boiling organic solvent to make an aqueous ink, a particularly important factor is control over the particle size of the aqueous ink. In order to enhance the color purity or density during the formation of an image by ink ejection, it is essential to reduce the average particle size. The volume-average particle diameter of the aqueous ink is preferably not greater than 1 µm, more preferably from 5 nm to 100 nm.

The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistry)", 4th ed., pp. 417-418. For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO., LTD.). Further, dynamic light scattering method utilizing laser doppler effect is particularly preferred because it is capable of measuring even small particle size.

The term "volume-average particle diameter" as used herein is meant to indicate average particle diameter weighted with particle volume, which is obtained by dividing the sum of the product of the diameter and the volume of individual particles in the aggregate of particles by the total volume of the particles. For the details of volume-average particle diameter, reference can be made to Souichi Muroi, "Koubunshi Ratekkusu no Kagaku (Chemistry of Polymer Latexes)", Koubunshi Kankokai, page 119.

It was also made obvious that the presence of coarse particles has an extremely great effect on the printing properties. In other words, coarse particles clog the head nozzle. Even if coarse particles don't go so far as to clog the head nozzle, dirt matters may be formed whereby the ink cannot be ejected or can be deviated when ejected, giving a serious effect on the printing properties. In order to prevent this trouble, it is important to keep the number of particles having a diameter of not smaller than 5 µm and not smaller than 1 µm in the resulting ink to 10 or less and 1,000 or less, respectively, per 1 µl of the ink.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-6-47264, etc., and examples of commercially available high pressure homogenizers include Gaulin homogenizer (produced by A. P. V GAULLN INC.), microfluidizer (produced by MICROFLUIDEX INC.) and altimizer (produced by SUGINO MACHINE LIMITED). In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultrahigh pressure jet stream is De BEE2000 (produced by BEE INTERNATIONAL LTD.).

The pressure at which emulsion is carried out by a high pressure emulsion disperser is not lower than 50 MPa, preferably not lower than 60 MPa, more preferably not lower than 180 MPa.

For example, the combined use of two or more emulsifiers as in a method involving the emulsification by an agitated emulsifier followed by the passage through a high pressure homogenizer is particularly preferred. Alternatively, a method is preferably used which comprises effecting the emulsion dispersion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the stand point of emulsion stability and safety/hygiene. The removal of the low boiling solvent can be accomplished by any known various method such as evaporation method, vacuum evaporation method and ultrafiltration method depending on the kind of the solvent to be removed. The step of removing the low boiling organic solvent is preferably effected as rapidly as possible shortly after emulsification.

In the case where the ink composition obtained in the present invention is used in ink jet recording, etc., additives such as ultraviolet absorber, oxidation inhibitor, viscosity adjustor, dispersant, dispersion stabilizer, antifungal agent, rust preventive, pH adjustor, anti-foaming agent and chelating agent may be properly selected and used in a proper amount.

Examples of the ultra violet absorber to be used to enhance the preservability of the image in the present invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-8-501291, compounds as disclosed in Research Disclosure No. 24239, and compounds which absorb ultraviolet rays to emit fluorescence, i.e., so-called fluorescent brighteners, such as stilbene-based and benzoxazole-based compounds.

Examples of the antifungal agent to be used in the invention include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight. For the details of these antifungal agents, reference can be made to "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive include acidic salfite, sodium thiosulfate, ammonium thioglycollate, diisopropyl ammonium nitrite, pentaerythritol tetranitrate, dicyclohexl ammonium nitrite, benzotriazole and the like. They may preferably be used in the ink in an amount of 0.02 to 5.00 mass %.

The pH adjustor to be used in the present invention can be preferably used from the standpoint of pH adjustment, imparting dispersion stability, etc., and it is preferred that the pH adjustor be added to make pH 4.5 to 10.0, more preferably 6 to 10.

Examples of the pH adjustor include basic pH adjustors such as organic base and inorganic alkali, and acidic pH adjustors such as organic acid and inorganic acid.

Examples of the aforementioned organic base include triethanolamine, diethanolamine, N-methyldiethanolamine, dimethylethanolamine, etc. Examples of the aforementioned inorganic alkali include hydroxide of alkaline metal (e.g., sodium hydroxide, lithium hydroxide, potassium hydroxide), carbonate of alkaline metal (e.g., sodium carbonate, sodium hydrogen carbonate), and ammonia.

Further, examples of the aforementioned organic acid include acetic acid, propionic acid, trifluoroacetic acid, alkylsulfonyl acid, etc. Examples of the aforementioned organic acid include hydrochloric acid, sulfuric acid, phosphoric acid, etc.

The viscosity of the ink of the present invention is preferably 30 mPa·s or less. Since the viscosity of the ink of the present invention is more preferably adjusted to 20 mPa·s or less, a viscosity adjustor may be used for the purpose of adjusting viscosity. Examples of the viscosity adjustor employable herein include celluloses, water-soluble polymers such as polyvinyl alcohol, and nonionic surface active agents. For the details of these viscosity adjustors, reference can be made to "Nendo Chousei Gijutsu (Technology for Viscosity Adjustment)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162-174, 1997.

In the present invention, as the dispersant and dispersion stabilizer there may be used the aforementioned various cationic, anionic and nonionic surface active agents as necessary, and as the anti-forming agent there may be used a fluorine-based or silicone-based compound or a chelating agent such as EDTA as necessary.

The recording paper and recording film to be used in the ink jet recording method of the present invention will be described hereinafter.

As the support in the recording paper and recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 μm to 250 μm. The basis weight of the support is preferably from 10 to 250 g/m$^2$.

An image-receiving layer and a back coat layer may be provided on the support directly or with a size press or anchor coat layer of starch, polyvinyl alcohol or the like interposed therebetween to prepare a material for receiving the ink of the invention. The support may be further subjected to leveling using a calendering machine such as machine calender, TG calender and soft calender.

In the present invention, as the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support comprises a porous material or aqueous binder incorporated therein. The image-receiving layer also preferably comprises a pigment incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, bariumsulfate, calcium sulfate, titanium dioxide, zinc sulfate and zinc carbonate, and organic pigments such as styrene-based pigment, acrylic pigment, urea resin and melamine resin. Particularly preferred among these pigments are porous inorganic white pigments. In particular, synthetic amorphous silica having a large pore area, etc. are preferred. As the synthetic amorphous silica there may be also used anhydrous silicate obtained by dry method or hydrous silicate obtained by wet method, but hydrous silicate is particularly preferred. These pigments may be used in combination of two or more thereof.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the invention, particularly preferred among these aqueous binders are polyvinyl alcohol and silanol-modified polyvinyl alcohol from the standpoint of adhesion to pigment and exfoliation resistance of ink-receiving layer.

The ink-receiving layer may comprise a mordant, a waterproofing agent, a light-resistance improver, a surface active agent, a film hardener and other additives incorporated therein besides the pigments and aqueous binders.

The mordant to be incorporated in the image-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

The waterproofing agent can be used to render the image waterproof, and as such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, cation polyacrylamide, colloidal silica, etc., and particularly preferred among these cationic resins is polyamide polyamine epichlorohydrin. The content of such a cation resin is preferably from 1% to 15% by weight, particularly from 3% to 10% by weight based on the total solid content of the ink-receiving layer.

Examples of the light-resistance improver include zinc sulfate, zinc oxide, hindered amine-based oxidation inhibitors, benzophenone-based and benzotriazole-based ultraviolet absorbers, etc. Particularly preferred among these light-resistance improvers is zinc sulfate.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A-1-161236, page 222, etc.

Other examples of additives to be incorporated in the image-receiving layer include pigment dispersants, thickening agents, antifoaming agents, dyes, fluorescent brighteners, preservatives, pH adjustors, matting agents, and film hardeners. There may be provided one or two image-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives, and waterproofing agents.

The layers (including back layer) constituting the ink jet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-136648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

The ink composition of the present invention may be used purposes other than ink jet recording such as display image material, image-forming material for indoor decoration material, and image-forming material for outdoor decoration material.

Examples of the display image material include various materials such as poster, wall paper, small decoration articles (ornament, doll, etc.), commercial flyer, wrapping paper, wrapping material, paper bag, vinyl bag, packaging material, signboard, picture drawn or attached to the side of traffic facilities (automobile, bus, train, etc.) and clothing with logogram. In the case where the dye of the invention is used as a material for forming a display image, the term "image" as used herein means an image in a narrow sense as well as all dye patterns perceivable by human being such as abstract design, letter and geometrical pattern.

The term "indoor decoration material" as used herein is meant to include various materials such as wall paper, small decoration articles (ornament, doll, etc.), members of lighting fixture, members of furniture and design members of floor and ceiling. In the case where the dye of the invention is used as an image-forming material, the term "image" as used herein means an image in a narrow sense as well as all dye patterns perceivable by human being such as abstract design, letter and geometrical pattern.

The term "outdoor decoration material" as used herein is meant to include various materials such as wall material, roofing material, signboard, gardening material, small outdoor decoration articles (ornament, doll, etc.) and members of outdoor lighting fixture. In the case where the dye of the invention is used as an image-forming material, the term "image" as used herein means an image in a narrow sense as well as all dye patterns perceivable by human being such as abstract design, letter and geometrical pattern.

Examples of the media on which patterns are formed in these uses include various materials such as paper, fiber, cloth (including nonwoven cloth), plastic, metal and ceramics. Dyeing can be carried out by mordanting or printing. Alternatively, a dye can be fixed in the form of reactive dye having a reactive group incorporated therein. Preferred among these dyeing methods is mordanting.

EXAMPLE

The present invention will be further described in the following examples, but the present invention is not construed as being limited thereto.

Example 1

To the following components was added deionized water to make 1 l, and the mixture was then heated to from 30° C. to 40° C. with stirring for 1 hour. Thereafter, the solution was adjusted to pH 9 with a 10 mol/l KOH, and then filtered through a microfilter having an average pore diameter of 0.25 μm under reduced pressure to prepare a light cyan ink solution.

| | |
|---|---|
| Phthalocyanine dye (Exemplary Compound 154) | 8.75 g/l |
| Diethylene glycol | 130 g/l |
| Glycerin | 150 g/l |
| Triethylene glycol monobutyl ether | 130 g/L |
| Triethanolamine | 6.0 g/l |
| Benzotriazole | 0.08 g/l |
| PROXEL XL2 | 1.8 g/l |
| Surface active agent (W1-18) | 10 g/l |

Further, the kind of dyes and additives were changed to prepare a magenta ink, a light magenta ink, a cyan ink, a yellow ink and a black ink from which an ink set 101 set forth in Table 3 was then prepared.

TABLE 3

| | Light magenta | Magenta | Light cyan | Cyan | Yellow | Black |
|---|---|---|---|---|---|---|
| Dye (g/l) | A-1<br>7.5 | A-1<br>30.0 | (154)<br>8.75 | (154)<br>35.0 | A-3<br>14.7<br>A-4<br>14.0 | A-5<br>20.0<br>A-6<br>20.0<br>A-7<br>20.0<br>A-3<br>21.0 |
| Diethylene glycol (g/l) | 50 | 112 | 130 | 200 | 160 | 20 |
| Urea (g/l) | 37 | 46 | — | — | — | — |
| Glycerin (g/l) | 130 | 130 | 150 | 180 | 150 | 120 |
| Triethylene glycol monobutyl ether (g/l) | 130 | 140 | 130 | 140 | 130 | — |
| Diethylene glycol monobutyl ether (g/l) | — | — | — | — | — | 230 |
| 2-Pyrrolidone (g/l) | — | — | — | — | — | 81 |
| Surface active agent (g/l) | — | — | (W1-18)<br>10 | (W1-18)<br>10 | — | — |
| Surfynol 465 (g/l) | 12.5 | 11.5 | — | — | — | — |
| Surfynol STG (g/l) | — | — | — | — | 9.0 | 8.5 |
| Triethanolamine (g/l) | 6.9 | 7.0 | 6.0 | 6.7 | 0.8 | 18.9 |
| Benzotriazole(g/l) | 0.08 | 0.07 | 0.08 | 0.08 | 0.06 | 0.06 |
| Proxel XL2 (g/l) | 3.5 | 2.5 | 1.8 | 2.0 | 2.5 | 1.8 |

Deionized water added to make 1 l

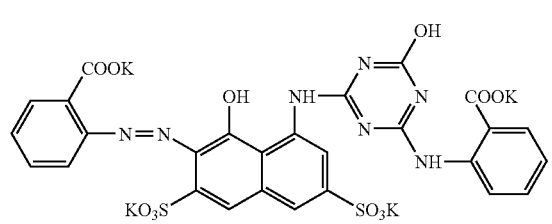

A-1

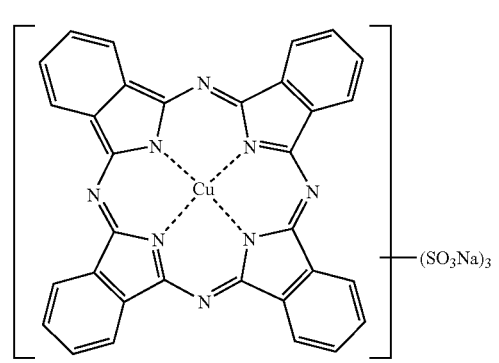

A-2

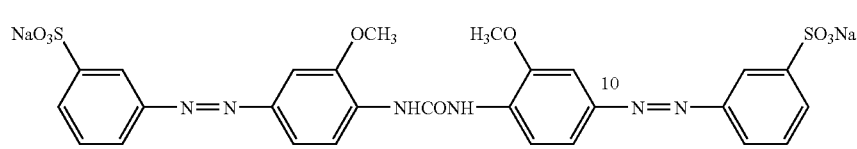
A-3
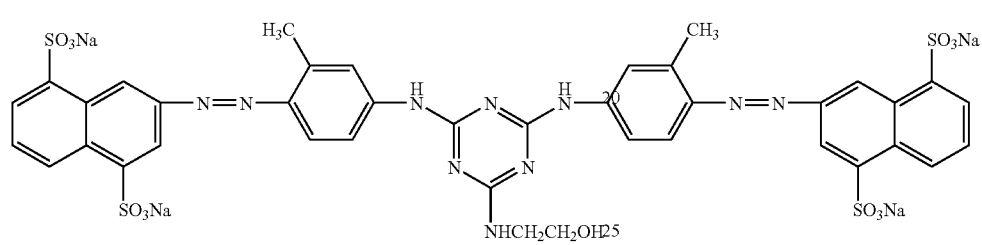
A-4
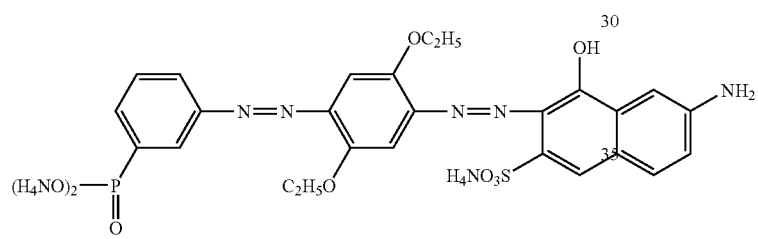
A-5
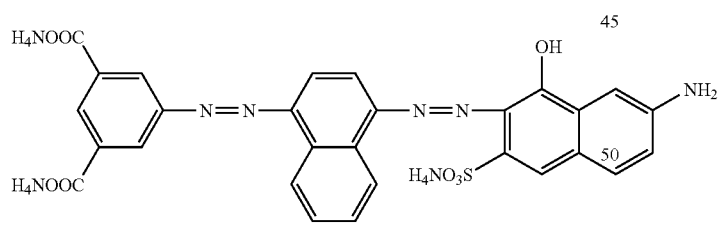
A-6
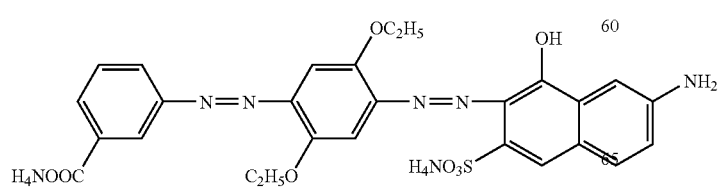
A-7

Further, ink sets 102 to 108 were prepared in the same manner as the ink set 101 except that the kind of dyes and the surface active agent were changed according to Table 4 below. The added amount of the surface active agent was 1.0% by weight for all these ink sets. Moreover, a comparative ink set 109 was prepared in the same manner as the ink set 101 except that the kind of dye was changed to Dye A-2 mentioned above. Further, a comparative ink set 110 was prepared in the same manner as the ink set 101 except that the surface active agent was excluded.

Among the dyes set forth in Table 4, the oxidation potential of the dye represented by the general formula (C-I) was more positive than 1.0 V and the oxidation potential of Dye A-2 was about 0.76 V.

Subsequently, these ink sets 101 to 110 were each packed in the cartridge of a Type PM670C ink jet printer (produced by EPSON CO., LTD.) by which an image was then printed on an ink jet paper photographic gloss paper EX produced by Fuji Photo Film Co., Ltd. and evaluated for the following properties.

1) For the evaluation of ejection stability, the cartridge was set in the printer in which the ejection of the ink through all the nozzles was then confirmed and printing was made on 20 sheets of A4 size paper to conduct evaluation on the following criterion.
   A: No disturbance in print between the beginning and the termination of printing;
   B: Output generated with disturbance in print;
   C: Disturbance in print between the beginning and the termination of printing 2) For the evaluation of fine line bleeding 1, a fine line pattern of yellow, magenta, cyan and black was printed and visually observed. For the evaluation of fine line bleeding 2, a cyan ink was solid-printed, a fine line of black was printed thereon, and bleeding by the contact of the two colors was then evaluated.
   o: No bleeding observed;
   Δ: Some bleeding observed, but readable;
   x: Unreadable due to bleeding 3) For the evaluation of water resistance, the image obtained was dipped in deionized water for 10 seconds, and then evaluated for bleeding.
   A: No bleeding observed;
   B: Some bleeding observed, but readable;
   C: Unreadable due to bleeding 4) For the evaluation of image preservability, a solid-printed cyan image sample was prepared and measured for the following properties.

For the evaluation of light fastness, the image density (initial reflection density) Ci of an image immediately after printed on the sample was measured using X-rite 310, and the sample was irradiated with xenon light (85,000 lux) for 10 days using a weather meter manufactured by Atlas, and then again measured for image density Cf to determine dye remaining ratio (Cf/Ci*100). The dye remaining ratio was evaluated at three points of initial reflection density points of 1, 1.5 and 2, and those showing a dye remaining ratio of 70% or more at any density point were ranked A, those showing a dye remaining ratio of less than 70% at two density points were ranked B, and those showing a residual ratio of dye of less than 70% at all density points were ranked C.

For the evaluation of heat fastness, the sample was measured for density before and after storage at 80° C. and 15% RH for 10 days using X-rite 310 to determine dye remaining ratio. The dye remaining ratio was evaluated at three points of reflection density, i.e., 1, 1.5 and 2, and those showing a dye remaining ratio of 90% or more at any of these reflection density points were ranked A, those showing a dye remaining ratio of less than 90% at two of these reflection density points were ranked B, and those showing a dye remaining ratio of less than 90% at all reflection density points were ranked C.

The results thus obtained are set forth in Table 4 below.

TABLE 4

| Ink set | Dye | surface active agent | Ejection stability | Light fastness | Heat fastness | Water resistance | Fine line bleeding 1 | Fine line bleeding 2 | Remarks |
|---|---|---|---|---|---|---|---|---|---|
| 101 | (154) | W1-18 | A | A | A | A | o | o | Inventive |
| 102 | (154) | W1-14 | A | A | A | A | o | o | Inventive |
| 103 | (I-6) | W1-16 | A | A | A | A | o | o | Inventive |
| 104 | (I-6) | W1-28 | A | A | A | A | o | o | Inventive |
| 105 | (I-8) | W2-19 | A | A | A | A | o | o | Inventive |
| 106 | (I-8) | W2-15 | A | A | A | A | o | o | Inventive |
| 107 | (164) | W2-27 | A | A | A | A | o | o | Inventive |
| 108 | (164) | W2-31 | A | A | A | A | o | o | Inventive |
| 109 | (A-2) | W1-18 | A | B | C | B | Δ | Δ | Comparative |
| 110 | (154) | — | B | A | B | B | x | x | Comparative |

Example 2

17.9 g of a dye (I-3) and 24.8 g of a dispersant (trade name: Emal 20C, produced by KAO CORPORATION), were dissolved in a mixture of 13 g of a high boiling organic solvent (s-1), 22.9 g of a high boiling organic solvent (s-2) and 50 ml of ethyl acetate at 70° C. To the solution was then added 500 ml of deionized water with stirring by a magnetic stirrer to prepare an oil-in-water type coarse grain dispersion.

Subsequently, the coarse grain dispersion was passed through a microfluidizer (MICROFLUIDEX INC) at a pressure of 60 MPa five times to undergo atomization. Further, the emulsion thus obtained was then subjected to desolvation by a rotary evaporator until there was no odor of ethyl acetate.

To the microfine emulsion of oil-soluble dye thus obtained were added additives such as 140 g of diethylene glycol, 64 g of glycerin, 16 g of a surface active agent (W1-18) and urea and then added 900 ml of deionized water, and the emulsion was adjusted to pH 9 with 10 mol/l of KOH to prepare a light cyan ink according to Table 5 below. The volume-average particle diameter of the emulsified dispersed ink thus obtained was 62 nm as determined using a microtrack UPA (Nikkiso Co., Ltd.).

Moreover, the kind of the dyes to be used and the high boiling organic solvents were changed to prepare a magenta ink, a light magenta ink, a cyan ink, a yellow ink and a black ink of ink set 201 set forth in Table 5 below.

TABLE 5

|  | Light magenta | Magenta | Light cyan | Cyan | Yellow | Black |
|---|---|---|---|---|---|---|
| Dye (g/l) | M-1 | M-1 | (I-3) | (I-3) | Y-1 | M-1 |
|  | 5.00 | 20.0 | 11.2 | 44.6 | 27.2 | 10.0 |
|  |  |  |  |  |  | C-1 |
|  |  |  |  |  |  | 18.6 |
|  |  |  |  |  |  | Y-1 |
|  |  |  |  |  |  | 13.6 |
| High boiling | S-1 3.63 | 14.52 | 8.1 | 32.4 | 19.74 | 30.6 |
| organic solvent (g/l) | S-2 6.38 | 25.52 | 14.3 | 57.1 | 34.7 | 53.8 |
| Emal 20 C. (g/l) | 12.0 | 40.0 | 15.5 | 62.0 | 50.0 | 72.4 |
| Diethylene glycol (g/l) | 87.5 | 87.5 | 87.5 | 87.5 | 87.5 | 87.5 |
| Urea (g/l) | 46.0 | 46.0 | 46.0 | 46.0 | 46.0 | 46.0 |
| Glycerin (g/l) | 40.0 | 40.0 | 40.0 | 40.0 | 40.0 | 40.0 |
| Surface active agent (g/l) | — | — | (W1-18) 10 | (W1-18) 10 | — | — |
| Surfinol 465 (g/l) | 5.5 | 5.5 | — | — | 5.5 | 5.5 |
| Triethanolamine (g/l) | 7.5 | 7.5 | 7.5 | 7.5 | 7.5 | 7.5 |
| Benzotriazole (g/l) | 0.075 | 0.075 | 0.075 | 0.075 | 0.075 | 0.075 |
| Proxel XL2 (g/l) | 2.5 | 2.5 | 2.5 | 2.5 | 2.5 | 2.5 |
| Deionized water added to make 1 l |  |  |  |  |  |  |
| Volume-average particle diameter | 51 nm | 53 nm | 62 nm | 65 nm | 59 nm | 70 nm |

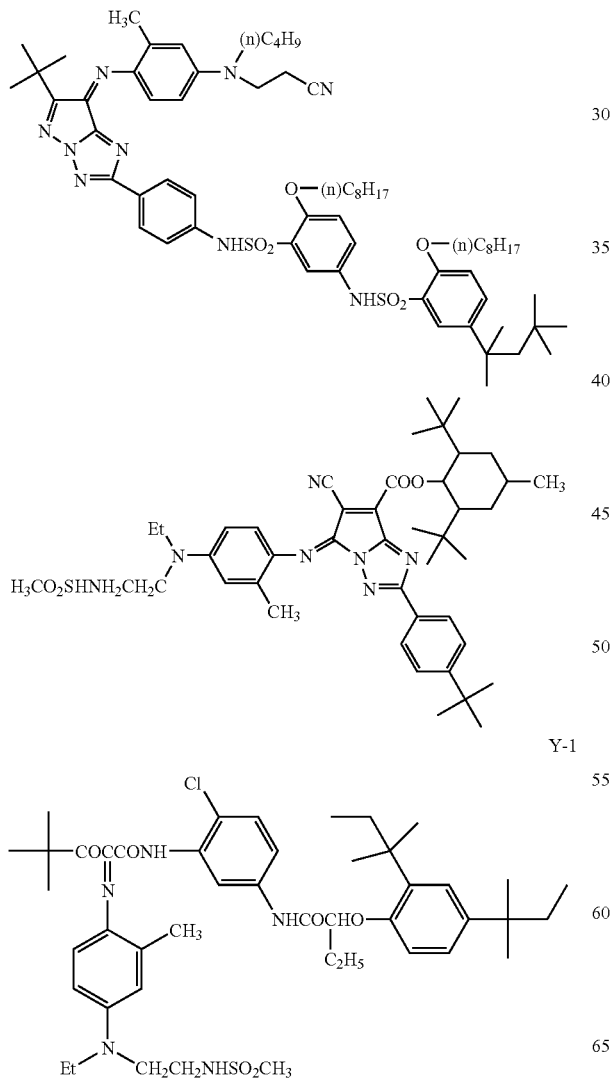

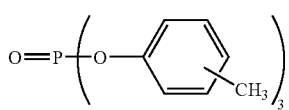

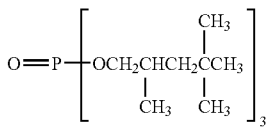

Subsequently, ink sets 202 to 208 were prepared in the same manner as the ink set 201 except that the kind of dyes and the surface active agent were changed according to Table 6 below. The added amount of the surface active agent was 1.0% by weight for all these ink sets. Moreover, a comparative ink set 209 was prepared in the same manner as the ink set 201 except that the kind of dye was changed to Dye C-1 mentioned above. Further, a comparative ink set 210 was prepared in the same manner as the ink set 201 except that the surface active agent was excluded.

Among the dyes set forth in Table 6, the oxidation potential of the dye represented by the general formula (C-I) was more positive than 1.0 V and the oxidation potential of Dye C-1 was about 0.99 V.

Subsequently, these ink sets 201 to 210 were each packed in the cartridge of a Type PM670C ink jet printer (produced by EPSON CO., LTD.) by which an image was then printed on an ink jet paper photographic gloss paper EX produced by Fuji Photo Film Co., Ltd. and evaluated in the same manner as in Example 1. The results thus obtained are set forth in Table 6 below.

TABLE 6

| Ink set | Dye | surface active agent | Ejection stability | Light fastness | Heat fastness | Water resistance | Fine line bleeding ① | Fine line bleeding ② | Remarks |
|---|---|---|---|---|---|---|---|---|---|
| 201 | (I-3) | W1-18 | A | A | A | A | ○ | ○ | Inventive |
| 202 | (I-3) | W1-14 | A | A | A | A | ○ | ○ | Inventive |
| 203 | (I-9) | W1-16 | A | A | A | A | ○ | ○ | Inventive |
| 204 | (I-9) | W1-28 | A | A | A | A | ○ | ○ | Inventive |
| 205 | (I-4) | W2-19 | A | A | A | A | ○ | ○ | Inventive |
| 206 | (I-4) | W2-15 | A | A | A | A | ○ | ○ | Inventive |
| 207 | (179) | W2-27 | A | A | A | A | ○ | ○ | Inventive |
| 208 | (179) | W2-31 | A | A | A | A | ○ | ○ | Inventive |
| 209 | (C-1) | W1-18 | A | C | C | B | Δ | Δ | Comparative |
| 210 | (I-3) | — | B | A | A | B | x | x | Comparative |

Example 3

To the following components was added deionized water to make 1 l, and the mixture was then heated to from 30° C. to 40° C. with stirring for 1 hour. Thereafter, the solution was adjusted to pH 9 with a 10 mol/l KOH, and then filtered through a microfilter having an average pore diameter of 0.25 μm under reduced pressure to prepare a light cyan ink solution.

| | |
|---|---|
| Phthalocyanine dye (Exemplary Compound 154) | 8.75 g/l |
| Diethylene glycol | 130 g/l |
| Glycerin | 150 g/l |
| Triethylene glycol monobutyl ether | 130 g/L |
| Triethanolamine | 6.0 g/l |
| Benzotriazole | 0.08 g/l |
| PROXEL XL2 | 1.8 g/l |
| Surface active agent (W5-4) | 10 g/l |

Further, the kind of dyes and additives were changed to prepare a magenta ink, light magenta ink, a cyan ink, a yellow ink and a black ink from which an ink set 301 set forth in Table 7 was then prepared. The structure of the dyes represented by the same signs as in Example 1 are the same as described in Example 1.

Subsequently, ink sets 302 to 208 were prepared in the same manner as the ink set 301 except that the kind of dyes and the surface active agent were changed according to Table 8 below. The added amount of the surface active agent was 1.0% by weight for all these ink sets.

Further, an ink set 309 was prepared in the same manner as the ink set 301 except that triethyleneglycol monobutyl ether was excluded.

Moreover, a comparative ink set 310 was prepared in the same manner as the ink set 301 except that the surface active agent was excluded. A comparative ink set 311 was prepared in the same manner as the ink set 301 except that the kind of dye was changed to A-2. Further, a comparative ink set 312 was prepared in the same manner as the ink set 301 except that the surface active agent and triethylene glycol monobutyl ether were excluded.

Among the dyes set forth in Table 8, the oxidation potential of the dye represented by the general formula (C-I) was more positive than 1.0 V and the oxidation potential of Dye A-2 was about 0.76 V.

Subsequently, these ink sets 301 to 312 were each packed in the cartridge of a Type PM670C ink jet printer (produced by EPSON CO., LTD.) by which an image was then printed

TABLE 7

| | Light magenta | Magenta | Light cyan | Cyan | Yellow | Black |
|---|---|---|---|---|---|---|
| Dye (g/l) | A-1 | A-1 | (154) | (154) | A-3 | A-5 |
| | 7.5 | 30.0 | 8.75 | 35.0 | 14.7 | 20.0 |
| | | | | | A-4 | A-6 |
| | | | | | 14.0 | 20.0 |
| | | | | | | A-7 |
| | | | | | | 20.0 |
| | | | | | | A-3 |
| | | | | | | 21.0 |
| Diethylene glycol (g/l) | 50 | 112 | 130 | 200 | 160 | 20 |
| Urea (g/l) | 37 | 46 | — | — | — | — |
| Glycerin (g/l) | 130 | 130 | 150 | 180 | 150 | 120 |
| Triethylene glycol monobutyl ether (g/l) | 130 | 140 | 130 | 140 | 130 | — |
| Diethylene glycol monobutyl ether (g/l) | — | — | — | — | — | 230 |
| 2-Pyrrolidone (g/l) | — | — | — | — | — | 81 |
| Surface active agent (g/l) | (W5-4) | (W5-4) | (W5-4) | (W5-4) | (W5-4) | (W5-4) |
| | 12.5 | 11.5 | 10 | 9.8 | 9.0 | 8.5 |
| Triethanolamine (g/l) | 6.9 | 7.0 | 6.0 | 6.7 | 0.8 | 18.9 |
| Benzotriazole (g/l) | 0.08 | 0.07 | 0.08 | 0.08 | 0.06 | 0.06 |
| Proxel XL2 (g/l) | 3.5 | 2.5 | 1.8 | 2.0 | 2.5 | 1.8 |

Deionized water added to make 1 l on an ink jet paper photographic gloss paper EX produced by Fuji Photo Film Co., Ltd. and evaluated for the following properties.

1) For the evaluation of ejection stability, the cartridge was set in the printer in which the ejection of the ink through all the nozzles was then confirmed and printing was made on 20 sheets of A4 size paper to conduct evaluation on the following criterion.

A: No disturbance in print between the beginning and the termination of printing;

B: Output generated with disturbance in print;

C: Disturbance in print between the beginning and the termination of printing

2) For the evaluation of fine line bleeding 1, a fine line pattern of yellow, magenta, cyan and black was printed and visually observed. For the evaluation of fine line bleeding 2, a cyan ink was solid-printed, a fine line of black was printed thereon, and bleeding by the contact of the two colors was then evaluated.

○: No bleeding observed;
   Δ: Some bleeding observed, but readable;
   x: Unreadable due to bleeding 3) For the evaluation of water resistance, the image obtained was dipped in deionized water for 10 seconds, and then evaluated for bleeding.

A: No bleeding observed;
   B: Some bleeding observed, but readable;
   C: Unreadable due to bleeding 4) For the evaluation of image preservability, a solid-printed cyan image sample was prepared and measured for the following properties.

For the evaluation of light fastness, the image density (initial reflection density) Ci of an image immediately after printed on the sample was measured using X-rite 310, and the sample was irradiated with xenon light (85,000 lux) for 10 days using a weather meter manufactured by Atlas, and then again measured for image density Cf to determine dye remaining ratio (Cf/Ci*100). The dye remaining ratio was evaluated at three initial reflection density points of 1, 1.5 and 2, and those showing a dye remaining ratio of 70% or more at any density point were ranked A, those showing a dye remaining ratio of less than 70% at two density points were ranked B, and those showing a dye remaining ratio of less than 70% at all density points were ranked C.

For the evaluation of heat fastness, the sample was measured for density before and after storage at 80° C. and 15% RH for 10 days using X-rite 310 to determine dye remaining ratio. The dye remaining ratio was evaluated at three points of initial reflection density, i.e., 1, 1.5 and 2, and those showing a dye remaining ratio of 90% or more at any of these reflection density points were ranked A, those showing a dye remaining ratio of less than 90% at two of these reflection density points were ranked B, and those showing a dye remaining ratio of less than 90% at all reflection density points were ranked C.

5) Intermittent ejection stability: Printing was conducted in a line in an atmosphere of a temperature of 15° C. and a humidity of 20%, suspended for a predetermined period of time, and then resumed. At the first dot printed after the resumption of printing, dot lack or presence or absence of flying deflection were observed. Those which show dot lack or flying deflection after 60 seconds or more of suspension were ranked A, those which show dot lack or flying deflection after 10 seconds to less than 60 seconds of suspension were ranked B, and those which show dot lack or flying deflection after less than 10 seconds of suspension were ranked C.

The results thus obtained are set forth in Table 8 below.

TABLE 8

| Ink set | Dye | Surface active agent | TEGmBE | Ejection stability | light fastness | Heat fastness | Water resistance | Fine line bleeding 1 | Fine line bleeding 2 | Intermittent ejection |
|---|---|---|---|---|---|---|---|---|---|---|
| 301 | (154) | W5-4 | Yes | A | A | A | A | ○ | ○ | A |
| 302 | (154) | W5-1 | Yes | A | A | A | A | ○ | ○ | A |
| 303 | (101) | W5-2 | Yes | A | A | A | A | ○ | ○ | A |
| 304 | (101) | W5-7 | Yes | A | A | A | A | ○ | ○ | A |
| 305 | (112) | W5-9 | Yes | A | A | A | A | ○ | ○ | A |
| 306 | (112) | W5-13 | Yes | A | A | A | A | ○ | ○ | A |
| 307 | (164) | W5-15 | Yes | A | A | A | A | ○ | ○ | A |
| 308 | (164) | W5-17 | Yes | A | A | A | A | ○ | ○ | A |
| 309 | (154) | W5-4 | No | B | A | A | A | Δ | Δ | B |
| 310 | (154) | — | Yes | B | A | B | B | Δ | Δ | A |
| 311 | (A-2) | W5-4 | Yes | A | B | C | B | Δ | Δ | B |
| 312 | (154) | — | No | C | A | C | C | x | x | B |

TEGmBE = Triethylene glycol monobutyl ether

Example 4

17.9 g of a dye (177) and 24.8 g of a dispersant (trade name: Emal 20C, produced by KAO CORPORATION), were dissolved in a mixture of 13 g of a high boiling organic solvent (s-1), 22.9 g of a high boiling organic solvent (s-2) and 50 ml of ethyl acetate at 70° C. To the solution was then added 500 ml of deionized water with stirring by a magnetic stirrer to prepare an oil-in-water type coarse grain dispersion.

Subsequently, the coarse grain dispersion was passed through a microfluidizer (MICROFLUIDEX INC) at a pressure of 60 MPa five times to undergo atomization. Further, the emulsion thus obtained was then subjected to desolvation by a rotary evaporator until there was no odor of ethyl acetate.

To the microfine emulsion of oil-soluble dye thus obtained were added additives such as 140 g of diethylene glycol, 64 g of glycerin, 16 g of a surface active agent (W5-4) and urea and then added 900 ml of deionized water, and the emulsion was adjusted to pH 9 with 10 mol/l of KOH to prepare a light cyan ink according to Table 9 below. The volume-average particle diameter of the emulsified dispersed ink thus obtained was 62 nm as determined using a microtrack UPA (Nikkiso Co., Ltd.).

Moreover, the kind of the dyes to be used and the high boiling organic solvents were changed to prepare a magenta ink, a light magenta ink, a cyan ink, a yellow ink and a black ink of ink set 401 set forth in Table 9 below. The high boiling organic solvents and the structure of the dyes represented by the same signs as in Example 2 are the same as described in Example 2.

Among the dyes set forth in Table 10, the oxidation potential of the dye represented by the general formula (C-I) was more positive than 1.0 V and the oxidation potential of Dye C-1 was about 0.99 V.

TABLE 9

|  | Light magenta | Magenta | Light cyan | Cyan | Yellow | Black |
|---|---|---|---|---|---|---|
| Dye (g/l) | M-1 | M-1 | (177) | (177) | Y-1 | M-1 |
|  | 5.00 | 20.0 | 11.2 | 44.6 | 27.2 | 10.0 |
|  |  |  |  |  |  | C-1 |
|  |  |  |  |  |  | 18.6 |
|  |  |  |  |  |  | Y-1 |
|  |  |  |  |  |  | 13.6 |
| High boiling | S-1 3.63 | 14.52 | 8.1 | 32.4 | 19.74 | 30.6 |
| organic solvent (g/l) | S-2 6.38 | 25.52 | 14.3 | 57.1 | 34.7 | 53.8 |
| Emal 20 C. (g/l) | 12.0 | 40.0 | 15.5 | 62.0 | 50.0 | 72.4 |
| Diethylene glycol (g/l) | 87.5 | 87.5 | 87.5 | 87.5 | 87.5 | 87.5 |
| Urea | 46.0 | 46.0 | 46.0 | 46.0 | 46.0 | 46.0 |
| Glycerin (g/l) | 40.0 | 40.0 | 40.0 | 40.0 | 40.0 | 40.0 |
| Surface active | (W5-4) | (W5-4) | (W5-4) | (W5-4) | (W5-4) | (W5-4) |
| agent (g/l) | 10 | 10 | 10 | 10 | 5.5 | 5.5 |
| Triethanolamine (g/l) | 7.5 | 7.5 | 7.5 | 7.5 | 7.5 | 7.5 |
| Benzotriazole (g/l) | 0.075 | 0.075 | 0.075 | 0.075 | 0.075 | 0.075 |
| Triethylene | 110 | 110 | 110 | 110 | 110 | 110 |
| glycol monobutyl ether (g/l) |  |  |  |  |  |  |
| Proxel XL2 (g/l) | 2.5 | 2.5 | 2.5 | 2.5 | 2.5 | 2.5 |
| Deionized water added to make 1 l |  |  |  |  |  |  |
| Volume-average particle diameter | 51 nm | 53 nm | 62 nm | 65 nm | 59 nm | 70 nm |

Subsequently, ink sets 402 to 408 were prepared in the same manner as the ink set 401 except that the kind of dyes and the surface active agent were changed according to Table 10 below. The added amount of the surface active agent was 1.0% by weight for all these ink sets.

Further, an ink set 409 was prepared in the same manner as the ink set 401 except that triethyleneglycol monobutyl ether was excluded.

Subsequently, these ink sets 401 to 412 were each packed in the cartridge of a Type PM670C ink jet printer (produced by EPSON CO., LTD.) by which an image was then printed on an ink jet paper photographic gloss paper EX produced by Fuji Photo Film Co., Ltd. and evaluated in the same manner as in Example 3.

The results thus obtained are set forth in Table 10 below.

TABLE 10

| Ink set | Dye | Surface active agent | TEGmBE | Ejection stability | light fastness | Heat fastness | Water resistance | Fine line bleeding 1 | Fine line bleeding 2 | Intermittent ejection |
|---|---|---|---|---|---|---|---|---|---|---|
| 401 | (177) | W5-4 | Yes | A | A | A | A | ○ | ○ | A |
| 402 | (177) | W5-1 | Yes | A | A | A | A | ○ | ○ | A |
| 403 | (179) | W5-2 | Yes | A | A | A | A | ○ | ○ | A |
| 404 | (179) | W5-7 | Yes | A | A | A | A | ○ | ○ | A |
| 405 | (181) | W5-9 | Yes | A | A | A | A | ○ | ○ | A |
| 406 | (181) | W5-13 | Yes | A | A | A | A | ○ | ○ | A |
| 407 | (188) | W5-15 | Yes | A | A | A | A | ○ | ○ | A |
| 408 | (188) | W5-17 | Yes | A | A | A | A | ○ | ○ | A |
| 409 | (177) | W5-4 | No | B | A | A | A | Δ | Δ | B |
| 410 | (177) | — | Yes | B | A | B | B | Δ | Δ | A |
| 411 | (C-1) | W5-4 | Yes | A | B | C | B | Δ | Δ | B |
| 412 | (177) | — | No | C | A | C | C | x | x | B |

TEGmBE = Triethylene glycol monobutyl ether

Moreover, a comparative ink set 410 was prepared in the same manner as the ink set 401 except that the surface active agent was excluded. A comparative ink set 411 was prepared in the same manner as the ink set 401 except that the kind of dye was changed to C-1. Further, a comparative ink set 412 was prepared in the same manner as the ink set 401 except that the surface active agent and triethylene glycol monobutyl ether were excluded.

As can be seen in Examples 1 to 4, the ink compositions of the present invention are excellent all in ejection stability, weathering resistance (light fastness and heat fastness) and water resistance and thus can provide an image free of bleeding from fine line. It is also apparent that the ink compositions (ink sets 109, 209, 311, 411) comprising dyes other than the dyes of the present invention (having an oxidation potential of more positive than 1.0 V) and containing the surface active agent exhibit a good ejection stability and the ink compositions (ink sets 110, 210, 310, 312, 410, 412) comprising only the dyes of the present invention are excellent in light fastness, but good results in water resistance and bleeding resistance can be obtained only with the ink compositions of the present invention comprising both the dyes and the surface active agent. It is further apparent that the use of triethylene glycol monobutyl ether (compound represented by the general formula (IV)) makes it possible to improve the ejection stability, resistance to bleeding from fine line, particularly intermittent ejection properties.

Example 5

To the following components was added deionized water to make 1 l, and the mixture was then heated to from 30° C. to 40° C. with stirring for 1 hour. The solution was then filtered through a microfilter having an average pore diameter of 0.25 μm under reduced pressure to prepare a light cyan ink solution.

| | |
|---|---|
| Phthalocyanine dye (Exemplary Compound 154) | 17.5 g/L |
| Diethylene glycol | 164 g/L |
| Glycerin | 123 g/L |
| Triethylene glycol monobutyl ether | 119 g/L |
| Triethanolamine | 6.5 g/L |
| Benzotriazole | 0.07 g/L |
| PROXEL XL2 | 1.0 g/L |
| Surface active agent (1) | 10 g/L |

Surface active agent (1): (Singly terminated 2-butyloctanoic acid ester of polyethylene glycol (average number of repetition of ethylene oxide: 10)

By using a magenta dye (azo dye, Exemplary Compound a-36), a yellow dye and a black dye instead of cyan dye as dyes and changing the additives to be used, a magenta ink, a light magenta ink, a cyan ink, a yellow ink, a dark yellow ink and a black ink were prepared, and an ink set 501 set forth in Table 11 was then prepared therefrom. The structure of the dyes represented by the same signs as in Example 1 are the same as described in Example 1.

Subsequently, ink sets 502 to 507 are prepared in the same manner as the ink set 501 except that the kind of dye, the surface active agent and the added amount of additives for the light cyan and cyan inks were changed according to Table 12 below.

Among the dyes set forth in Table 12, the oxidation potential of the dye (154) represented by the general formula (C-I) was more positive than 1.0 V and the oxidation potential of Dye A-2 was about 0.76 V.

Further, in Table 12, the surface active agent (2) is SURFYNOL465 (Air Products & Chemicals).

TABLE 12

| Ink set | | Light cyan | Cyan | Remarks |
|---|---|---|---|---|
| 501 | Dye | (154) | (154) | Inventive |
| | Surface active agent (1) | 10 g/l | 10 g/l | |
| | Diethylene glycol | 164 | 107 | |
| | Glycerin | 123 | 110 | |
| | Triethylene glycol monobutyl ether | 119 | 127 | |
| 502 | Dye | (154) | (154) | Inventive |
| | Surface active agent (2) | 10 | 10 | |
| | Diethylene glycol | 164 | 107 | |
| | Glycerin | 123 | 110 | |
| | Triethylene glycol monobutyl ether | 119 | 127 | |
| 503 | Dye | (154) | (154) | Inventive |
| | Surface active agent (1) | 0.05 | 0.05 | |
| | Diethylene glycol | 164 | 107 | |
| | Glycerin | 123 | 110 | |
| | Triethylene glycol monobutyl ether | 119 | 127 | |
| 504 | Dye | (154) | (154) | Inventive |
| | Surface active agent (1) | 15 | 15 | |
| | Triethylene glycol | 164 | 107 | |
| | Glycerin | 123 | 110 | |
| | Diethylene glycol monobutyl ether | 119 | 127 | |
| 505 | Dye | (154) | (154) | Comparative |
| | Surface active agent (1) | 0.01 | 0.01 | |
| | Diethylene glycol | 164 | 107 | |
| | Glycerin | 123 | 110 | |
| | Triethylene glycol monobutyl ether | 119 | 127 | |

TABLE 11

| | Light magenta | Magenta | Light cyan | Cyan | yellow | Dark yellow | Black |
|---|---|---|---|---|---|---|---|
| Dye (g/l) | (a-36) | (a-36) | (154) | (154) | A-3 | A-3 | A-5 |
| | 10.2 g/l | 30.8 | 17.5 | 68.0 | 14.7 | 10.3 | 20.0 |
| | | | | | A-4 | A-4 | A-6 |
| | | | | | 14.0 | 9.8 | 39.0 |
| | | | | | | (154) | A-7 |
| | | | | | | 13.6 | 17.0 |
| | | | | | | | A-3 |
| | | | | | | | 20.0 |
| Triethylene glycol monobutyl ether | 130 | 140 | 119 | 127 | 130 | 130 | — |
| Diethylene glycol monobutyl ether | — | — | — | — | — | — | 230 |
| Glycerin | 130 | 160 | 123 | 110 | 150 | 138 | 120 |
| Diethylene glycol | 150 | 110 | 164 | 107 | 160 | 144 | 20 |
| Triethanolamine | 7 | 7 | 6.5 | 10 | 1 | 4 | 18 |
| Urea | 37 | 46 | — | — | — | — | — |
| 2-Pyrrolidone | 40 | — | — | 20 | — | — | 80 |
| Proxel XLII | 5.0 | 4.5 | 1.0 | 4.0 | 3.0 | 3.0 | 4.0 |
| Benzotriazole | 0.07 | 0.08 | 0.07 | 0.09 | 0.06 | 0.07 | 0.08 |
| Surface active agent (1) | 6 | 12 | 10 | 10 | 3 | 5 | 5 |

TABLE 12-continued

| Ink set | | Light cyan | Cyan | Remarks |
|---|---|---|---|---|
| 506 | Dye | (154) | (154) | Comparative |
| | Surface active agent (1) | 60 | 60 | |
| | Triethylene glycol | 164 | 107 | |
| | Glycerin | 123 | 110 | |
| | Diethylene glycol monobutyl ether | 119 | 127 | |
| 507 | Dye | A-2 | A-2 | Comparative |
| | Surface active agent (1) | 10 | 10 | |
| | Diethylene glycol | 164 | 107 | |
| | Glycerin | 123 | 110 | |
| | Triethylene glycol monobutyl ether | 119 | 127 | |

The ink sets 501 to 507 thus produced were each packed in the cartridge of a Type PM920C ink jet printer (produced by SEIKO EPSON CO., LTD.) by which an image was then printed on an ink jet paper photographic gloss paper EX produced by Fuji Photo Film Co., Ltd. and evaluated for the following properties. The results are set forth in Table 13.

(1) For the evaluation of ejection stability, the cartridge was set in the printer in which the ejection of the ink through all the nozzles was then confirmed and printing was made on 20 sheets of A4 size paper to conduct evaluation of disturbance in print on the following criterion.

A: No disturbance in print between the beginning and the termination of printing;
  B: Output generated with disturbance in print;
  C: Disturbance in print between the beginning and the termination of printing (2) For the evaluation of fine line bleeding, a fine line pattern of yellow, magenta, cyan and black was printed and visually observed for evaluation (1). A cyan ink was solid-printed, a fine line of black was printed thereon, and bleeding by the contact of the two colors was then observed for evaluation (2).

o: Good
  Δ: Slight bleeding;
  x: Bleeding

3) For the evaluation of water resistance, the image obtained was dipped in deionized water for 10 seconds, and then evaluated for bleeding.
  o: Good
  Δ: Slight bleeding
  X: Bleeding 4) For the evaluation of image preservability, a solid-printed cyan image sample was prepared and measured for the following properties.

(1) Light Fastness

The image density (initial reflection density) Ci of an image printed on the sample was measured using X-rite 310, and the image was irradiated with xenon light (85,000 lux) for 6 days using a weatherometer produced Atlas Inc, and then again measured for image density Cf to determine dye remaining ratio Ci/Cf*100. The dye remaining ratio was evaluated at three initial reflection density points of 1, 1.5 and 2, and those showing a dye remaining ratio of 80% or more at any density point were ranked A, those showing a dye remaining ratio of less than 80% at two density points were ranked B, and those showing a dye remaining ratio of less than 80% at all density points were ranked C.

(2) Heat Fastness

The sample was measured for density before and after storage at 80° C., 70% RH for 5 days using X-rite 310 to determine dye remaining ratio. The dye remaining ratio was evaluated at three points of initial reflection density, i.e., 1, 1.5 and 2, and those showing a dye remaining ratio of 90% or more at any of these reflection density points were ranked A, those showing a dye remaining ratio of less than 90% at two of these reflection density points were ranked B, and those showing a dye remaining ratio of less than 90% at all reflection density points were ranked C.

(3) Ozone Resistance

The sample was measured for density before and after storage in an atmosphere heated to 80° C. with external air taken therein for 7 days using a reflection densitometer (X-Rite 310TR) to determine dye remaining ratio. The dye remaining ratio was evaluated at three points of initial reflection density, i.e., 1, 1.5 and 2, and those showing a dye remaining ratio of 90% or more at any of these reflection density points were ranked A, those showing a dye remaining ratio of less than 90% at two of these reflection density points were ranked B, and those showing a dye remaining ratio of less than 90% at all reflection density points were ranked C.

TABLE 13

| Ink set | Ejection stability | light fastness | Heat fastness | Ozone resistance | Water resistance | Fine line bleeding (1) | Fine line bleeding (2) | Remarks |
|---|---|---|---|---|---|---|---|---|
| 501 | A | A | A | A | o | o | o | Inventive |
| 502 | A | A | A | A | o | o | o | Inventive |
| 503 | A | A | A | A | o | o | o | Inventive |
| 504 | A | A | A | A | o | Δ | Δ | Inventive |
| 505 | B | A | A | A | o | x | x | Comparative |
| 506 | C | A | A | A | o | x | x | Comparative |
| 507 | A | B | A | C | o | o | o | Comparative |

It is apparent from Table 13 that when the ink composition of the present invention is used, an excellent ejection stability can be obtained and excellent properties of water resistance and fastness can be exhibited as well. Further, the ink of the present invention exhibits excellent properties without bleeding during the output of fine line.

Moreover, the inks of the present invention (501 to 504) provided the same hue as the ink (107).

Further, the inks prepared in the same manner as the ink set 501 except that other dyes represented by the general formula (C-I) were used instead of the cyan dye (154) exerted the same effect on fastness, ejection stability and hue as the ink set 501.

Moreover, even when the image-receiving paper to be used in the present invention is changed to PM photographic paper produced by EPSON CO., LTD. or RR101 produced by Canon Inc., the same effects as the result mentioned above were exerted.

Example 6

To the following components was added deionized water to make 1 l, and the mixture was then heated to from 30° C. to 40° C. with stirring for 1 hour. The solution was then filtered through a microfilter having an average pore diameter of 0.25 μm under reduced pressure to prepare a light magenta ink.

| | |
|---|---|
| Magenta dye (Exemplary Compound a-36) | 10.2 g/L |
| Triethylene glycol monobutyl ether | 130.0 g/L |
| Glycerin | 130.0 g/L |
| Diethylene glycol | 150.0 g/L |
| Triethanolamine | 7.0 g/L |
| Urea | 37.0 g/L |
| Z-Pyrrolidone | 40.0 g/L |
| Benzotriazole | 0.07 g/L |
| PROXEL XL2 (Zeneca) | 5.0 g/L |
| Surface active agent (1) | 6.0 g/L |

Surface active agent (1): (Singly terminated 2-butyloctanoic acid ester of polyethylene glycol (average number of repetition of ethylene oxide: 10)

Further, by changing the kind of dyes and the additives, a magenta ink, a light cyan ink, a cyan ink, a yellow ink, a dark yellow ink, and a black ink were prepared, and an ink set 601 set forth in Table 14 was then prepared therefrom. The structure of the dyes represented by the same signs as in Example 1 are the same as described in Example 1.

Subsequently, ink sets 602 to 607 are prepared in the same manner as the ink set 601 except that the kind of dye, the surface active agent and the added amount of additives for the light magenta ink were changed according to Table 14 below.

Among the dyes set forth in Table 15, the oxidation potential of the azo dye (a-36) represented by the general formula (M-I) was more positive than 1.0 V and the oxidation potential of Dyes B-1 and B-2 were each less than 1.0 V.

Further, in Table 15, the surface active agent (2) is SURFYNOL465 (Air Products & Chemicals).

TABLE 15

| Ink set | | Light magenta | Magenta | Remarks |
|---|---|---|---|---|
| 601 | Dye | a-36 | a-36 | Inventive |
| | Surface active agent (1) | 6 | 12 | |
| | Diethylene glycol | 150 | 110 | |
| | Glycerin | 130 | 160 | |
| | Triethylene glycol monobutyl ether | 130 | 140 | |
| 602 | Dye | a-36 | a-36 | Inventive |
| | Surface active agent (2) | 6 | 12 | |
| | Diethylene glycol | 150 | 110 | |
| | Glycerin | 130 | 160 | |
| | Triethylene glycol monobutyl ether | 130 | 140 | |
| 603 | Dye | a-36 | a-36 | Inventive |
| | Surface active agent (1) | 0.05 | 0.05 | |
| | Diethylene glycol | 150 | 110 | |
| | Glycerin | 130 | 160 | |
| | Triethylene glycol monobutyl ether | 130 | 140 | |
| 604 | Dye | a-36 | a-36 | Inventive |
| | Surface active agent (1) | 15 | 15 | |
| | Diethylene glycol | 150 | 110 | |
| | Glycerin | 130 | 160 | |
| | Deithylene glycol monobutyl ether | 130 | 140 | |
| 605 | Dye | a-36 | a-36 | Comparative |
| | Surface active agent (1) | 0.01 | 0.01 | |
| | Diethylene glycol | 150 | 150 | |
| | Glycerin | 130 | 160 | |

TABLE 14

| | Light magenta | Magenta | Light cyan | Cyan | yellow | Dark yellow | Black |
|---|---|---|---|---|---|---|---|
| Dye | (a-36) | (a-36) | A-21 | A-21 | A-3 | A-3 | A-5 |
| | 10.2 g/l | 30.8 | 17.5 | 68.0 | 14.7 | 10.3 | 20.0 |
| | | | | | A-4 | A-4 | A-6 |
| | | | | | 14.0 | 9.8 | 39.0 |
| | | | | | | (154) | A-7 |
| | | | | | | 13.6 | 17.0 |
| | | | | | | | A-3 |
| | | | | | | | 20.0 |
| Triethylene glycol monobutyl ether | 130 | 140 | 119 | 127 | 130 | 130 | — |
| Diethylene glycol monobutyl ether | — | — | — | — | — | — | 230 |
| Glycerin | 130 | 160 | 123 | 110 | 150 | 138 | 120 |
| Diethylene glycol | 150 | 110 | 164 | 107 | 160 | 144 | 20 |
| Triethanolamine | 7 | 7 | 6.5 | 10 | 1 | 4 | 18 |
| Urea | 37 | 46 | — | — | — | — | — |
| 2-Pyrrolidone | 40 | — | — | 20 | — | — | 80 |
| Proxel XLII | 5.0 | 4.5 | 1.0 | 4.0 | 3.0 | 3.0 | 4.0 |
| Benzotriazole | 0.07 | 0.08 | 0.07 | 0.09 | 0.06 | 0.07 | 0.08 |
| Surface active agent (1) | 6 | 12 | 10 | 10 | 3 | 5 | 5 |

TABLE 15-continued

| Ink set | | Light magenta | Magenta | Remarks |
|---|---|---|---|---|
| | Triethylene glycol monobutyl ether | 130 | 140 | |
| 606 | Dye | a-36 | a-36 | Comparative |
| | Surface active agent (1) | 60 | 60 | |
| | Diethylene glycol | 150 | 110 | |
| | Glycerin | 130 | 160 | |
| | Diethylene glycol monobutyl ether | 130 | 140 | |
| 607 | Dye | B-1 | B-2 | Comparative |
| | Surface active agent (1) | 6 | 12 | |
| | Diethylene glycol | 150 | 110 | |
| | Glycerin | 130 | 160 | |
| | Triethylene glycol monobutyl ether | 130 | 140 | |

B-1

B-2

The ink sets 601 to 607 thus produced were each packed in the cartridge of a Type PM920C ink jet printer (produced by SEIKO EPSON CO., LTD.) by which an image was then printed on an ink jet paper photographic gloss paper EX produced by Fuji Photo Film Co., Ltd. and evaluated in the same manner as in Example 5. The results are set forth in Table 16.

It is apparent from Table 16 that when the ink composition of the present invention is used, an excellent ejection stability can be obtained and excellent properties of water resistance and fastness can be exhibited as well. Further, the ink of the present invention exhibits excellent properties without bleeding during the output of fine line.

Moreover, the inks of the present invention (601 to 604) provided the same hue as the ink (607).

Further, the inks prepared in the same manner as the ink set 601 except that other water-solubule dyes represented by the general formula (M-I) were used instead of the magenta dye (a-36) exerted the same effect on fastness, ejection stability and hue as the ink set 601.

Moreover, even when the image-receiving paper to be used in the present invention is changed to PM photographic paper produced by EPSON CO., LTD. or RR101 produced by Canon Inc., the same effects as the result mentioned above were exerted.

(Advantage of the Invention)

In accordance with the present invention, an aqueous ink advantageous in handleability, odor, safety, etc. which is an ink composition having a high ejection stability, a good hue and an excellent weathering resistance and water resistance capable of providing a recorded image free of bleeding from fine line and an ink jet recording method using said ink composition can be provided.

TABLE 16

| Ink set | Ejection stability | light fastness | Heat fastness | Ozone resistance | Water resistance | Fine line bleeding ① | Fine line bleeding ② | Remarks |
|---|---|---|---|---|---|---|---|---|
| 601 | A | A | A | A | ○ | ○ | ○ | Inventive |
| 602 | A | A | A | A | ○ | ○ | ○ | Inventive |
| 603 | A | A | A | A | ○ | ○ | ○ | Inventive |
| 604 | A | A | A | A | ○ | Δ | Δ | Inventive |
| 605 | B | A | A | A | ○ | x | x | Comparative |
| 606 | C | A | A | A | ○ | x | x | Comparative |
| 607 | A | B | A | C | ○ | ○ | ○ | Comparative |

INDUSTRIAL APPLICABILITY

The ink composition of the present invention can be applied to any known ink jet recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink, and the ink composition of the present invention can be used in any of these ink jet recording methods.

The invention claimed is:

1. An ink composition comprising:
   at least one dye having an oxidation potential of more positive than 1.0 V dissolved or dispersed in an aqueous medium; and
   a surface active agent in an amount of from 0.05 to 50 g/l wherein the surface active agent is a compound represented by the following general formula (I), (II) or (III):

General formula (I)

wherein $R^{21}$ represents a $C_5$-$C_{40}$ alkyl group; and $m_1$ is from 2 to 40;

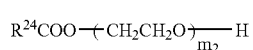

General formula (II)

wherein $R^{24}$ represents a $C_5$-$C_{40}$ alkyl group; and $m_2$ is from 2 to 40;

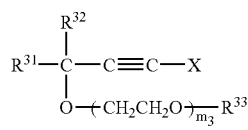

General formula (III)

wherein $R^{31}$ and $R^{32}$ each independently represent a $C_1$-$C_{18}$ alkyl group; $R^{33}$ represents a hydrogen atom, $C_1$-$C_6$ alkyl group, or phenyl group; and X represents a hydrogen atom or

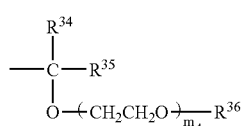

in which $R^{34}$ and $R^{35}$ each independently represent a $C_1$-$C_{18}$ alkyl group; represents a hydrogen atom, $C_1$-$C_6$ alkyl group or phenyl group; $m_3$ and $m_4$ each independently are 0 to 100, and the sum of $m_3$ and $m_4$ is from 0 to 100, and when $m_3$ is 0, $R^{33}$ represents a hydrogen atom, and when $m_4$ is 0, $R^{36}$ represents a hydrogen atom, and when X is a hydrogen atom, $m_3$ is from 1 to 100.

2. The ink composition as described in claim 1, wherein the surface active agent is a nonionic surface active agent.

3. The ink composition as described in claim 1, wherein the surface active agent is a compound represented by the following general formula (I-1):

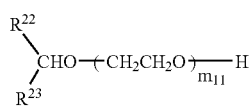

General formula (I-1)

wherein $R^{22}$ and $R^{23}$ each independently represent a $C_4$-$C_{10}$ saturated hydrocarbon, with the proviso that the sum of the carbon atoms in $R^{22}$ and $R^{23}$ is from 8 to 18; and $m_{11}$ is from 3 to 20.

4. The ink composition as described claim 1, wherein the surface active agent is a compound represented by the following general formula (II-1):

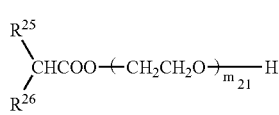

General formula (II-1)

wherein $R^{25}$ and $R^{26}$ each independently represent a $C_2$-$C_{20}$ saturated hydrocarbon; and $m_{21}$ is from 2 to 40.

5. The ink composition as described claim 1, wherein the surface active agent is a compound represented by the following general formula (III-1):

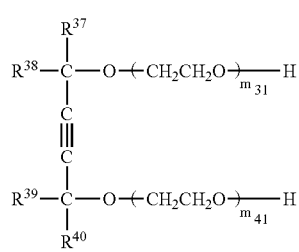

General formula (III-1)

wherein $R^{37}$, $R^{38}$, $R^{39}$ and $R^{40}$ each independently represent a $C_1$-$C_6$ alkyl group; and $m_{31}$ and $m_{41}$ each independently are 0 to 40, and the sum of $m_{31}$ and $m_{41}$ is from 0 to 40.

6. The ink composition as described in claim 1, which additionally comprises a compound represented by the following general formula (IV):

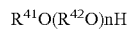 General formula (IV)

wherein $R^{41}$ represents a $C_1$-$C_4$ alkyl group; $R_{42}$ represents a $C_2$-$C_3$ alkyl group; and n represents an integer of from 2 to 5.

7. The ink composition as described in claim 6, wherein the compound represented by the general formula (IV) is triethylene glycol monobutyl ether.

8. The ink composition as described in claim 1, wherein the dye remaining ratio (reflection density after storage/ initial density×100) measured after 24 hours of storage in 5 ppm ozone atmosphere is 60% or more at the site where printing has been made such that the reflection density is from 0.9 to 1.1 as measured through a status A filter.

9. The ink composition as described in claim 1, wherein, after a solid image printed with an ink containing a Cu phthalocyanine dye is stored for 24 hours in 5 ppm ozone atmosphere, the amount of Cu ions eluted in water from the solid image is 20% or less based on the total dye.

10. The ink composition as described in claim 1, wherein the dye is a phthalocyanine dye having an electron-withdrawing group in the β-position on the benzene ring of phthalocyanine.

11. The ink composition as described in claim 1, wherein the dye is a phthalocyanine dye produced by a method which doesn't proceed through a sulfonation of unsubstituted phthalocyanine.

12. The ink composition as described in claim 1, wherein the dye is a compound represented by the following general formula (C-I):

General formula (C-I)

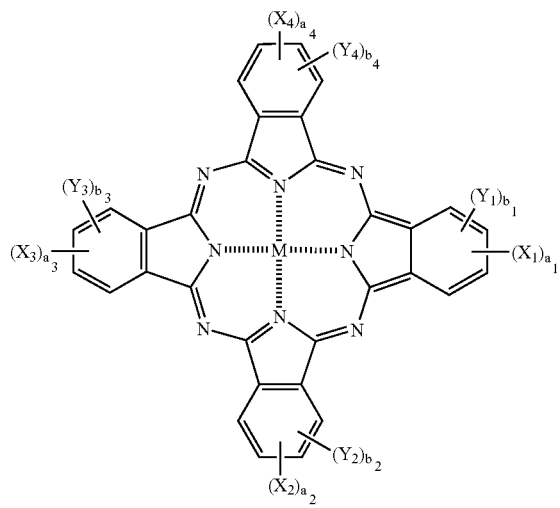

wherein $X_1$, $X_2$, $X_3$ and $X_4$ each independently represent —SO-Z, —SO$_2$-Z, —SO$_2$NR$_1$R$_2$, sulfo group, —CONR$_1$R$_2$ or —CO$_2$R$_1$; Z represents a substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group; $R_1$ and $R_2$ each independently represent a hydrogen atom, substituted or unsubstituted alkyl group, substituted or unsubstituted cycloalkyl group, substituted or unsubstituted alkenyl group, substituted or unsubstituted aralkyl group, substituted or unsubstituted aryl group or substituted or unsubstituted heterocyclic group, with the proviso that when there are a plurality of Z's, they may be the same or different;

$Y_1$, $Y_2$, $Y_3$ and $Y_4$ each independently represent a monovalent substituent, with the proviso that when there are a plurality of any of $X_1$ to $X_4$ and $Y_1$ to $Y_4$, they may be the same or different; $a_1$ to $a_4$ and $b_1$ to $b_4$ represent the number of substituents $X_1$ to $X_4$ and $Y_1$ to $Y_4$, respectively; $a_1$ to $a_4$ each independently represent an integer of from 0 to 4, and all of them do not represent 0 at the same time; $b_1$ to $b_4$ each independently represent an integer of from 0 to 4;

M represents a hydrogen atom, metal atom or oxide, hydroxide or halide thereof.

13. The ink composition as described in claim 12, wherein the dye represented by the general formula (C-I) is a compound represented by the following general formula (C-II):

General formula (C-II)

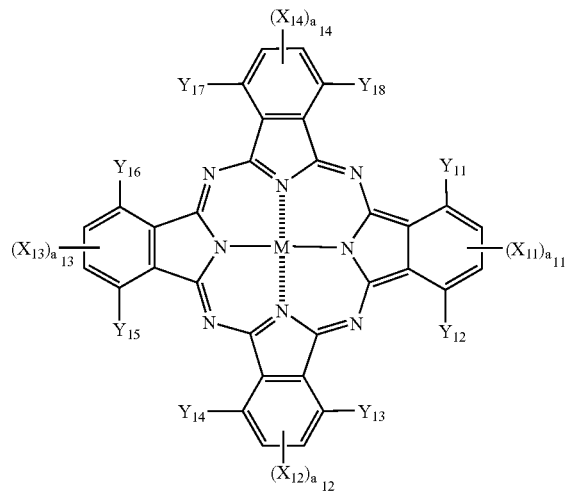

wherein $X_{11}$ to $X_{14}$, and M have the same meaning as $X_1$ to $X_4$, and M in the general formula (C-I); respectively; $Y_{11}$ to $Y_{18}$ each independently represents a hydrogen atom, a halogen atom, a cyano group, a carboxyl group or a sulfo group, with the proviso that when there are a plurality of any $X_{11}$ to $X_{14}$, they may be the same or different; and $a_{11}$ to $a_{14}$ each independently represents an integer of 1 or 2.

14. The ink composition as described in claim 1, wherein the dye is an azo dye having a maximal absorption at from 500 nm to 580 nm in an aqueous medium.

15. The ink composition as described in claim 14, wherein the azo dye has a chromophore represented by (heterocyclic ring A)-N=N-(heterocyclic ring B).

16. The ink composition as described in claim 14, wherein the azo dye has an aromatic nitrogen-containing 6-membered heterocyclic ring directly connected to at least one end of the azo group as a coupling component.

17. The ink composition as described in claim 14, wherein the azo dye has an aromatic cyclic amino group or heterocyclic amino group as an auxochrome.

18. The ink composition as described in claim 14, wherein the azo dye has a stereostructure.

19. The ink composition as described in claim 14, wherein the azo dye is a compound represented by the following general formula (M-I):

General formula (M-I)

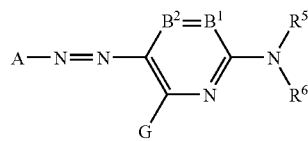

wherein A represents a 5-membered heterocyclic ring; $B^1$ and $B^2$ each indepedently represent $=CR^1-$ or $-CR^2=$, or one of $B^1$ and $B^2$ represents a nitrogen atom and the other represents $=CR^1-$ or $-CR^2=$; $R^5$ and $R^6$ each independently represent a hydrogen atom or a substituent that represents an aliphatic group, aromatic group, heterocyclic group, acyl group, alkoxycarbonyl group, aryloxycarbonyl group, carbamoyl group, alkylsulfonyl group, arylsulfonyl group or sulfamoyl group, and the hydrogen atom in the substituent may be substituted; G, $R^1$ and $R^2$ each independently represent a hydrogen atom or a substituent that represents a halogen atom, aliphatic group, aromatic group, heterocyclic group, cyano group, carboxyl group, carbamoyl group, alkoxycarbonyl group, aryloxycarbonyl group, heterocyclic oxycarbonyl group, acyl group, hydroxy group, alkoxy group, aryloxy group, heterocyclic oxy group, silyloxy group, acyloxy group, carbamoyloxy group, alkoxycarbonyloxy group, aryloxycarbonyloxy group, amino group, acylamino group, ureido group, sulfamoylamino group, alkoxycarbonylamino group, aryloxycarbonylamino group, alkylsulfonylamino group, arylsulfonylamino group, heterocyclic sulfonylamino group, nitro group, alkylthio group, arylthio group, heterocyclic thio group, alkylsulfonyl group, arylsulfonyl group, heterocyclic sulfonyl group, alkylsulfinyl group, arylsulfinyl group, heterocyclic sulfinyl group, sulfamoyl group or sulfo group, and the hydrogen atom of the substituent may be substituted; $R^1$ and $R^5$ or $R^5$ and $R^6$ may be connected to each other to form a 5- or 6-membered ring.

20. An ink jet recording method, which comprises using the ink composition as described in claim 1.

21. An ink jet recording method, which comprises ejecting an ink droplet onto an image-receiving material comprising an image-receiving layer containing a particulate white inorganic pigment provided on a support in accordance with recording signals to record an image on the image-receiving material, wherein the ink droplet comprises the ink composition as described in claim 1.

* * * * *